US007126078B2

(12) United States Patent
Demers et al.

(10) Patent No.: US 7,126,078 B2
(45) Date of Patent: Oct. 24, 2006

(54) SUB-MICRON ADJUSTABLE MOUNT FOR SUPPORTING A COMPONENT AND METHOD

(75) Inventors: Joseph R Demers, Glendale, CA (US); Nathan Woodard, Pasadena, CA (US); Chien-Chung Chen, Thousand Oaks, CA (US)

(73) Assignee: Emcore Corporation, Albuquerque, NM (US)

( * ) Notice: Subject to any disclaimer, the term of this patent is extended or adjusted under 35 U.S.C. 154(b) by 201 days.

(21) Appl. No.: 10/859,871

(22) Filed: Jun. 2, 2004

(65) Prior Publication Data

US 2004/0217092 A1 Nov. 4, 2004

Related U.S. Application Data

(63) Continuation-in-part of application No. 10/394,326, filed on Mar. 20, 2003, which is a continuation-in-part of application No. 10/150,183, filed on May 17, 2002.

(60) Provisional application No. 60/361,237, filed on Feb. 28, 2002.

(51) Int. Cl.
*B23K 11/10* (2006.01)
*B23K 11/30* (2006.01)
*B23K 35/02* (2006.01)

(52) U.S. Cl. .................. 219/117.1; 219/86.9; 219/119; 219/56.21; 219/56.22

(58) Field of Classification Search ............. 219/56.21, 219/56.22, 117.1, 119, 86.9, 86.33, 127

See application file for complete search history.

(56) References Cited

U.S. PATENT DOCUMENTS

| 2,045,523 | A | 6/1936 | Fassler | 219/86.9 |
|---|---|---|---|---|
| 3,435,181 | A | 3/1969 | Walkow | 219/86.9 |
| 4,030,811 | A | 6/1977 | Khoe et al. | 385/91 |
| 4,208,568 | A | 6/1980 | Bakewicz et al. | 219/86.31 |
| 4,237,474 | A | 12/1980 | Ladany | 385/49 |
| 4,447,700 | A | 5/1984 | Cohen | 219/117.1 |
| 4,479,698 | A | 10/1984 | Landis et al. | 385/91 |
| 4,500,165 | A | 2/1985 | Scholl et al. | 385/90 |
| 4,523,802 | A | 6/1985 | Sakaguchi et al. | 385/91 |

(Continued)

FOREIGN PATENT DOCUMENTS

EP    0 662 622 A1    7/1995

(Continued)

OTHER PUBLICATIONS

Smith, Flexures—Elements of Elastic Mechanisms, 2000, ISBN 90-5699-261-9, Gordon and Breach Science Publishers, Chapter 7, p. 335-372.

(Continued)

*Primary Examiner*—Kevin P. Kerns
(74) *Attorney, Agent, or Firm*—Pritzkau Patent Group, LLC

(57) ABSTRACT

An arrangement is provided including an electrode extending to an electrode tip for contacting a workpiece. A welding configuration of the electrode tip is established by exposing the electrode tip to a selected welding environment for use in forming a weld having a target set of weld parameters. An electrode passage is defined in a biasing force arrangement supporting at least a portion of the length of an elongated, flexible electrode and to limit lateral movement sufficient to transfer at least a portion of a resilient force to the electrode tip so that the tip resiliently contacts the weld region. The electrode passage limits induced lateral flexing to an extent which transfers an amount of the resilient force to the first end portion of the electrode that is sufficient to provide for formation of a weld between the support arrangement and the workpiece.

90 Claims, 41 Drawing Sheets

U.S. PATENT DOCUMENTS

| | | | | |
|---|---|---|---|---|
| 4,548,466 A | 10/1985 | Evans et al. | ................. | 385/90 |
| 4,615,097 A | 10/1986 | Geneguand | ................. | 29/466 |
| 4,752,109 A | 6/1988 | Gordon et al. | ................. | 385/14 |
| 4,773,727 A | 9/1988 | Le Pivert et al. | ............ | 385/134 |
| 4,778,241 A | 10/1988 | Haltenorth | ................. | 385/91 |
| 4,803,329 A | 2/1989 | Nakata et al. | .......... | 219/86.25 |
| 4,831,228 A | 5/1989 | Schumacher | ............ | 219/86.22 |
| 4,837,768 A | 6/1989 | Schmid | ................. | 372/36 |
| 4,874,217 A | 10/1989 | Janssen | ................. | 385/91 |
| 4,887,882 A | 12/1989 | Mousseaux et al. | .......... | 385/91 |
| 5,066,093 A | 11/1991 | Greil et al. | ................. | 385/33 |
| 5,177,807 A | 1/1993 | Avelange et al. | ............. | 385/91 |
| 5,187,876 A | 2/1993 | Hatheway | ................. | 33/568 |
| 5,210,811 A | 5/1993 | Avelange et al. | ............. | 385/91 |
| 5,300,755 A | 4/1994 | Nishitani et al. | ...... | 219/121.63 |
| 5,301,251 A | 4/1994 | Moore et al. | ................. | 385/91 |
| 5,360,958 A | 11/1994 | Bogue et al. | ............ | 219/86.51 |
| 5,367,140 A | 11/1994 | Jouaneh et al. | ........ | 219/121.64 |
| 5,570,444 A | 10/1996 | Janssen et al. | ................. | 385/90 |
| 5,619,609 A | 4/1997 | Pan et al. | ................. | 385/136 |
| 5,631,989 A | 5/1997 | Koren et al. | ................. | 385/91 |
| 5,727,099 A | 3/1998 | Harman | ................. | 385/52 |
| 5,793,915 A | 8/1998 | Joyce | ................. | 385/91 |
| 5,833,202 A | 11/1998 | Wolfgang | ................. | 248/466 |
| 5,854,869 A | 12/1998 | Joyce | ................. | 385/92 |
| 5,930,430 A | 7/1999 | Pan et al. | ................. | 385/94 |
| 5,963,695 A | 10/1999 | Joyce | ................. | 385/88 |
| 5,977,567 A | 11/1999 | Verdiell | ................. | 257/99 |
| 6,056,447 A | 5/2000 | Caras | ................. | 385/92 |
| 6,106,161 A | 8/2000 | Basavanhally et al. | ........ | 385/88 |
| 6,174,092 B1 | 1/2001 | Siala | ................. | 385/91 |
| 6,184,987 B1 | 2/2001 | Jang et al. | ................. | 356/388 |
| 6,190,056 B1 | 2/2001 | Kwon et al. | ................. | 385/91 |
| 6,207,950 B1 | 3/2001 | Verdiell | ................. | 250/239 |
| 6,227,724 B1 | 5/2001 | Verdiell | ................. | 385/91 |
| 6,247,852 B1 | 6/2001 | Joyce | ................. | 385/90 |
| 6,252,726 B1 | 6/2001 | Verdiell | ................. | 359/820 |
| 6,266,470 B1 | 7/2001 | Kang et al. | ................. | 385/137 |
| 6,490,303 B1 | 12/2002 | Komiyama et al. | ........... | 372/43 |
| 6,511,236 B1 | 1/2003 | Webjorn et al. | ............. | 385/91 |
| 6,663,294 B1 | 12/2003 | Crane, Jr. et al. | ............. | 385/92 |
| 2003/0196992 A1* | 10/2003 | Demers et al. | .......... | 219/117.1 |

FOREIGN PATENT DOCUMENTS

| | | |
|---|---|---|
| EP | 1 115 016 A1 | 7/2001 |
| WO | WO 85/02802 A1 * | 7/1985 |
| WO | WO 91/06022 | 5/1991 |
| WO | WO 99/15928 | 4/1999 |
| WO | WO 99/35694 | 7/1999 |
| WO | WO 00/42464 | 7/2000 |
| WO | WO 00/42629 | 7/2000 |
| WO | WO 01/16634 A1 | 3/2001 |
| WO | WO 01/18580 A1 | 3/2001 |
| WO | WO 01/37023 A2 | 5/2001 |

OTHER PUBLICATIONS

Smith et al, Foundations of Ultraprecision Mechanism Design, 1992, Gordon and Breach Science Publishers, Chapter 4, p. 95-129.

Anderson, Design and Manufacturability Issues of a Co-packaged DFB/MZ Module, Sep. 1999, IEEE 1999 Electronic Components and Technology Conference, p. 197.

Ming C. Wu, Micromachining for Optical and Optoelectronic Systems, Nov. 1997,Proceedings of the IEEE, vol. 85, No. 11, pp. 1833-1856.

* cited by examiner

SUB-MICRON ADJUSTABLE MOUNT FOR SUPPORTING A COMPONENT AND METHOD

RELATED APPLICATIONS

The present application is a Continuation-in-Part of U.S. application Ser. No. 10/394,326, filed on Mar. 20, 2003, which is a Continuation-in-Part of U.S. application Ser. No. 10/150,183, filed on May 17, 2002 which itself claims priority from U.S. Provisional Patent Application Ser. No. 60/361,237, filed on Feb. 28, 2002, all of which applications are incorporated herein by reference.

BACKGROUND OF THE INVENTION

The present invention is related generally to the field of optical component alignment in an optical assembly and, more particularly, to arrangements and an associated method for aligning and fixedly supporting an optical component, as part of an optical assembly, with high precision in relation to an optical path.

The prior art appears to be replete with approaches for supporting optical components in an aligned condition, for example, within an optical package. While it is admitted that a great number of these approaches are at least generally effective, it is submitted in view of the discoveries brought to light herein, that these approaches appear to share a number of heretofore unresolved problems and disadvantages, as will be further described.

One common approach of the prior art, with respect to optical component positioning, relies on supporting an optical component on a "clip". The latter is typically attached to a support surface which is defined within the optical package. One, more recent implementation of this approach is seen in U.S. Pat. No. 6,184,987, issued to Jang et al (hereinafter, Jang). The clip of Jang supports, for example, an optical fiber. A metal ferrule supports the end of the fiber. The clip is laser welded to a support surface and the ferrule is laser then welded to the clip. Laser hammering is then employed in a way that is intended to compensate for weld shifts. Since the patent contemplates sub-micron positioning, the need for further alignment adjustments is virtually assured. While various techniques are available in attempting to achieve precise positioning, Jang utilizes laser hammering, in which additional welds are made, thereby attempting to induce strains in strategic locations to bend the mounting fixture and thereby move the fiber end back into a desired position. Unfortunately, it is not possible to precisely predict or control hammering induced strains. This method, like any method using laser hammering, therefore, inevitably relies on some level of trial and error. For this reason, the technique introduced by Jang is likely, at best, to be time consuming and is at least potentially unreliable. It is also important to note that laser hammering can result in residual stresses that relax over time, as the unit is subjected to temperature cycling in everyday storage and use. The outcome may be a mounting arrangement that exhibits long-term creep with an attendant performance degradation over time.

Another approach taken by the prior art also relies on the use of a clip to support the optical component. Unlike the approach exemplified by the '987 patent, however, a positioning arrangement is used both to move the optical component into a desired position and to then hold the component in the desired position as the clip is welded in place within the optical assembly. This approach may be referred to in a generic sense as "direct-clamping." Generally, the term direct-clamping, as used herein, refers to any arrangement wherein a clamp or holding tool manipulates the optical component. In this regard, a clip that is suitable for use in direct-clamping may take on any number of configurations. In one form of direct-clamping, the support clip is at least somewhat spring-like. Unfortunately, however, this implementation is subject to relatively large magnitudes of spring-back upon release of the component. While spring-back is generally problematic using any form of direct-clamping, it is submitted that weld shift still further exacerbates the spring-back problem since the flexible clip absorbs much of the weld shift in the form of elastic deformation. Release of the flexible clip serves to release the absorbed elastic deformation thereby resulting in movement of the optical component. In sum, the offending stresses which produce spring-back are difficult to avoid, and unless the mounting clip is extremely rigid, small stresses may lead to large shifts of up to 3–10 microns. One approach seen in the prior art in an attempt to cope with this is to use calibrated or calculated overextension. That is, moving past the desired position prior to release, and/or, in another approach, by performing laser-hammering after release. Unfortunately, it is submitted that these more traditional approaches at best are touchy, process-sensitive and potentially time consuming.

Another form of direct-clamping, referred to herein as "hard-clamping", is specifically intended to overcome the problem of such weld shifts inducing a corresponding positional shift in the optical component. At the same time, this method attempts to cope with the spring-back problem, described above, particularly complicated through the use of a flexible clip. Accordingly, the positioning arrangement used in a hard-clamping implementation must be capable of maintaining sufficient force (roughly ten to thirty pounds of force), to rigidly hold the optical component in place while welding is performed. This method raises concerns in requiring a bulky, rigid clamp, as well as a rigid component or clip (typically, the part to be mounted consists of solid machined construction). These structural mandates are imposed for the purpose of supporting the optical component to resist or overcome weld-induced forces which tend, in turn, to produce the subject unpredictable changes in positional relationships. Another concern is introduced wherein the optical component is of insufficient strength to endure this form of direct-clamping. In this instance, the method may be implemented by providing a rigid support structure having a mounting platform with the optical component mounted thereon. The mounting platform is then itself hard-clamped to resist weld shift. Unfortunately, it is submitted that hard-clamping techniques, in any of the described varieties, encounter significant difficulties in attempting to produce reliable positioning (as contemplated herein, to ±0.1 um tolerance). In order to reach the contemplated degree of precision, subsequent post-weld hammering or bending is typically needed. In addition to the foregoing concerns, it should be appreciated that in any technique using some form of clamp or holder to position the optic (or its directly supporting platform) before and during the welding process, the clamping tool must be disengaged at some point. Unclamping unavoidably releases residual forces, thereby causing at least some undesired spring-back such that this problem remains unresolved.

As alluded to above, another common approach in the prior art involves post-weld bending. That is, after initial positioning and welding, a holding clamp is used to bend support members, such as legs, which support the optical component, to move the optical component into the desired position. Often, the support members are designed specifically for quick onset of plastic deformation as bending forces are applied. This approach, however, shares a disadvantage with direct-clamping. Specifically, some level of elastic spring-back will typically follow any attempt at precision bending. While spring-back can be compensated for somewhat predictably by intentionally overshooting the desired position, it is submitted to be extremely difficult to compensate to within 0.1 um tolerances. In this regard, one of the attractions of laser hammering, in contrast to post weld bending and direct-clamping, resides in the fact that the holding tool is disengaged prior to the fine-adjustment steps, so there is no tool removal-induced spring-back.

A more recent approach to the problem of weld shifts is demonstrated by FIG. 4A of Published International Patent Application No. WO 01/18580 by Webjorn et al (hereinafter Webjorn). The subject figure illustrates a support structure having an elongated main body including a pair legs positioned proximate to either end. The optical component is described as being positioned "close" to a front pair of the legs. The main body includes a pair of gripping holes arranged proximate to each of its ends. This structure is used by performing an initial alignment using a gripping tool which engages the pair of gripping holes closest to the optical component. Following this initial alignment, the front pair of legs is welded. A second alignment step compensates for "post-attachment shift" by gripping the main body using the pair of gripping holes at its rear end. The structure is described as allowing a "small positioning correction" to compensate for weld shift produced by attachment of the front legs through moving the rear of the support structure. The rear legs are then welded and the gripping tool is removed. Of course, a weld shift is also produced upon welding of the rear legs, however, based on this configuration, the weld shift at the rear of the structure would be expected to produce a corresponding, but reduced magnitude of shift at the optical component.

Still considering Webjorn, while the described support structure and technique should be generally effective in achieving precision alignment, it is submitted that important disadvantages accompany its use. It is submitted that the very length of the elongated main body along the light path and which is required in order to achieve precision movement, already renders the device far too long for many applications. More importantly, any bending or other such distortion, for example, due to thermal stresses or mounting, in the overall package which houses the Webjorn arrangement will result in reduced optical coupling. It is herein recognized that the length of the main body, even without an increase therein for purposes of adjustment enhancement, is likely to disadvantageously require an overall package outline that is stiffer and bulkier (and therefore larger and more costly) than would traditionally be required. While the Webjorn disclosure describes a shorter, two-legged clip, the precision alignment technique is applicable only to a four-legged structure.

At first blush, it may appear that increasing the main body length of Webjorn and, hence, the separation distance between the front and rear pairs of legs is attended only by advantages in further refining adjustment precision. Any resultant advantage, however, is at cross-purposes with other objectives, inasmuch as miniaturization is a substantial motivation in producing many optical assemblies. That is, an increase in length still further complicates matters with respect to package bending and outline.

Another recent approach is seen in U.S. Pat. No. 5,833,202 issued to Wolfgang. The latter introduces a tripod-like component support structure which is intended to be deformable or bendable for positioning adjustments. With respect to precision alignment, however, Wolfgang is subject to weld shift and spring-back effects as a result of its apparent reliance on direct-clamping, which is described in terms of micro-manipulation of the mounted optical component at column 6, lines 54–55. Moreover, it is submitted that the sole structure described in detail by Wolfgang, a tripod, is not well-suited for linear stacking along an optical path for purposes of producing a compact assembly. In this regard, it is noted that this disadvantage is shared with Webjorn since the latter requires the use of an elongated main body.

The present invention resolves the foregoing disadvantages and problems while providing still further advantages, as will be described.

SUMMARY OF THE INVENTION

As will be described in more detail hereinafter, there is disclosed herein an optical assembly as well as an associated method. The optical assembly includes a light path and at least one optical component to be positioned in the light path and further includes one or more support surfaces. In one aspect of the present invention, a support arrangement includes support means for supporting the optical component and having a foot arrangement including at least one foot that is configured for receiving a direct manipulation with the foot slidingly engaged against one of the support surfaces such that the direct manipulation of the foot moves the optical component relative to the light path. In one feature, the foot includes a manipulation configuration for receiving the direct manipulation to move the foot slidingly against the support surface that it is engaged therewith. In another feature, the support means is configured for moving the optical component along a predetermined path with a selected direct movement of the foot and the predetermined path at least generally defines a plane that is normal to the light path.

In another aspect of the present invention, an optical assembly includes a light path and an optical component to be positioned in relation to the light path. An arrangement forming part of the assembly includes support means for supporting the optical component relative to the light path having at least one foot with (i) a lower surface for at least initially engaging a support surface forming part of the optical assembly, (ii) an upper surface spaced-apart from the lower surface such that the foot includes a first thickness therebetween, (iii) and at least one weld region having a second thickness which is less than the first thickness for use in welding the foot to the support surface. In one feature, the lower surface extends across the weld region and the weld region includes a stepped periphery formed in the upper surface to define a weldable surface which is spaced from the lower surface by the second thickness. In another feature, the stepped periphery is configured for receiving the direct manipulation in a way which slidingly moves the foot against the support surface prior to attachment of the foot to the support surface.

In still another aspect of the present invention, an optical arrangement includes a light path and an optical component to be positioned in the light path. An assembly forms part of the optical arrangement including support means for supporting the optical component and including at least two feet which are moveable relative to one another for moving the optical component such that a known relative positional relationship between the feet produces a known position of the optical component, at least to an approximation. In one feature, the support means is configured for moving the optical component along a predetermined path with relative movement of the feet In yet another aspect of the present invention, an optical assembly includes a light path and an optical component to be positioned in the light path. A positioning arrangement within the assembly includes support means for supporting the optical component and having a foot arrangement including at least one foot for use in positioning the optical component. The foot includes a configuration for use in selectively biasing the foot against a support surface defined within the optical assembly in a first way, during a movement mode, which is intended to permit movement of the foot against the support surface and in a second way, during a locked mode, which is intended to lock the foot against the support surface. In one feature, the locked mode is intended to at least limit lateral movement of the foot during attachment thereof to the support surface.

In a continuing aspect of the present invention, an optical assembly includes a light path and at least one optical component to be positioned in the light path and further includes one or more support surfaces. A support arrangement includes support means for supporting the optical component having a foot arrangement including at least one foot defining a footprint for engaging one of the support surfaces. The foot is configured for receiving a direct manipulation in a way which changes the footprint on the support surface such that the optical component moves relative to the light path responsive to changes in the footprint. In one feature, the foot includes at least first and second engagement positions, at least one of which is configured for receiving the direct manipulation such that a distance change between the engagement positions changes the footprint which, in turn, produces movement of the optical component. In another feature, the support means is configured for moving the optical component by an amount that is less than the distance change between the engagement positions.

In a further aspect of the present invention, an optical assembly includes a light path and at least one optical component to be positioned in the light path and further includes one or more support surfaces. An arrangement, forming part of the assembly, includes support means for supporting the optical component and a foot arrangement including at least one foot that is configured for engaging the support surface. The foot defines first and second spaced-apart positions, at least one of which positions is capable of receiving a direct manipulation to change a spacing distance between the first and second positions which thereby causes the foot to react in a way which moves the optical component relative to the light path.

In another aspect of the present invention, an optical assembly includes a light path and at least one optical component to be positioned in the light path and further includes at least one support surface. A positioning arrangement, within the assembly, includes support means for supporting the optical component and a foot arrangement including at least one foot for engaging the support surface in a coarse adjustment mode during which the foot is moved slidingly as a unit against the support surface to at least coarsely position the optical component. The foot being configured to thereafter receive a direct manipulation while supported against the support surface in a fine-adjustment mode and to react to the direct manipulation in a way which causes a fine-adjustment movement of the optical component.

In another aspect of the present invention, an optical assembly includes a light path and at least one optical component to be positioned in the light path and further includes at least one support surface. A support assembly, within the optical assembly, includes a support arrangement for supporting the optical component and being configured for initial attachment to the support surface at least at a first point in a way that at least potentially produces an attachment shift at the first point which, in turn, produces a positional shift at the optical component and the support arrangement includes a soft-spring element configured for receiving an external manipulation and a stiff-spring element arranged for producing at least limited movement of the support arrangement, thereby moving the optical component. The stiff-spring element is arranged for cooperation with the soft-spring element such that a selected external manipulation received by the soft-spring element causes the stiff-spring element to react in a way which moves the support arrangement, thereby moving the optical component in a way that is intended to compensate for the positional shift produced at the optical component by the attachment shift. In one feature, the support means includes at least one foot which is attachable to the support surface where the first point, soft-spring element and stiff-spring element are formed as part of the foot.

In still another aspect of the present invention, an optical assembly includes a light path and at least one optical component to be positioned in the light path and further includes at least one support surface. A configuration, within the optical assembly, includes a support arrangement for supporting the optical component and being configured for initial, coarse positioning attachment to the support surface. The support arrangement includes a manipulation position connected to a soft-spring element for responding to an external fine-positioning manipulation received at the manipulation position and a stiff-spring element arranged for producing at least limited movement of the optical component, and the stiff-spring element is further arranged for cooperation with the soft-spring element such that the external fine-positioning manipulation is transferred, in an attenuated manner, through the soft-spring element to the stiff-spring element to cause the stiff-spring element to react in a way which moves the optical component for fine-positional adjustment thereof. The manipulation position is configured for fixed attachment, at least relative to the support surface, in a way which is intended to maintain a fine-adjusted position of the optical component, but which fixed attachment is at least potentially subject to an attachment shift at the manipulation position, which attachment shift is attenuated by cooperation of the soft-spring element and stiff-spring element to reduce movement of the optical component away from its fine-adjusted position responsive to the attachment shift. In one feature, the initial attachment position, the manipulation position, the soft-spring element and the stiff-spring element are formed as portions of a foot which is engaged against the support surface. In a related feature, the foot includes a footprint having a shape against the support surface and the foot is configured for deforming responsive to the external fine-positioning manipulation in a way which changes the shape of the footprint.

In yet another aspect of the present invention, a system is configured for use in producing an optical assembly which itself includes a light path and an optical component to be positioned in the light path as part of the optical assembly.

The system includes a support surface defined as part of the optical assembly and movement means for providing controlled alignment movements using at least one sharp tip. Support means supports the optical component, which support means includes at least one foot having a lower surface for engaging the support surface and an upper surface, opposing the lower surface, that is configured for cooperating with the movement means for receiving a direct manipulation, applied by the sharp tip to the upper surface of the foot, to move the foot laterally against the support surface to, in turn, move the support means and optical component supported thereby.

In a continuing aspect of the present invention, a system and method are described for fixedly attaching an attachment surface of an electrically conductive workpiece to an electrically conductive support surface that is defined by a support arrangement. To that end, a first arrangement distributes a biasing force at least partially around a weld region of the workpiece to urge the attachment surface of the workpiece against the support surface in a way which at least resists welding induced movement of the workpiece relative to the support arrangement. An electrode arrangement, having an electrode tip formed at a distal end of an electrode, is provided for contacting the workpiece at the weld region in a way which provides for substantially compliant movement of the electrode tip in contact with the weld region at least in directions that are generally parallel to the support surface, while applying a welding current through the electrode so as to weld the attachment surface of the workpiece to the support surface.

In another aspect of the present invention, an apparatus, system and method are described for manipulating a workpiece against a support surface and attaching the workpiece thereto in an adjusted position. For this purpose, a support configuration at least defines an electrically conductive support surface. Further, an electrically conductive workpiece is configured for fixed attachment to the support surface. A combined manipulation/welding arrangement is supported for controlled movement and having a free end that is configured (i) for engaging the workpiece in a way which biases the workpiece against the support surface to manipulate the workpiece slidingly against the support surface, with the controlled movement, into the adjusted position and (ii) for use in conducting an electrical current through the workpiece and the support surface, while holding the workpiece in the adjusted position, to weld the workpiece to the support surface.

In another aspect of the present invention, an apparatus, system and method are described for attaching a workpiece to an electrically conductive support surface using one or more micro welds. A spot welding arrangement is provided including an electrode having an elongated configuration extending to an electrode tip for electrically contacting the workpiece and for passing a welding current between the workpiece and the electrode tip. A welding configuration of the electrode tip is established by exposing the electrode tip to a selected welding environment for use in forming a micro weld having a target set of weld parameters. The workpiece is welded to the support surface using the electrode tip in contact with the workpiece to form the micro weld having the target set of weld parameters by re-exposing the electrode tip to the selected welding environment in a way which maintains the welding configuration of the electrode tip for use in forming an additional micro weld having the target set of weld parameters. In one feature, the electrode tip self-welds to the weld region, at least to a limited extent, in a way which at least partially contributes to maintaining the welding configuration of the electrode tip. In another feature, a force is applied to the electrode to remove the electrode tip from the workpiece, after self-welding to the workpiece, to at least partially maintain the welding configuration of the electrode tip. In still another feature, the electrode tip is resiliently biased against the workpiece through an elongated length such that a flexible characteristic of the elongated length of the electrode cooperates with the resilient biasing force in a way which limits deformation of the electrode tip resulting from contacting the workpiece so as to at least partially contribute to maintaining the welding configuration of the electrode tip.

In still another aspect of the present invention, an apparatus, system and method are described for fixedly attaching an attachment surface of an electrically conductive workpiece to an electrically conductive support surface that is defined by a support arrangement. A biasing force arrangement is configured having a biasing tip for distributing a biasing force at least partially around a weld region of the workpiece to selectively bias the attachment surface of the workpiece against the support surface in a way which at least resists welding induced movement of the workpiece relative to the support arrangement. A through hole is defined in the biasing force arrangement having an exit opening, formed within the biasing tip, that is at least generally aligned with the weld region when the biasing force arrangement delivers the biasing force around the weld region. An elongated, flexible electrode, is provided having an overall length between a first end and a second, opposing end. The electrode is resiliently urged into the through hole to cause at least a first portion of the overall length of the electrode to be received in the through hole in a way which supports the first end of the electrode, terminating in an electrode tip for emerging from the exit opening to contact the workpiece at the weld region, while applying a welding current through the electrode tip so as to weld the attachment surface of the workpiece to the support surface.

In yet another aspect of the present invention, an apparatus, system and method are described for fixedly attaching an attachment surface of an electrically conductive workpiece to an electrically conductive support surface that is defined by a support arrangement. An electrode is provided, having an elongated flexible length between a first end portion and a second, opposing end portion. A biasing force arrangement is configured having a biasing tip for distributing a biasing force at least partially around a weld region of the workpiece to selectively bias the attachment surface of the workpiece against the support surface in a way which at least resists welding induced movement of the workpiece relative to the support arrangement. An electrode passage is defined in the biasing force arrangement for slidingly receiving a substantial portion of the elongated length of the electrode in a way which positions the first end portion of the electrode at the biasing tip to serve as an electrode tip that is at least generally aligned with the weld region when the biasing force arrangement delivers the biasing force and which positions the second end portion of the electrode proximately external to an opposing entrance of the electrode passage. The second end portion of the electrode is resiliently urged into the opposing entrance opening of the electrode passage using a resilient force to cause the electrode passage to limit lateral movement of the electrode therein sufficient to transfer at least a portion of the resilient force from the second end portion of the electrode to the electrode tip so that the electrode tip resiliently contacts the weld region, while applying a welding current through the electrode tip, so as to weld the attachment surface of the workpiece to the support surface.

In a further aspect of the present invention, an apparatus, system and method are described for fixedly attaching an attachment surface of an electrically conductive workpiece to an electrically conductive support surface that is defined by a support arrangement. An electrode is provided, having an elongated flexible length between a first end portion and a second, opposing end portion. The workpiece is supported against the support surface. A resilient force is applied at a position along the electrode in a way which is intended to resiliently urge the first end portion against the workpiece so as to cause the first end portion to serve as an electrode tip, but which resilient force is sufficient to induce lateral flexing in that portion of the electrode length that is captured between the position at which the resilient force is applied and the first end portion. The electrode is supported along an electrode path in a way which limits the induced lateral flexing to an extent which transfers an amount of the resilient force to the first end portion of the electrode that is sufficient to provide for formation of a weld between the support arrangement and the workpiece, responsive to passing a welding current through the support arrangement, workpiece and electrode.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
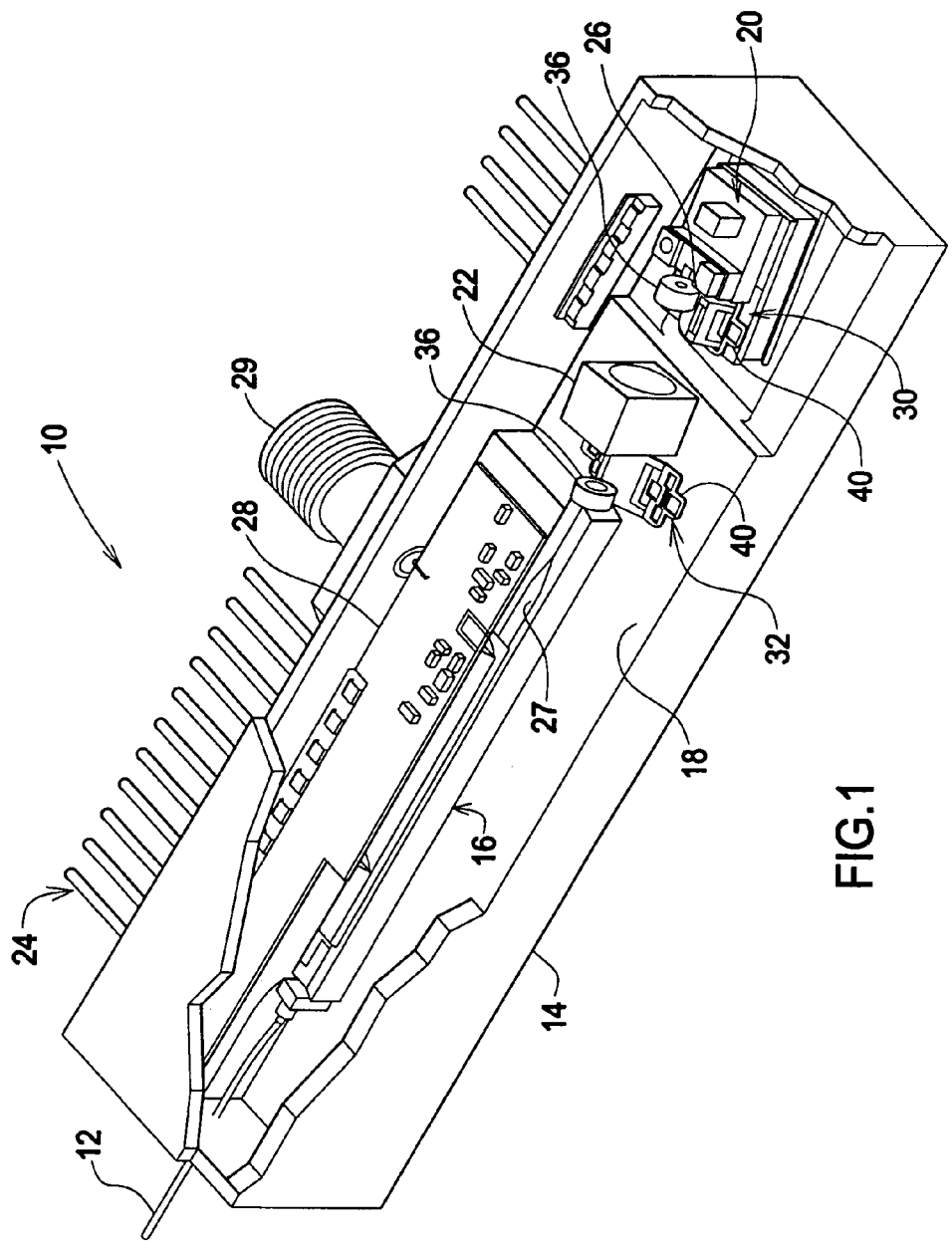
FIG. 1 is a diagrammatic, perspective view of an optical assembly, produced in accordance with the present invention, illustrating the use of two highly advantageous support brackets.

Turning now to the figures wherein like components are indicated by like reference numbers throughout the various figures, attention is immediately directed to FIG. 1 which illustrates an optical assembly generally indicated by the reference number 10 and produced in accordance with the present invention. It is noted that the figures are not to scale, being enlarged for purposes of illustrative clarity. Further, it is to be understood that naming conventions developed with reference to one or more of the figures such as "upper" and "lower" are adopted in this description and the appended claims for descriptive purposes only and are in no way intended as being limited in view of varying device orientations. FIG. 1 is a partial cutaway view of optical assembly 10 illustrating its structure. In the present example, optical assembly 10 comprises a transmitter module which is configured for modulating laser light and thereafter injecting the modulated light into an optical fiber 12. It is to be understood that the present invention is not limited to use in transmitter modules, but is applicable in any form of optical module wherein one or more components must be positioned with a high degree of precision in relation to some optical path. Moreover, it is further to be understood that the present invention is not limited to positioning optical components. That is, any form of component may be positioned with precision using the teachings herein, as will be further described.

Still referring to FIG. 1, assembly 10 includes a module base 14 upon which is positioned a modulator section 16, a lens support platform 18 and a laser section 20. An optical isolator 22 is positioned between lens support platform 18 and laser section 20. An electrical interconnection arrangement 24 is provided for externally electrically interfacing the various components contained within the assembly. Laser section 20 is made up of various components which are diagrammatically illustrated and provided to drive a laser chip 26. Modulator section 16 includes a surface waveguide assembly 27 that is configured for receiving light coupled to it from laser 26 in a manner to be described. An output of the modulator is coupled directly to optical fiber 12. An electronic assembly 28 receives an information signal coupled into an RF connector 29 and which is to be modulated onto the laser light. One highly advantageous form of optical modulator, which is well-suited for use herein, is described in copending U.S. patent application Ser. No. 09/898,197, filing date Jul. 2, 2001, entitled HYBRIDLY INTEGRATED OPTICAL MODULATION DEVICES, which is commonly assigned with the present application and is incorporated herein by reference.

Laser section 20, as shown in FIG. 1, supports a first lens arrangement 30 while lens support platform 18 supports a second lens arrangement 32. Each of the first and second lens arrangements includes a lens 36 which is directly supported by selected implementations of a highly advantageous bracket that is produced in accordance with the present invention and each which is generally indicated by the reference numeral 40. A free space precision coupling of light (not shown) emitted by laser 26 to modulator waveguide 27 is accomplished by adjusting the positions of lenses 36 supported by the first and second lens arrangements. Remarkably, as will be further described, the present invention provides for positioning these lenses with an empirically verified precision of no less than plus or minus 1 micron.

Figure 2:
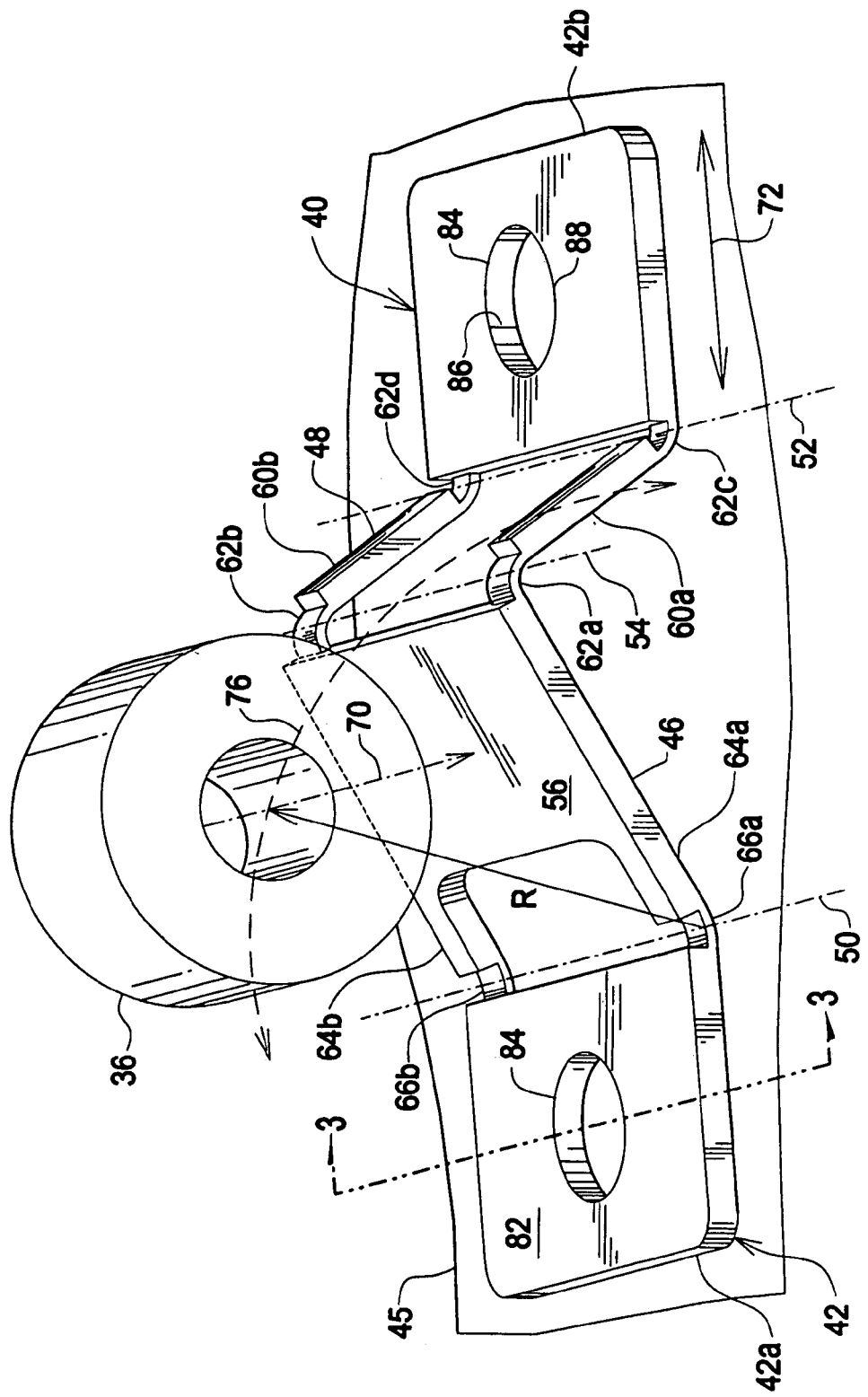
FIG. 2 is a diagrammatic, perspective view of a three-hinge support bracket, produced in accordance with the present invention and shown here to illustrate details of its structure.

Referring now to FIG. 2 in conjunction with FIG. 1, attention is now directed to details with regard to the structure of a first implementation of bracket 40. FIG. 2 is a diagrammatic, greatly enlarged perspective view of bracket 40 illustrating details of its highly advantageous structure. In particular, this bracket includes a pair of feet 42 including a first foot indicated by the reference number 42a and a second foot indicated by the reference number 42b. It is noted that either of these feet may be referred to generically as foot 42. The feet are supported on a support surface 45 which is defined within the overall optical assembly. As will be further described, there is no requirement to support the feet on a single support surface. Further, while support surface 45 is illustrated as being planar, any suitable configuration may be employed for use in supporting the feet such as, for example, a curved support surface which is engaged by a correspondingly curved foot. These feet are interconnected by first and second lengths or web members 46 and 48, respectively. First link 46 is hingedly attached at one end to first foot 42a along a first hinge axis 50, indicated by a dashed line, while second link 48 is hingedly attached at one end to second foot 42b along a second hinge axis 52 which is indicated by another dashed line. The remaining ends of first link 46 and second link 48 are, in turn, hingedly attached to one another so as to define a third hinge axis 54 which is indicated by still another dashed line. First link 46 includes a platform 56 which directly supports lens 36. The latter may be attached to platform 56 in any suitable manner including, but not limited to laser spot-welding, resistance spot-welding, arc welding, soldering or gluing. Moreover, any suitable configuration of the device supporting platform may be utilized and tailored so as to suit an individual device that is to be supported. For example, an optical component may be attached to the lower surface (not visible) of platform 56. As previously mentioned, it is also important to understand that lens 36 is intended as being representative of a wide range of potential devices that may be supported and positioned in accordance with the present invention using bracket 40. For example, optical devices which may be supported include, but are not limited to the ends of optical fibers, filters, mirrors, lenses and beam-splitters. Non-optical devices which may be supported include, but are not limited to magnetic disk drive heads, micro-apertures, biosensors, sharp electrode tips and electron emitters. For purposes of clarity, however, subsequent discussions will be limited to the use of an optical lens in order to provide for a more full appreciation of the advantages provided by the present invention. It is considered that one of the ordinary skill in the art may really adapt the teachings provided by these discussions in view of this overall detailed disclosure.

Continuing with a description of bracket 40 of the present invention with reference to FIG. 2, aside from a need to configure first link 46 in a manner that is suitable to support lens 36, first link 46 as well as second link 48 may be provided in a wide range of configurations. In the present example, second link 48 is made up of first and second legs 60a and 60b, respectively, each of which is hingedly attached between second foot 42b and first link 46 by hinges 62a, 62b, 62c and 62d. First link 56, likewise, includes first and second legs 64a and 64b, respectively, each of which is hingedly attached at one end to first foot 42a by hinges 66a and 66b. Alternatively, rather than using spaced-apart leg members (60a and 60b for link 48 or 64a and 64b for link 46) and hinges, material may be allowed to remain therebetween in any suitable configuration for purposes such as, but not limited to stiffening. Specific additional details with regard to structural considerations as to the construction of these links, the hinges which connect them to one another and to each of the feet will be provided at appropriate points below.

Having at least generally described the structure of support bracket 40 of the present invention, attention is now directed to certain aspects of its operation and use. Specifically, feet 42a and 42b are designed to initially slidingly engage support surface 45. These feet are typically biased against support surface 45 in a highly advantageous manner that is yet to be described. Of course, positioning of optical component 36 is accomplished, in part, by moving feet 42 in unison against support surface 45 in any desired direction in order to achieve at least coarse alignment with respect to a light path. That is, the feet may be moved in unison to move lens 36 along light path 70 and/or transverse to the light path to move the lens in a desired direction, for example, in coarse positioning relative to the light path. In accordance with the present invention, relative movement of the feet occurs at least directly toward and away from one another, while being biased against support surface 45, parallel to a path that is indicated by a double-headed arrow 72. Relative movement of the feet in this manner causes lens 36 to move along a predetermined path which is indicated by the reference number 76 and illustrated as an arcuate, dashed line. In the present example, predetermined path 76 is illustrated for movement of foot 42b towards and away from foot 42a, while the latter is held stationary. It should be appreciated that this description is in no way intended as being limited as to how the feet are moved towards and away from one another. For example, the feet may be moved in unison towards and away from one another.

What is important to understand, however, is that for any known relative positional relationship between the feet, the position of the optical component is also known, at least to an approximation. The actual position varies with tolerances such as, for example, the tolerance with which the optical component is attached to the bracket. Accordingly, the optical component may be moved to a predetermined position, within the constraints of these tolerances, using coordinated movements of feet 42. In and by itself, this capability is considered as being highly advantageous. With appropriate control of the positioning tolerances, the optical component may be moved to a desired position, for example, in relation to a light path. This movement ability is advantageous in the sense of absolute positioning or in the context of active alignment, as will be further described. Moreover, the need for and use of complex, empirically developed look-up tables such as those which are typically employed using laser hammering (see, for example, the aforedescribed Jang patent) is essentially avoided. The present invention, in contrast and as should be readily apparent to one of ordinary skill in the art in view of this disclosure, provides for positioning using straight-forward mathematical relationships. In the present example, having foot 42a held in a fixed position, the relationship is based on the equation of a circle of radius R having its origin on hinge axis 50. Alternatively, trigonometric relationships between the feet and the center point of the optical component may be employed. In any case, it is important to note the positioning dynamics using bracket 40 of the present invention are single-valued. That is, for any known relative position between feet 42, optical component 36 can be at only one, determinable position. As will be seen, the deterministic positional support bracket of the present invention provides remarkable advantages when in used in conjunction with a fine-adjust foot arrangement which is yet to be described.

In an active optical alignment implementation, the optical component may be attached to the bracket of the present invention with a somewhat loose or even arbitrarily loose tolerance. That is, the initial position of optical component, for a given relative foot position, may only be known roughly as a result of the optical component attachment tolerance. During active alignment, a wide sweep may then be employed to detect "first light", wherein the light path is found, such that knowing an absolute position of the lens with respect to the positions of the bracket feet is not required. From that point, the sweeping advantages of the bracket are brought to the forefront in precision movement of the bracket feet to precisely move the optical component in accordance with the teachings herein. It should be appreciated that motion of the optical component will track motion of the feet, caused by direct manipulation thereof, with high precision. This high precision is thought to provide for a positioning tolerance at the optical component of less than one micron in a plane generally transverse to the light path.

While during at least some steps in the course of active positioning, using active optical feedback, absolute positional tolerances are not important, smoothness of motion is important, as is repeatability. Repeatability is needed, since even an active search algorithm gets "confused" if foot motion does not correlate in some regular and repeatable way to optical component position. The bracket of the present invention provides just such highly advantageous characteristics with respect to both smoothness of motion and repeatability of motion.

Figure 3:
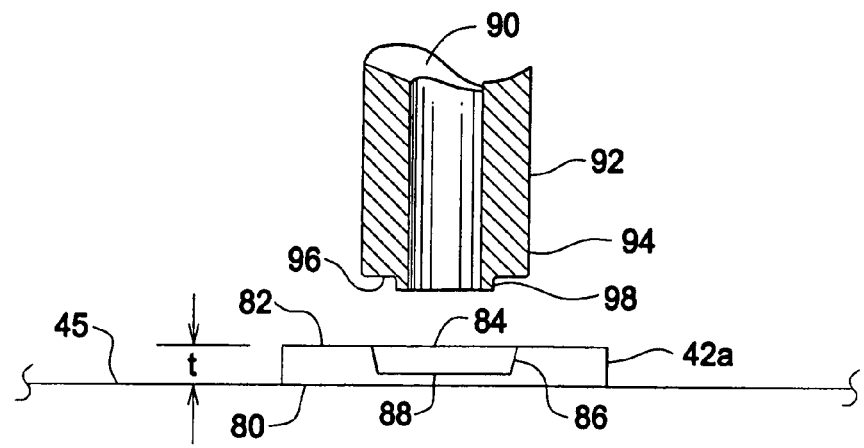
FIG. 3 is a diagrammatic, cross-sectional view of the foot of FIG. 2 shown here to illustrate details of its construction and further illustrating details of a manipulation tool that is shown hovering immediately above the foot.

Turning now to FIGS. 2 and 3, further details will now be provided with regard to the highly advantageous configuration of feet 42 used in support bracket 40 of the present invention. FIG. 3 is an enlarged cross-sectional view of foot 42a taken along a line 3—3 in FIG. 2. It is noted that both feet are identically configured. Moreover, as will be seen, a modified version of bracket 40 may be configured so as to utilize only one foot. Returning to the description of foot 42a and as best seen in FIG. 3, this foot includes a lowermost surface 80 which is configured to engage support surface 45. In the present example, both support surface 45 as well as lowermost surface 80 include a planar configuration. Foot 42a further includes an uppermost surface 82 which is spaced-apart from lowermost surface 80 by a thickness t. With regard to the construction of bracket 40, it is appropriate to note at this juncture that the bracket may be integrally formed from a sheet material which includes overall thickness t. Foot 42a further includes a manipulation/weld region 84 defined within upper surface 82 having a surrounding circular peripheral sidewall 86. The latter defines a weldable surface or floor 88 which is spaced inwardly with respect to lowermost surface 80 by a thickness which is less than aforementioned thickness t. As alluded to, region 84 serves a highly advantageous twofold purpose. Initially, region 84 may be referred to as a manipulation feature for use in moving foot 42a against support surface 45. On the other hand, region 84 may be referred to as a weld region or welding feature for use in fixedly attaching foot 42a to support surface 45. The dual mode use of region 84 will be described in detail immediately hereinafter.

Figure 4:
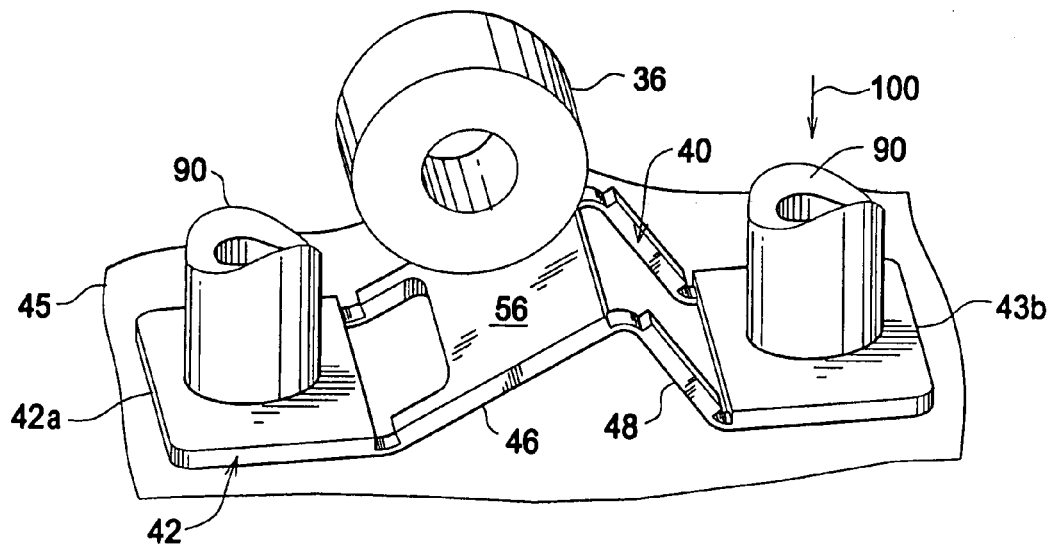
FIG. 4 is a diagrammatic, perspective view of the bracket of FIGS. 2 and 3, shown here to illustrate engagement of the bracket by a pair of manipulation tools.

Turning now to FIGS. 3 and 4, attention is now directed to the use of region 84 as a foot manipulation feature. To that end, region 84 is configured for engagement by a foot manipulation tool 90. FIG. 3 illustrates manipulation tool 90 positioned just above manipulation feature 84 of foot 42a while FIG. 4 illustrates manipulation tool 90 engaging each foot to move the feet either in unison or individually, relative to one another.

Referring to FIG. 3, it should be appreciated that manipulation tool 90 has been illustrated to the extent that its features are regarded as heretofore unknown. Remaining portions of the manipulation tool, which are not illustrated, may be configured by one of ordinary skill in the art to cooperate with those features which are illustrated. In particular, manipulation tool 90 includes any elongated body 92 defining a distal, manipulation end 94. The latter includes a peripheral downward-facing biasing surface 96 having a peripheral manipulation shoulder 98 extending outwardly therefrom. The configuration of manipulation shoulder 98 engages peripheral sidewall 86 of the foot in a way which provides for a predictable controlled value of movement tolerance when the foot is moved in any selected direction using the manipulation tool. Peripheral biasing surface 96 serves in a highly advantageous way to engage uppermost surface 82 of the foot in a way which applies a biasing force 100, indicated by an arrow, in order to hold the foot against support surface 80 consistent with the foregoing description. It is noted that this movement configuration is considered as providing sweeping advantages over the prior art in and by itself. Applicants are not aware of any prior art foot configuration that is suited for direct manipulation and/or engagement by a manipulation tool for purposes of indirect movement of a supported component. As will be seen, this configuration provides still further advantages with regard to fixed attachment of the foot to support surface 45.

Still considering movement of feet 42 against support surface 45, it is noted that any such movement is accompanied by a movement mode value of biasing force 100. In this regard, it should be appreciated that lowermost surface 80 of each foot engages support surface 45 with a coefficient of friction which is selectable at least to some extent by controlling factors such as surface finish. The latter cooperates with the movement mode value of biasing force 100 and in concert with lateral forces applied by foot manipulation tool 90 to provide for precision lateral adjustments of the position of each foot on the support surface while, at the same time, serving to avoid undesired movements. For example, the application of an excessive value of biasing force could result in the need for application of lateral movement forces at a level which produces an undesirable stick/slip movement of the foot. Such stick/slip movement may cause the release of stress, built up in the manipulation tool, such that when the foot does slip from a particular location, it moves wildly or unpredictably on support surface 45, for example, overshooting a target location to which the foot and, hence, the optical component was intended to move. Accordingly, the present invention provides for fine positioning of the feet, accomplished in the movement mode, as a result of a balance between the coefficient of friction, the biasing force magnitude and the magnitude of lateral movement forces applied by the manipulation tool. Other factors which influence this balance include, for example, the area of lowermost surface 80 of each foot as well as aforementioned surface finish.

Figure 5:
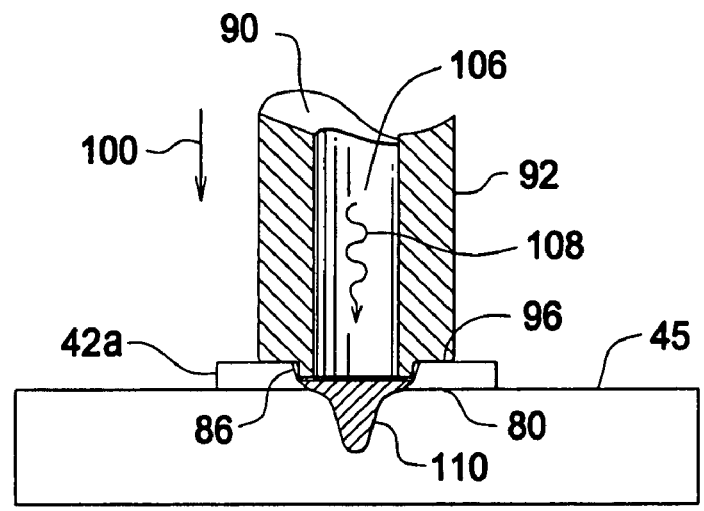
FIG. 5 is a diagrammatic, elevational view of the bracket foot of FIG. 3, produced in accordance with the present invention, illustrating one highly advantageous manner in which the foot is welded to a support surface.

Referring to FIGS. 4 and 5, attention is now directed to one highly advantageous manner in which feet 42 are fixedly attached to support surface 45 in accordance with the present invention. FIG. 5 illustrates manipulation tool 90 engaging foot 42 at some point in time following the conclusion of the movement mode and after having initiated an attachment mode. In particular, it should be appreciated that the configuration of weld region 84 provides for the use of high quality "foot welds" which may be characterized as "lap welds" to the limited extent that overlapping material sheets are welded to one another. The alternative terminology of "foot weld" has been coined for use herein in order to avoid confusion of the highly advantageous weld region configuration and method with prior art terms having potentially different connotations.

With regard to the use of manipulator tool 90 in the attachment mode, the manipulator tool is configured so as to define a central through passage 106, through which a laser beam 108 is directed at weld surface 88 to produce a foot weld 110 which symmetrically penetrates the support region underlying support surface 45. During the welding process of the attachment mode, biasing force 100 is increased to a value which is intended to essentially eliminate not only lateral movement of the foot against the support surface during the welding process, but also movement of the foot and support surface towards and away from one another. That is, an increase in biasing force is contemplated commensurate to overcome weld shift forces that may potentially be encountered. To gain at least a general sense for biasing force 100 in the attachment mode, the biasing force may be considered as being raised to level at which any manipulator tool induced lateral movement of the foot would most likely produce a stick/slip motion. However, the manipulator tool may be incapable of exerting sufficient lateral force to overcome the tractional holding power of the foot so biased against the support surface in the attachment mode.

Considering certain aspects of foot weld 110 including its formation in accordance with the foregoing teachings, the circular symmetry of weld region 84 not only provides for predictable movement tolerances of each foot during the movement mode, but also provides for small weld shifts in the plane of support surface 45, as compared to weld shifts typically seen using an edge weld or end weld. These latter, highly asymmetric welds tend to "pull" as the weld pool cools, solidifies, and shrinks. In contrast, as foot weld 110 shrinks on itself, its basic symmetry insures that the foot is not dragged in any particular direction. That is, whatever shift which might occur is caused by other factors: examples may include random forces due to crystal formation during solidification of the weld, as well as material non-uniformity due to graininess or impurities, or laser beam non-uniformities. While the present invention is certainly not limited to the use of a flat support surface and flat foot configuration, such flat surfaces make for higher quality foot welds and hence deliver lower positional shift.

High quality foot welds of the present invention are achieved by following a number of guidelines: (1) Surfaces 45 and 80 should be clean and as flat as possible; (2) these surfaces must be in close contact around the weld region; (3) the thickness of the foot in the "thinned-out" weld region should be selected so as to permit sufficient laser-penetration; (4) and the thickness of the foot in the weld region should also not be selected so thin as to warp unpredictably as a result of local heating and/or other weld stresses. With regard to all of these guidelines, the configuration of weld region 84 is considered to cooperate with the overall configuration of foot 42 in a number of highly advantageous ways, as will be described immediately below.

Still discussing foot weld 110 with reference to FIG. 5, it is recognized that weld shift is largely a function of weld size; larger welds produced from higher energy laser pulses generally exhibit larger shifts than small welds produced from lower energy laser pulses. At the same time, a thin 2–4 mil plate may be welded with a lower energy laser pulse than a thicker 8–12 mil plate. Consistent therewith, Applicants have observed smaller weld shifts as a result of welding a 2–4 mil thick foot. As a competing consideration, however, those skilled in the art generally recommend using plates no thinner than about 8–12 mils, since thin materials such as 2–4 mil plates are generally subject to unpredictable warping and deformation even with low weld energy. The present invention provides a highly advantageous hybrid welding region configuration which provides the advantages of a thin welding material with respect to reduced weld shift while, at the same time, providing the advantages attendant to the use of a thick weld material with respect to reduction of warpage and distortion. The present invention addresses these competing interests by substantially thinning the foot in weld region 84 to the 2–4 mil range while the weld region remains surrounded by material having an 8–12 mil thickness. Of course, it is emphasized that these benefits are produced to at least some extent so long as the weld region is thinner than the surrounding foot material.

In performing the highly advantageous foot weld of the present invention, laser beam 108 may be centered in through opening 106 and focused at weld region 84 in order to exhibit a minimum diameter at the weld region. The weld pool is intended to cover all or nearly all of thinned out weld region 84, thereby leaving little to no thinned area after the weld, as shown in FIG. 5. This implementation serves to avoid warping: once the weld is made there is no longer any thin material left, but the technique at the same time permits the use of lower laser power, hence achieving a smaller weld shift.

A still more detailed discussion of the advantages accorded to the configuration of weld region 84, in combination with the disclosed method for producing foot weld 110, will now be provided. With regard to the second guideline above, it should be appreciated that manipulator tool 90 serves to evenly bias the entire periphery of the weld region of foot 42 against support surface 45. Moreover, the biasing force is essentially as close as possible to the actual weld. These features are considered as highly advantageous since, depending on the surface quality of lowermost surface 80 of the foot and support surface 45, there may be at least some limited spring-back upon release of manipulator tool 90, even though bracket 40 is manipulated using its feet. That is, micron or even sub-micron roughness or warping of the feet will relax when a downward pressing force is relieved. If the foot is held down in a location somewhat removed from the weld itself, gaps due to surface roughness or irregularities, previously sandwiched together by the manipulation tool force, may relax and open up further when the biasing force is removed during tool disengagement. The present invention is thought to minimize this effect to a great degree since the manipulator is kept as close as is reasonably possible to the weld. Again, the reader is reminded that the weld ideally fills out nearly to the edge of through-hole. Weld nugget 110, therefore, fills in any gaps present due to surface irregularity. Since the manipulator tool is nearly on top of the weld, the only actual effect of tool disengagement is thought to be decompressing the hardened weld nugget. To the extent that the weld nugget does not reach under the manipulator's area of contact, there may be some residual spring-back-due to nearby gap openings, but proximity to the weld is thought to reduce such effects.

With regard to the attachment mode of the present invention, apart from the advantages it provides in combination with the movement mode, it is considered that the attachment mode provides an elegant and straightforward method, along with the disclosed apparatus, for utilizing clamp forces (i.e., biasing force 100) to directly resist weld shifts. In this highly advantageous configuration, frictional force from manipulator 90 bearing down upon the foot provides traction which directly resists at least lateral forces generated by the welding process. Because this in-plane resistive force is produced by static friction, and not by the manipulator itself, there is no need for a highly rigid manipulator. This is especially important in miniaturized applications where there simply is no room allocatable for ultra-rigid clamps such as are needed in a more traditional prior art "brute force" hard-clamping approaches. Recalling the Background Section discussion of prior art hard-clamping techniques that are intended to resist weld shifts, the prior art is at a disadvantage inasmuch as that prior art approach generally requires a bulky clamp, as well as a rigid or "blocky" multi-piece lens mount structure. That is, thin flexible clips or brackets are generally incapable of transmitting 10 to 30 pounds of force without themselves deforming. The present invention, in contrast, avoids such problems by using direct foot manipulations. As evidence of the sweeping advantages of the present invention over the prior art, Applicants have empirically demonstrated reduction of weld shift from 3–10 um to less than 1 um by applying only 5 pounds of downward force on a foot weld, using a small and comparatively flimsy tool that concurrently allows ample access for other tools and hardware.

Still considering the advantages of the present invention over the prior art, using the support bracket of the present invention having one or more feet configured for receiving a direct manipulation, the often seen phenomenon of elastic tool release spring-back is likewise essentially eliminated since the foot itself is manipulated. That is, the present invention avoids the prior art problem of elastic spring-back which particularly accompanies prior art direct-clamping using a "spring-like" support clip in which stored forces are at once released by the clip upon release of a manipulator tool.

Figure 6:
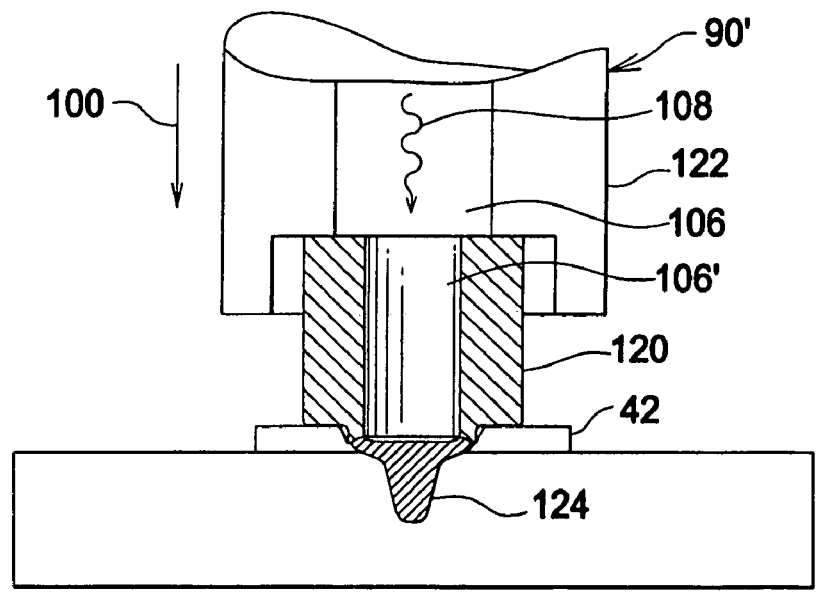
FIG. 6 is another diagrammatic, elevational view of the bracket foot of FIG. 5, illustrating another highly advantageous manner in which the foot is welded to a support surface using a manipulation tool having an alternative configuration.

Referring now to FIG. 6, an alternative manipulator tool is illustrated indicated by the reference number 90'. This latter manipulator tool differs from previously described manipulator tool 90 in its use of a replaceable manipulator tip 120 which is received in an overall manipulator body 122. The manipulator tip defines a central passage 106' that is aligned with passage 106 to permit laser beam 108 to pass therethrough. This highly advantageous configuration of the manipulator tool produces a triple-weld 124 which fuses replaceable manipulator tip 120 directly into the weld nugget. Manipulator tip 120 is then left in place with removal of manipulator tool main body 122. Empirical demonstrations reasonably lead to the conclusion that the only spring-back effect which accompanies the use of this embodiment is attributable only to the predictable decompression of solid metal in and around the weld nugget.

Figure 7:
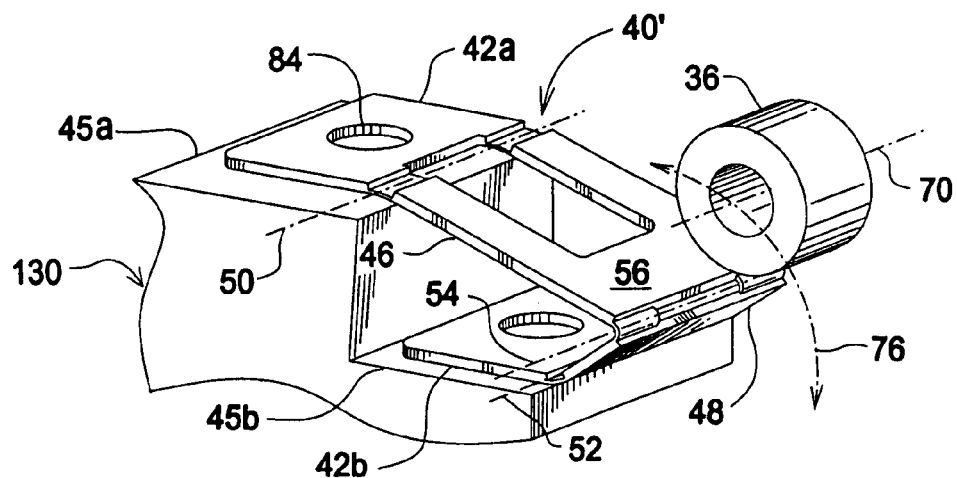
FIG. 7 is a diagrammatic, perspective view of an alternative implementation of the support bracket of the present invention in which the support bracket includes a pair of feet, each of which is attached to a different surface so as to cantilever an optical component laterally away from the feet.

Referring to FIG. 7, an alternative implementation of the support bracket of the present invention is generally indicated by the reference number 40'. The latter is similar to previously described bracket 40, sharing its advantages, while providing still further advantages. One noteworthy difference in a comparison with previously described bracket 40 is seen in that bracket 40' is configured for utilizing a support structure 130 defining a pair of support surfaces 45a and 45b that are offset with respect to one another. Bracket 40' includes feet 42a and 42b supported by support surfaces 45a and 45b, respectively. Another noteworthy difference resides in the fact that optical component 36 is supported to the side of most of bracket 40' in a cantilevered manner. In doing so, foot 42b is "upside down" with respect to its orientation shown in FIG. 2. A cantilevered arrangement may be advantageous in view of physical constraints imposed in a particular use. Moreover, links 46 and 48 have been reconfigured in an exemplary manner wherein link 48 is made up of a solid material plate that is hinged to plate 46 by a pair of hinges. Again, it is to be emphasized that the highly advantageous support bracket of the present invention may be configured in an unlimited number of ways, all of which are considered as being within the scope of the present invention. For example, the support surfaces may be further separated laterally such that foot 42b is in the orientation of FIG. 2. As another example, support surfaces 45a and 45b are not required to be parallel and may be orthogonal with proper configurations of feet 42. In the present example, web member 46 is configured to provide for direct manipulation access to foot 42b.

Figure 8:
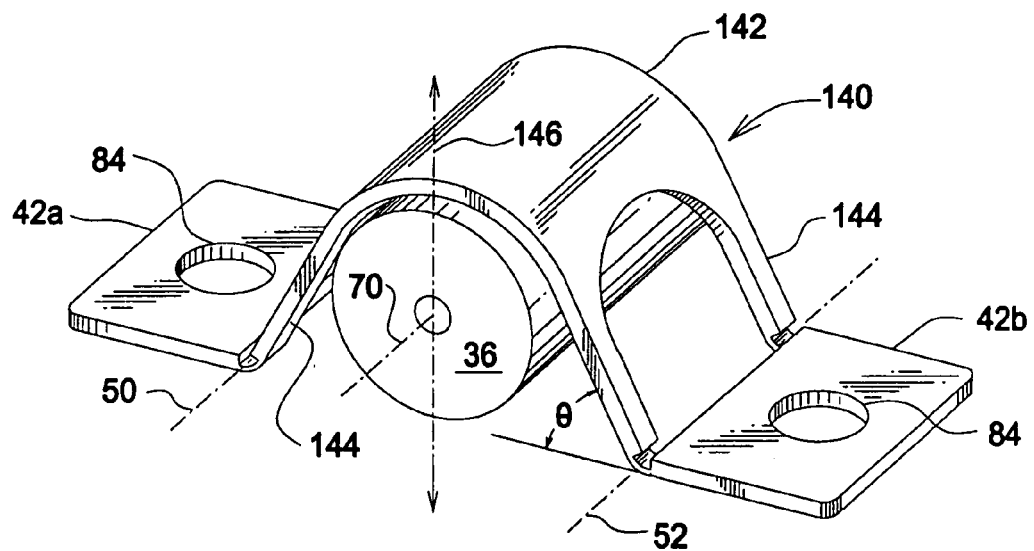
FIG. 8 is a diagrammatic, perspective view of another alternative implementation of the support bracket of the present invention, shown here to illustrate details of its structure, including a flexible link or web member hingedly attached to a pair of feet.

Turning to FIG. 8, another alternative implementation of the support bracket of the present invention is generally indicated by the reference number 140. It is noted that previous implementations may be described generally as having four relatively stiff plates that are hinged to one another along three hinge axes. In contrast, bracket 140 includes a flexible link or web member 142 which is hingedly attached between feet 42a and 42b along hinge axes 50 and 52, respectively, and which is symmetrical with respect to both of the feet including a pair of legs 144 arranged symmetrically to either side of optical component 36. Moreover, the latter is attached in a symmetrical manner to a midpoint of link 142. In this implementation, with equal movements of the feet towards and/or away from one another, optical component 36 may be moved along a vertically oriented predetermined path 146. It should be appreciated, as will be further described that optical component 36 may be mounted and/or the symmetry of link 142 may be modified in ways that provide for a nonlinear predetermined path with equal movements of the feet towards and/or away from one another.

Figure 9:
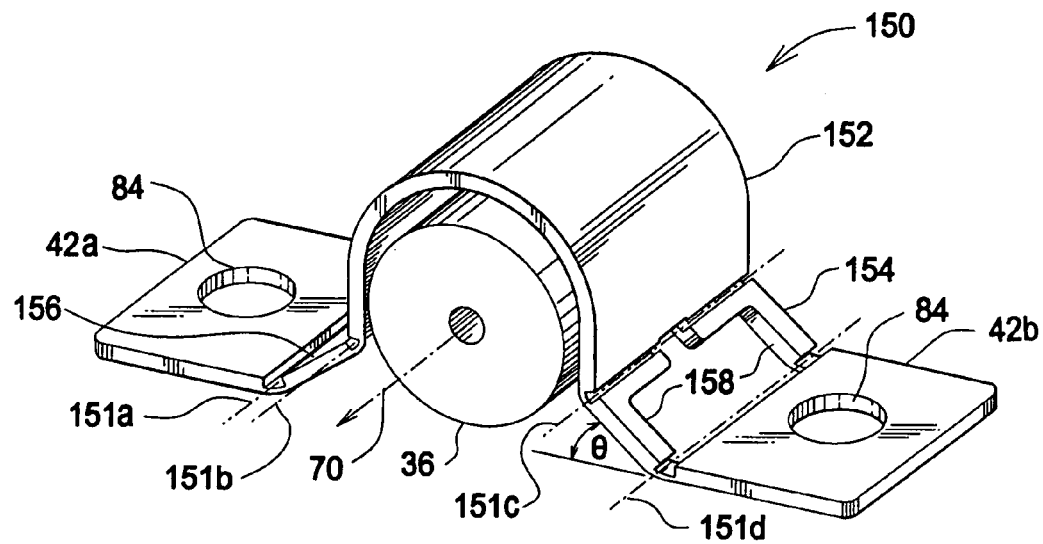
FIG. 9 is a diagrammatic, perspective view of still another alternative implementation of the support bracket of the present invention, shown here to illustrate details of its structure including four hinges arranged within the overall structure.

Referring to FIG. 9, still another alternative implementation of the highly advantageous support bracket of the present invention is generally indicated by the reference numeral 150. Bracket 150 exemplifies a symmetrical implementation which may be generally characterized as having four hinge axes 151a–d interconnecting five plates. Specifically, a support link 152 is hingedly connected between symmetrically arranged hinge links 154 and 156. Each hinge link is made up of a pair of legs 158 having opposing ends, each of which is hinged to one of the feet and to the support link. As will be seen, this basic four-hinge structure is highly flexible and may be modified in essentially an unlimited number of ways in accordance with the teachings herein. As one example, the support link may comprise a planar platform (not shown). In the present example, optical component 36 is attached to the curved support link along opposing side margins. This attachment scheme is in no way intended as being limiting. Moreover, symmetrical attachment is not required. Like previously described bracket 140, symmetrical configuration of bracket 150 provides for movement of optical component 36 along a vertical path in the view of the figure. Other appropriate arrangements may provide, for example, for movement along an arcuate path.

Figure 10:
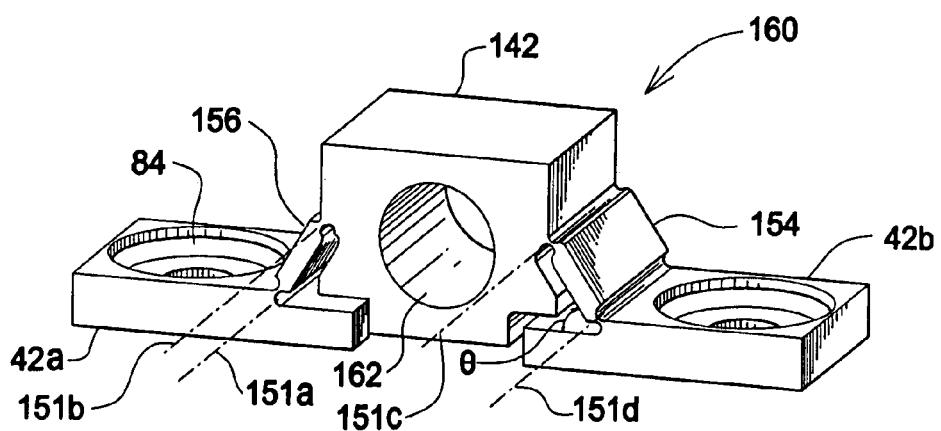
FIG. 10 is a diagrammatic, perspective view of another implementation of the support bracket of the present invention, showing an alternative form of a four hinge bracket.

Directing attention to FIG. 10, yet another alternative implementation of the support bracket of the present invention is generally indicated by the reference number 160. Bracket 160 is another example of the four-hinge bracket implementation and is further intended to provide a very rigid support link 152 for supporting an optical component (not shown) within a cavity 162. It is noted, with the exception of bracket 160 of FIG. 10, that the highly advantageous brackets described herein may be formed at low cost for example by stamping, etching, or cutting sheet material. These structures (including bracket 160 of FIG. 10) may also be fabricated, for example, by EDM machines, thereby producing parts that may be more expensive in terms of relative cost, but may also be more rigid and exhibit higher tolerance in certain directions.

Referring to FIGS. 2 and 8–10, it should be mentioned that the structures of these brackets act as a reducing lever to the extent that relative motion of the feet toward and away from one another, for example, as a result of weld shift, is reduced by a factor which may range from 2 to 10 for vertical motion of the optical component. The factor that is achieved, of course, depends on the specific implementation and may be tailored to suit design motivations. One influencing parameter with regard to the reduction factor is the choice of angle θ (shown in FIGS. 8 and 9) defined between the feet and hinge links. It is noted that the structure of FIG. 7 provides a similar advantage in the context of one modified orientation of the feet and support surfaces.

As described above and generally in contrast with the prior art, the present invention has adopted an "indirect positioning" approach whereby an optical component is aligned relative to a light path, for example, by manipulating the feet of a support bracket which, in turn, supports the optical component. Having familiarized the reader with a number of implementations of support brackets produced in accordance with the present invention, a discussion of more detailed design considerations will now be undertaken.

Initially addressing somewhat broad structural considerations, a structure usable for indirect positioning consists of one or more rigid or flexible support members interconnected by hinges. The purpose of the structure is twofold: to provide support between the optic and the mounting surface during and after positioning and attachment; and to facilitate well-controlled and well-defined (predictable) positioning of the optic by manipulation of the feet during positioning and prior to attachment of the feet. In the discussions immediately hereinafter, specific designs and methods are described which may, at the least, be desirable to the end of achieving optimized performance by various support arrangements/brackets, as defined by the following attributes:

Well-controlled, predictable motion of the optic along a predetermined path, as determined by relative motion of the feet in the plane of the mounting surface or surfaces.

In some cases, it may be desirable to design the support structure's kinematics to provide reduction in motion of the optical component caused by weld shifts at the feet.

Hinges should be designed to provide ease of rotation about a well defined axis.

The support structure should be designed so that post-attachment, it is sufficiently rigid to withstand forces due to specified shocks and vibrations. For practical use in many applications, the support structure of the present invention should be designed to withstand several thousand g's and, thereafter, elastically recover a pre-shock position.

The support structure and method of the present invention is designed to be compatible with so called "active alignment" methods typically required in high-grade fiber optics packaging.

Feet should be configured to be easily manipulated using readily implemented manipulation tools.

The manipulation tools should be sufficiently rigid to provide for well controlled motion, but not so large and bulky as to compete with each other or the support bracket for space within the allowed real estate for a given application.

Foot attachments such as, for example, weld joints should provide sufficient strength and rigidity with a minimal amount of weld shift and warping at the feet, as well as minimize long term creep or time-dependent positional shift.

Aside from incorporating all of the foregoing features, support structures should be manufacturable at reasonable cost, preferably for less than one USD.

(It is noted that all of these attributes are considered as being readily achievable in view of the teachings herein.)

Still addressing structural considerations in a broad sense, the technique the present invention (i.e., directly manipulating a foot of a support structure, with or without a highly advantageous spring-attenuation feature which is yet to be described), may be applied in the context of a variety of support structures. For this reason, various classes of support structures will now be described as a supplement to discussions appearing above which are considered as themselves enabling one of ordinary skill in the art to practice the invention. These supplemental descriptions take a still more fundamental approach than those descriptions which appear above in order to provide a conceptual understanding of the operation of the subject support structures and to emphasize the very broad range of equivalents which are considered as within the scope of the present invention. Accordingly, three structures are described that are considered as being useful; however, these structures are exemplary in nature and are not intended as limiting. In this regard, the concepts described herein are equally applicable over a wide range of structures that may be fabricated based on the same building blocks. That is, rigid or elastic links connected by hinges.

Figure 11:
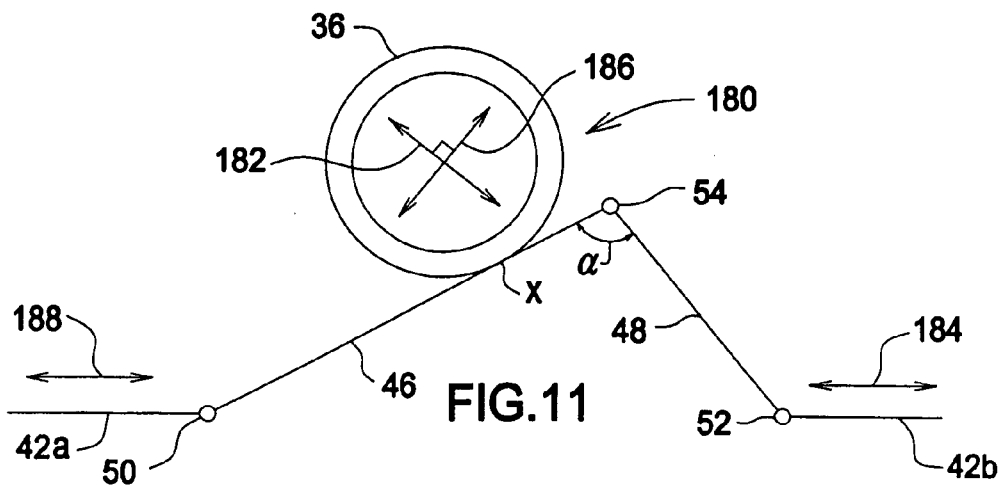
FIG. 11 is a diagrammatic, elevational view of one class of support bracket, produced in accordance with the present invention, shown here to illustrate its use of three hinges.

Referring to FIG. 11, one class of support structure is shown diagrammatically in FIG. 11, generally indicated by the reference number 180, having three hinges 50, 52 and 54 interconnecting two links, 46 and 48 and two feet, 42a and 42b. It is noted that previously described support 40 of FIG. 2 resides within this class. By moving either of foot 42a or 42b, optical component 36 moves in a precise arcuate path; coordinated motion of both feet may be used to move the optical component along a straight path (or any predetermined path) in any direction within the plane of the figure. The optical component is attached at a point X and is preferentially located on longer link 46, although it may be attached to either link. With foot 42a stationary, optical component 36 moves along an arcuate path 182 with movement of foot 42b, as indicated by a double-headed arrow 184. With foot 42b stationary, optical component 36 moves along an arcuate path 186 with movement of foot 42a, as indicated by a double-headed arrow 188. The designer may preferentially choose link lengths, nominal angle α, formed between the links, and a length between hinge axis 50 and point X such that paths 182 and 186 are nearly orthogonal when either foot is moved alone, as illustrated. As an alternative (not shown), a configuration of particular interest and which may be referred to as a dwell mechanism, provides very high attenuation along one direction. In terms of another alternative, it should be appreciated that the structure of FIG. 11, consistent with most if not all support structures described herein, may be implemented having a single foot while still achieving a significant number of advantages. For instance, hinge axis 50 may be fixedly hinged to any sort of underlying structure in an immovable manner. Movement of foot 42b is then performed for all alignment purposes.

Figure 12:
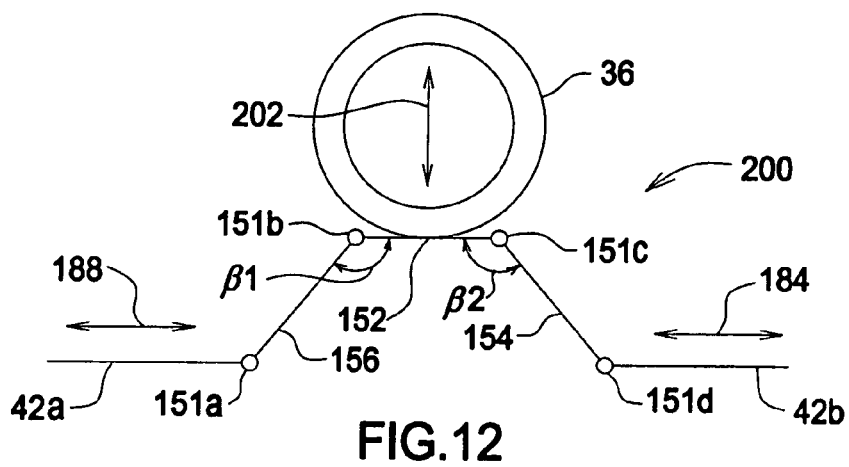
FIG. 12 is a diagrammatic, elevational view of another class of support bracket, produced in accordance with the present invention, shown here to illustrate its use of four hinges.

Referring to FIG. 12, another class of support structure is diagrammatically illustrated and indicated generally by the reference number 200. Structure 200 includes four hinges 151a–d. Support platform 152 is symmetrically supported by a pair of hinged support links 154 and 156. An opposing end of each support link is hinged to one of feet 42. It is noted that previously described support 150 of FIG. 9, as well as support 160 of FIG. 10, fall within this class. By moving either foot, optical component 36 moves in a precise path 202 that is at least generally normal to the plane of the feet. It is noted that that this structure is under-constrained. That is, support link 152 and the optical component supported thereby are, at least potentially, able to rotate regardless of the foot position. In order to minimize parasitic rotations of support link 152, the design should ensure that symmetrically arranged hinges have the same rotational stiffness. For example, hinge axes 151a and 151d should share a first rotational stiffness while hinge axes 151b and 151c should share a second rotational stiffness. Also, the feet, in this particular embodiment, should remain coplanar. To further reduce the effect of any parasitic rotation, optical component 36 may be spaced from support link 152 such that the optical component resides at the centro of the mechanism. Although this latter structure, including well-designed, elastic hinges, does not require this configuration, it reduces optic motion due to long-term creep that can occur in any structure. As angles β1 and β2 approach 90 degrees, it is noted that the out-of-plane (i.e., normal to the plane of the feet) attenuation becomes arbitrarily high, but the sensitivity of support link 152 to parasitic rotation also increases. Accordingly, one design consideration balances range-of-motion with attenuation.

Figure 13:
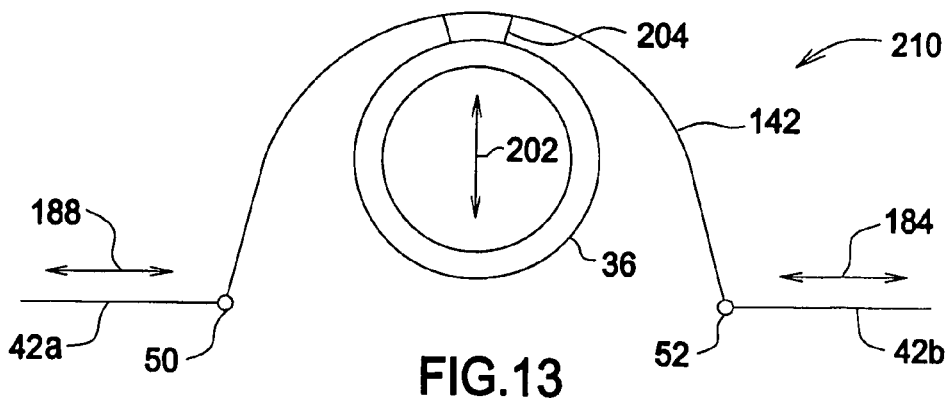
FIG. 13 is a diagrammatic, elevational view of still another class of support bracket, produced in accordance with the present invention, shown here to illustrate its use of a flexible link or web member.

Referring to FIG. 13, still another class of support structure is diagrammatically illustrated and indicated generally by the reference number 210. Structure 210 includes two hinges 50 and 52 connecting single, flexible link 142 between feet 42a and 42b. It is noted that previously described support structure 140 of FIG. 8 falls within this class. Like structure 200 of FIG. 12, coordinated motion of feet 42, in the directions indicated by double-headed arrows 184 and 188, moves optical component 36 along path 202, again normal to the plane of the feet, with an attenuation determined by the curvature of the flexible link. Tighter curvature provides higher attenuation but less range of motion. Flexible link 142 comprises a single elastic beam which replaces the three links and two hinges of the FIG. 11 structure which, for a structure of similar overall size and profile, provides a significantly greater range of motion of the optic for a corresponding attenuation. Optical component 36 may be located close to the plane of the feet to minimize parasitic rotation caused by any offset of the optic from the exact mid-span of link 142. In this example, optical component 36 is attached to link 142 by a mount 204.

Referring collectively to FIGS. 11–13, despite a diversity in the outward appearance of these structural classes, there is a shared, highly advantageous feature: the optical component supported thereby may be manipulated in three degrees of freedom solely by (i) sliding the feet, relative to each other for a vertical component of motion and/or (ii) moved together in tandem or unison for horizontal motion, wherein a planar support surface is slidingly engaged by the feet. As a further shared advantage, kinematic structures produced in accordance with the teachings herein may be configured to attenuate weld shift such that the motion of the optical component is less than the shift at the feet. At the same time, the bracket structure and method of the present invention serves to significantly reduce spring-back stemming from tool release. This reduction may be seen to be at such levels that tool release spring back is essentially eliminated.

With regard to optical component placement, one extension (not shown) of the previously described kinematic structures is practiced by offsetting the optical component either along its optic axis or laterally with respect to the optical axis. The optical component may be cantilevered generally along the optical axis so that the positioning structure and the optic are not coplanar. This implementation is potentially useful in applications where the optic must be placed very close to another component such as, for example, a laser diode or another optical component, or when the support structure is attached to large feet for some purpose. Fashioning the entire support structure using solid links, that resist structural twisting, prevents such a cantilevered optic from exhibiting undesired motion such as, for example, "wagging" during foot manipulation.

As another extension of the foregoing teachings, a beam (not shown) may be used to laterally offset the optical component from any structure such that the optic overhangs one foot. This arrangement is useful, for example, when the optic must be placed laterally as close as possible to other components or to an enclosure wall of the device package. Of course, a beam arrangement may, in combination with lateral offset from a light path, provide offset along the light path. As still another extension of the foregoing teachings, two or more kinematic structures may be attached to a monolithic object such as, for example, an elongated object to control both location and angle. Elongated objects include, but are not limited to lens arrays or v-groove arrays.

Attention is now directed to specific details with regard to hinge design. In particular, the support structures disclosed herein utilize two types of hinges, both of which may be created by reducing stock thickness, by through-cutting a stitch-like pattern, along a strip that spans the structure or by any suitable combination thereof. The three-hinge structure exemplified by FIG. 11, uses plastic hinges. The four-hinge structure, exemplified by FIG. 12, uses elastic hinges. The flexible member structure, exemplified by FIG. 13, may use either plastic or elastic hinges.

Plastic hinges are designed to yield at very small angular displacements and to produce rotation about a constant point. Ideally, such plastic hinges provide unlimited angular displacement for a constant applied moment, but due to strain-hardening of most metals, the required moment will increase with angular deflection and the number of cycles, which could restrict structural range-of-motion. Accordingly, plastic hinges should be designed to be narrow relative to the link or stock material thickness, while not exceeding the ultimate strength of the material during direct foot manipulation. Typically, the use of a metal in an annealed condition is advantageous.

Elastic hinges, also known as flexures, allow the four-hinge structure of FIG. 12 to move in a repeatable way by acting like rotational springs. Because the hinges are essentially small beams, the virtual hinge axis of each hinge moves slightly as the links rotate. For the small excursions that these structures typically experience, these hinge configurations approximate a perfect hinge in a highly advantageous manner.

Residual stress due to forming and manipulation will cause changes in the internal stress state of any hinge over the lifetime of the hinge structure: the three-hinge structure of FIG. 11 is kinematically fully constrained and insensitive to this creep. The hinge stresses in the four-hinge structure, however, should remain well below the yield stress of the hinge material to prevent drift of the optical component over time. In general, any kinematically under-defined structure with plastic hinges will not behave well during manipulation, is susceptible to creep, and is of very limited use for sub-micron alignment. Accordingly, the present invention favors the use of elastic hinges in such a structure.

Optical component support structures are typically required to exhibit resistance to shock and resonant vibration that could cause misalignment. One common vibration specification requires operation of a device while shaking sinusoidally from 20 to 2000 Hz at 20 g's peak. The support structures of the present invention are generally advantageous in this regard since the first mode of these support structures is typically well above 2 kHz. Also, the support structures of the present invention may be fabricated using a large range of materials, typically metals 0.005" to 0.015" in thickness whereby choosing dimensions to satisfy vibration testing is a relatively straightforward design consideration. Structures having a flexible link such as show in FIG. 13, typically have a lower first resonance than those structures with rigid links. The modes of a structure incorporating a flexible link may be tuned, for example, by appropriate positioning of the lens.

The shock specification for an optoelectronic device typically requires surviving a haversine pulse with a peak acceleration of up to a few thousand g's. For the exemplary classes of structures shown in FIGS. 11–13, design considerations include:

For the three-hinge structure of FIG. 11, which is fully constrained, the hinges are generally not rotatable responsive to shock. Accordingly, the links between the hinges should be configured to prevent plastic deformation.

For the four-hinge structure of FIG. 12, which is under constrained, the hinges themselves should be configured to prevent plastic yielding. Design formulas for flexural hinges which account for such concerns may be found in the prior art.

For the flexible-link structure of FIG. 13, the two hinges should be configured, for example, based on physical size to prevent plastic yielding; as a competing concern, however, if the hinges are too large, additional force will be required to move the feet. As a further enhancement, the first resonance of the structure may be tuned by varying offset of the optical component from the flexible link using any suitable mounting arrangement.

The feet of all support structures of the present invention should be sufficiently large in footprint and sufficiently thick to prevent moments, arising from shock, from causing yielding at attachment points such as, for example, weld edges. Proper mechanical shock design will provide a structure which may resonate responsive to the initial receipt of the shock force, but will return elastically to its pre-shock aligned position in view of the teachings herein and in combination with the capabilities of one having ordinary skill in the art relating to mechanical shock design.

The present invention provides many advantages for the active alignment methods used in manufacturing including higher device yield, faster alignment, and the use of less expensive robots and lasers. During active alignment, either a technician or software observes the coupling of light (or "insertion loss") through the optical component to inform the motion of the positioning structure. Because only a single feedback variable, the optical coupling, is used to control multiple position variables, any error between the expected and actual position of the optic increases the time and complexity of the alignment. The prior art describes alignment techniques that seem to rely on minimizing this positioning error such as exemplified by the Webjorn application, described above. Unfortunately, other techniques, exclusive of Webjorn and of which Applicants are aware, require an iterative procedure with multiple tool engagements, thereby adding time and risk of inaccuracy. The support structures of the present invention, on the other hand, are compatible with robust, high-yield active alignment techniques. It should be emphasized that this is an important advantage at least for the reason that alignment of optical components in a device is one of many production steps, and necessarily occurs toward the end of the device manufacturing line where any re-work at such a late stage in the overall manufacturing process is costly or impractical.

With further regard to manufacturing processes, it is submitted that the support structures of the present invention and associated method are completely compatible with standard volume manufacturing processes. The present invention contemplates binned or tape-fed structures being coarsely positioned within the package by a robotic arm. A machine-vision system, for example, then guides the tools into position with a resolution of a few thousandths of an inch until engaging the feet of the support structure. The structure, in one technique, is coarsely manipulated to produce a zigzag motion at the optical component during the movement mode until first light is found. At this point, active alignment begins using a "peak-find" algorithm. This latter step, however, is completely unlike procedures seen in the prior art at least for the reason that a known positional relationship between the feet correlates to a known position of the optical component within acceptable tolerance limits. Once the position is optimized, the manipulation tool increases clamp force on the feet in the attachment mode, for example, to a few pounds for positionally affixing the feet, for example, by welding. Still further procedures may then be undertaken to finely position the optical component, for example, using a highly advantageous foot arrangement which will be described below.

It is to be understood that a variety of alternative features may be provided on support structure feet to be engaged by appropriately configured tooling thereby being considered to fall within the scope of the present invention as generally encompassing any support structure having feet configured for direct manipulation. In the foregoing descriptions, tool 90 of FIGS. 3–5 and tool 90' of FIG. 6, fit just inside the weld region. This form of tool includes a central hole or passage in order to allow clearance for a laser weld beam. The tool moves the foot by pressing against inner side wall 86 of the weld region. The same tool concurrently biases the foot downward, applying biasing force just around the periphery of the weld region. Advantages of this scheme include:

Minimized tool liftoff shift caused by warped feet or any other deviations from perfect flatness in either the foot or the mounting surface, since the tool is engaged in close proximity to the weld region.

Tool engagement requiring no additional features on the foot other than those already provided by the weld area and peripheral sidewall.

Figures 14, 15:
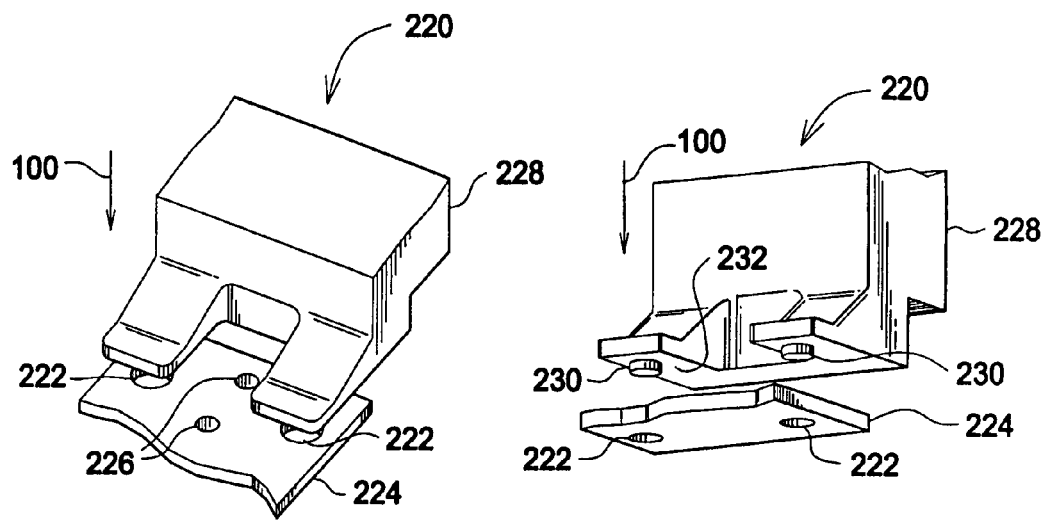
FIGS. 14 and 15 are diagrammatic, perspective views which collectively illustrate a highly advantageous first exemplary, alternative scheme for direct foot manipulation in accordance with the present invention.

Referring to FIGS. 14 and 15, attention is directed to a first exemplary, alternative scheme for direct foot manipulation which is generally indicated by the reference number 220. Specifically, holes or recesses 222 may be provided for engaging a foot 224 (partially shown) away from one or more weld areas 226, a pair of which is shown. As seen in FIG. 15, recesses 222 are formed as through-holes, but this is not a requirement for purposes of positive tool engagement. A foot manipulation end of a manipulation tool 228 includes a pair of manipulation pins 230 (FIG. 15) that are configured for engaging recesses 222. Consistent with previously described implementations, manipulation tool 228 includes a lowermost surface 232 (FIG. 15) that is configured for applying biasing force 100 against the foot for operation in the aforedescribed movement and attachment modes. In using this configuration, for example, with laser welding, there is no need to pass the laser beam through a central passage within the tool, since the welds are made sufficiently away from the body of the tool. This approach provides for the use of relatively smaller holes for both the weld areas and the tool engagement recesses. Moreover, this configuration provides for control of foot angle for affecting structural twist. That is, manipulation tool 228 may apply a twisting or rotational force to foot 224. Using just this twisting motion, orientation parameters of the optical component may be adjusted in additional degrees of freedom including, for example, pitch with respect to the light path.

Once initial welds are made in weld regions 226, tool 228 may be removed in order to form welds in recesses 222, if desired, which were initially used for engaging the tool. In this regard, such multiple welds may provide added strength and stability at no cost in real estate, since multiple positions were initially used by the manipulation tool. In view of this alternative implementation and those yet to be described, it should be apparent that a wide range of modified, but equivalent arrangements are foreseen including, but not limited to placements and numbers of attachment and manipulation features.

Figures 16, 17:
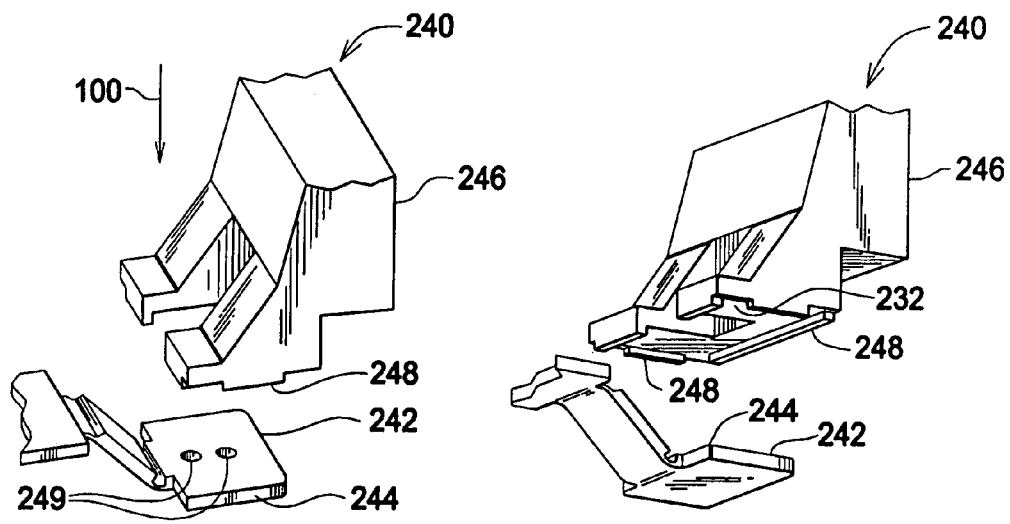
FIGS. 16 and 17 are diagrammatic, perspective views which collectively illustrate a highly advantageous second exemplary, alternative scheme for direct foot manipulation in accordance with the present invention.

Turning now to FIGS. 16 and 17 a second exemplary, alternative scheme for direct foot manipulation is generally indicated by the reference number 240., In this implementation, a foot 242 is provided having an outermost periphery 244. A movement end of a manipulation tool 246 is shown hovering over foot 242 for purposes of clarity and consistent with other figures. Tool 246 includes a peripheral tab configuration 248 at its foot engagement end which generally surrounds outermost periphery 242 of foot 240 during foot manipulation and holding through application of biasing force 100. As an advantage which is shared by all of these implementations, foot 242 and tool 246 cooperate for operation during the manipulation and attachment modes. In the present example, a pair of weld pockets or attachment points 249 are provided. It should be appreciated that a single weld feature may be used to provide a still more compact configuration of foot 242.

Figures 18, 19:
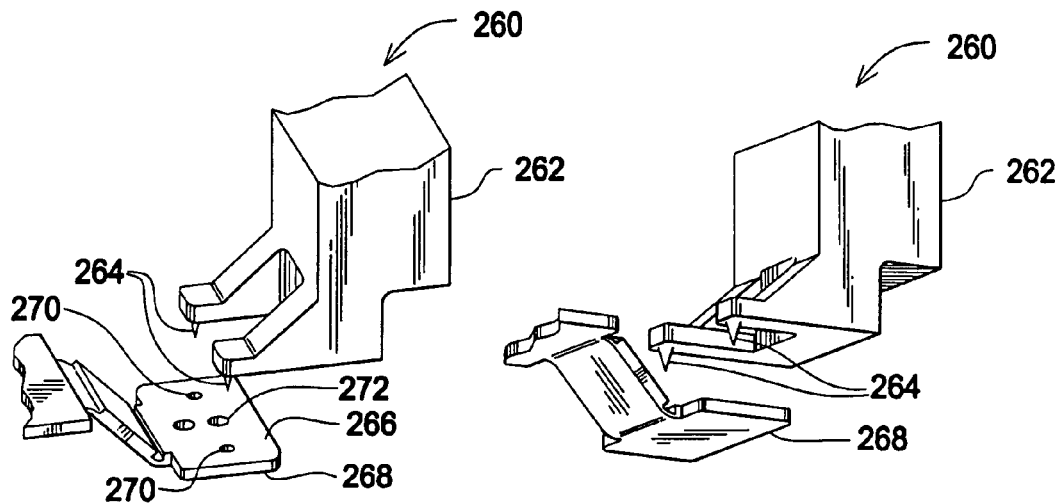
FIGS. 18 and 19 are diagrammatic, perspective views which collectively illustrate a highly advantageous third exemplary, alternative scheme for direct foot manipulation in accordance with the present invention.

Referring to FIGS. 18 and 19 a third exemplary, alternative scheme for direct foot manipulation is generally indicated by the reference number 260. In this implementation, a manipulation tool 262 is provided having a pair of hard, sharp tips 264 that engage a upper surface 266 of foot 268 by "digging" into the foot material itself. In one form, tips 264 may be conical or pyramidal in shape. When engaged, tips 264 displace foot material to form small divots 270. A pair of weld regions 272 are also illustrated. In order to insure anticipated operation, material comprising surface 266 of foot 268 should be somewhat softer than the tool tip; an annealed foot and carbide tool tip are well-suited materials, although a semi-hard foot steel is acceptable. Moreover, surface 266 and tips 264 are cooperatively configured to provide proper operation in the movement and attachment modes. For example, excessive penetration of the tips into the foot, as a result of applying biasing force 100 in the attachment mode, should be avoided so as to prevent "sticking" of the tips in the foot or even penetration through the entire thickness of the foot, which results in loss of biasing force. This implementation offers several advantages in conjunction with advantages shared with other implementations. Specifically, tool 262 may engage the foot at any point over a relatively large area, requiring less positional accuracy prior to engagement; additionally, there is essentially no hysteresis present between the tool and the foot during manipulation.

Figures 20, 21:
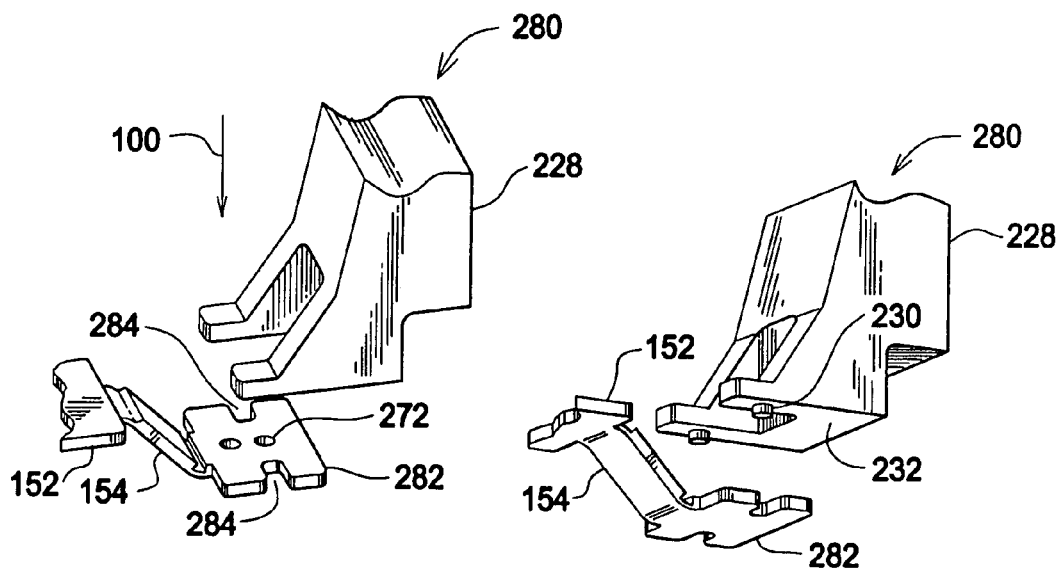
FIGS. 20 and 21 are diagrammatic, perspective views which collectively illustrate a highly advantageous fourth exemplary, alternative scheme for direct foot manipulation in accordance with the present invention.

Referring to FIGS. 20 and 21, a fourth exemplary, alternative scheme for direct foot manipulation is generally indicated by the reference number 280. In this implementation, manipulation tool 228 of FIG. 15 is used including spaced-apart manipulation pins 230. A directly manipulable foot 282 is formed including an opposing pair of manipulation notches 284 formed in sidewall margins of the foot such that during engagement with manipulation tool, with application of biasing force 100, movement tolerances are controlled between the manipulation tool and foot.

With regard to manipulation tool design, tool surfaces which apply biasing force 100 may be coated with an anti-friction material such as, for example, TEFLON® fluoropolymer to allow the tool to move smoothly over the foot while any tolerance gap between the tool boss and foot is traversed. For example, with reference to FIG. 3, a tolerance gap is traversed between manipulation shoulder 98 of the manipulation tool and peripheral sidewall 86 of the weld region during engaged movement. While this hysteresis is traversed, higher frictional values between the foot and mounting/support surface ensures that the foot does not move on support surface 45. It is emphasized that, with the appropriate choice of tool and foot geometries, the amount of hysteresis is constant and readily incorporated into an active alignment control scheme. One option, which eliminates hysteresis, resides in the use of a cone-shaped tool tip (not shown) that completely engages peripheral sidewall 86. The tool and sidewall should be configured in a cooperative manner so as to avoid sticking of the tool for contemplated values of biasing force 100. Appropriate coatings may be applied, for example, to a cone-shaped tool tip in order to further enhance non-stick behavior.

With regard to precision control of foot motion, surface anomalies at the interface between the foot and the mounting surface may cause small variations in frictional force. If the tool and motion system are flexible and springy in the manner of some prior art arrangements, bending of the tool and motion system is produced due to sticking action. This action can then randomly unleash large and unpredictable movements which makes precision control difficult. Such motion is classically presented any time a changing force is applied to a spring-like element connected in series to a friction element. The present invention avoids such unpredictable stick-slip behavior by using flexure-based motion stages with a stiffness of at least 1 Newton per micron and tools that are at least ten times as stiff. Also, it has been found, as an example, that the friction at the manipulation tool/support surface interface is very constant when clean steel with a surface finish of 8 to 32 micro inches is used. Empirical results have demonstrated consistent incremental foot motion of 0.1 micron using an arrangement similar to that described with regard to FIGS. 3–5.

The support structures of the present invention may be fabricated using any or a combination of techniques either presently known or yet to be developed. The former includes, for example, PCM (photochemical machining or chemical etch), EDM (electro-discharge machining), laser cutting, stamping/forming, or electroforming. PCM is presently the least expensive method for high volume (tens of cents per part) and produces completely stress-free parts, but it requires a minimum feature size that is approximately stock thickness, which limits the amount of miniaturization possible. Wire EDM can produce features as small as 0.003 inch slot width in any thickness material, and the sheet stock may be stacked to cut 50 to 100 structures in one pass of the wire. Laser cutting can produce arbitrarily small features and advanced shops can produce etched-down areas, but the per-part cost does not drop with quantity. It is submitted that electroforming can be economical in quantity, but restricts the choice of material. It is further submitted that stamping is not generally preferred, since it tends to distort parts with a high aspect ratio.

Figure 22:
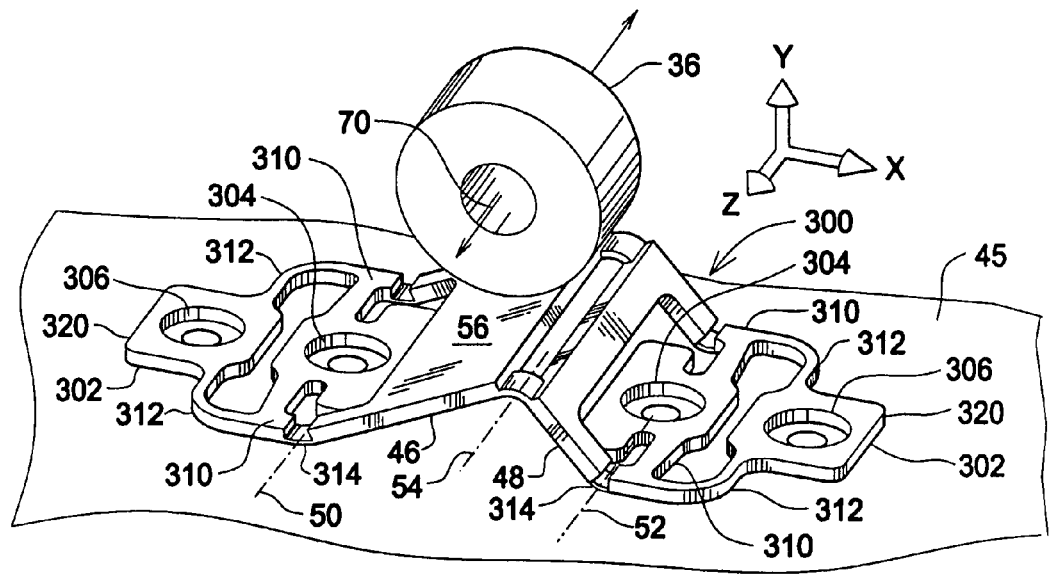
FIG. 22 is a diagrammatic, perspective view of a support bracket, produced in accordance with the present invention, including highly advantageous fine-positioning feet.

Turning to FIG. 22, a highly advantageous support bracket, produced in accordance with the present invention, is generally indicated by the reference number 300. It is noted that support bracket 300 falls generally within the aforedescribed three-hinge class such as previously illustrated, for example, by FIGS. 2 and 11. To the extent that this bracket is essentially identical to brackets already described, descriptions will not be repeated for purposes of brevity and the reader is referred to those descriptions which appear above. The way in which bracket 300 does differ from those brackets previously described comprises a highly advantageous improvement which provides still further advantages over those already sweeping advantages described above with respect to the prior art. In particular, bracket 300 includes highly advantageous fine positioning feet 302 (which may be referred to individually as foot 302). As will be further described, each foot 302 includes a soft-spring stiff-spring configuration, which may also be referred to as a spring-attenuation configuration, having a fine positioning adjustment capability which is highly advantageous, particularly with regard to positional compensation for attachment shifts.

Still referring to FIG. 22, it should be appreciated that bracket 300, with its fine positioning feet, is readily adaptable for using support surface configurations in the manner described above with regard to other support brackets of the present invention. For example, the feet may be supported on different surfaces, by curved surfaces and/or by surfaces that are non-parallel with respect to one another.

Figure 23:
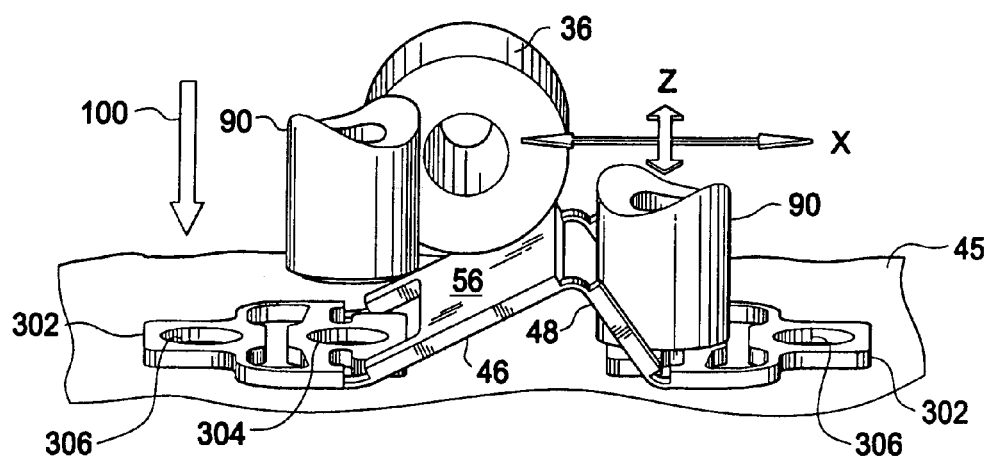
FIG. 23 is a diagrammatic, perspective view of the support bracket of FIG. 22, further illustrating coarse positioning utilizing one or both of a pair of manipulation tools in accordance with the present invention.

Turning to FIG. 23 in conjunction with FIG. 22, for purposes of the present example, bracket 300 will be described as being supported by support surface 45. Initially, it is noted that each foot 302 includes a lowermost surface (not visible) which is configured for sliding engagement against support surface 45. As in those foot implementations described above, each foot 302 is configured for movement in a movement mode, in a plane along x and z axis indicated by crossbar arrowhead lines, as well as for being held against the support surface in a way that is intended to prevent movement in an attachment mode, based on the value of aforedescribed biasing force 100. With regard to the implementation of the movement and attachment modes as bearing on the specific configuration of foot 302, the reader is referred to discussions which appear above.

Figure 24:
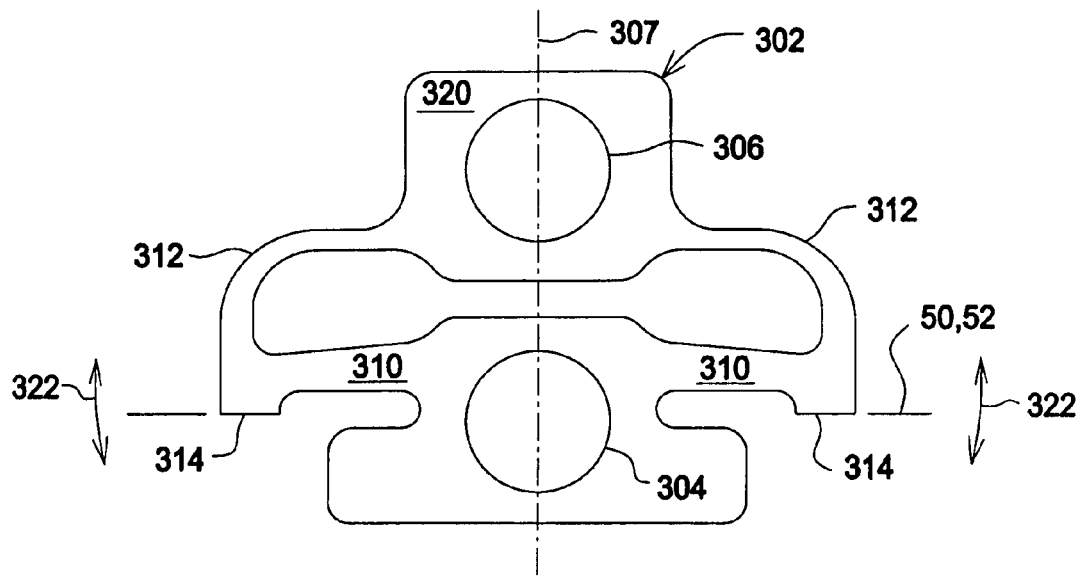
FIG. 24 is a still further enlarged diagrammatic, plan view of the foot used on the bracket of FIGS. 22 and 23, shown here to illustrate further details of its structure, particularly related to its highly advantageous fine-adjustment capabilities.

Referring to FIG. 24 in conjunction with FIGS. 22 and 23, the former figure is a still further enlarged view of foot 302 shown here for illustrating details of its structure. Considering the specific structure of fine-adjust foot 302, each foot includes an inner manipulation/attachment position 304 and an outer manipulation/attachment position 306, either of which may be referred to as a manipulation position or as an attachment position, depending on the particular context of the discussion, since these positions serve in dual roles. In one implementation, these attachment positions or regions may be configured in a manner that is consistent with attachment region 84, described in detail above. As will be further described, foot 302 is symmetrically arranged on either side of an axis of symmetry 307. The use of bracket 300 is essentially identical to the use of bracket 40 described above to the extent that inner positions 304 may serve in the capacity of previously described attachment regions 84 (see FIGS. 2 through 5). Specifically, optical component 36 may at least be coarsely positioned using inner manipulation positions 304. To that end, FIG. 23 illustrates one manipulation tool 90 engaging one of the inner manipulation positions while another manipulation tool 90 is shown hovering immediately above the other inner manipulation position. Upon engaging both manipulation tools with the pair of inner manipulation positions, "coarse" adjustment of bracket 300 may be performed so as to at least generally align optical component 36 with respect to light path 70 and along indicated x, y and z axes. In this regard, it should be appreciated that the term coarse is used as being descriptive of an initial alignment step. The use of bracket 300 in this manner, remarkably, has been found to be capable of achieving an alignment tolerance of approximately 1 micron using the teachings above, particularly with regard to employment of the movement mode and attachment mode. Moreover, as also described above, there is always some potential for the production of an attachment shift, responsive to attachment of inner positions 304 to support surface 45, for example, using laser welding, spot-welding, adhesives or any other suitable attachment method. As will be seen, foot 302 is configured in a highly advantageous and heretofore unseen manner with regard to attachment shift compensation.

Referring collectively to FIGS. 22 through 24, but with particular reference to FIG. 24, it is appropriate at this juncture to continue the description of the structure of fine-adjust feet 302. Each foot includes a pair of stiff beams 310 and a pair of arcuate-shaped soft beams 312. Stiff beams 310 extend at least generally from inner position 304 outwardly having an outer end that is proximate to a pair of hinging positions 314 on the foot, arranged along one of hinging axes 50 or 52. Accordingly, the outward ends of beams 310 move at least generally with the hinging positions at which links 46 and 48 of the support bracket 300 are hingedly attached to the respective feet. Outer position 306 of each foot 302 is formed within a tab 320 that is connected to and in communication with the outward ends of stiff beams 310, and thereby the hinging positions, through arcuate-shaped soft beams 312. As will be described in detail, the soft and stiff beams serve as soft and stiff spring-like or compliant elements, respectively, for the purpose of fine-adjustment of the position of optical component 36.

Still describing spring-attenuation foot 302 of the present invention, attention is now directed to the specific way in which this fine-adjustment foot is installed in order to accomplish fine positioning. Having accomplished coarse positioning relative to a light path, for example, in the manner illustrated by FIG. 23 wherein manipulation tools 90 at least achieve an initial alignment of an optical component supported by the feet, inner positions 304 are fixedly attached to support surface 45. The attachment may be performed in any suitable manner either presently available or yet to be developed such as, for example, laser welding or through the use of adhesives. As mentioned previously, some degree of attachment shift will generally accompany any of these attachment techniques. As will be further described, the present invention contemplates the use of spot-welding for purposes of achieving this attachment in a highly advantageous and unforeseen manner.

Figure 25:
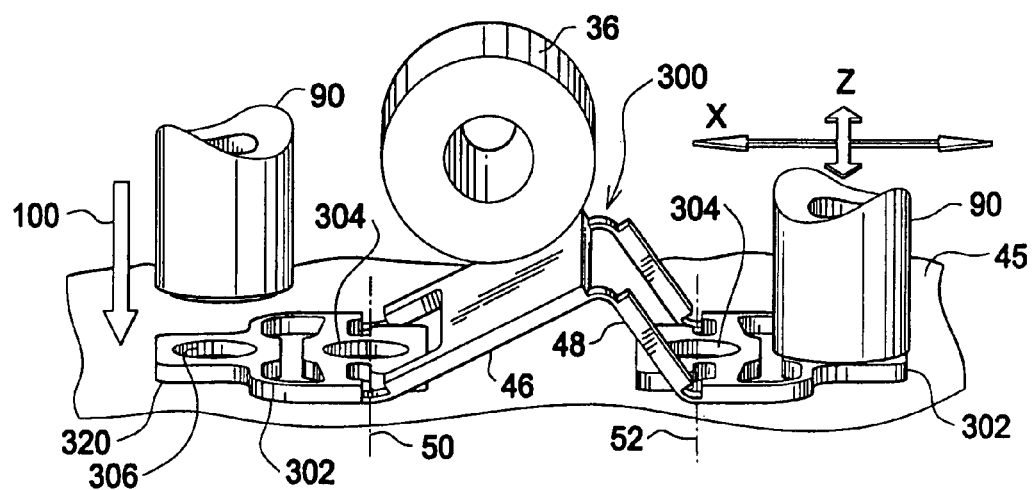
FIG. 25 is a diagrammatic, perspective view of the support bracket of FIG. 22 further illustrating a highly advantageous fine positioning and attachment process using one or both of a pair of manipulation tools in accordance with the present invention.

Referring to FIGS. 24 and 25, a fine-adjustment procedure is then employed after having attached inner positions 304 of feet 302 to support surface 45. In order to accomplish this task, manipulation tools 90 are moved to engage outer positions 306 of the feet as shown in FIG. 25. Manipulation of the outer foot positions then proceeds in a highly advantageous manner by deforming the foot against support surface 42 by moving engaged manipulator 90 at least along the x arrowhead line. It is important to understand that these outer, fine-adjustment positions may be manipulated either individually, or concurrently within the context of an overall fine-adjustment procedure. With regard to concurrent manipulation, outer positions 306 of foot 302 at either end of bracket 300 may be moved simultaneously in different directions or in parallel directions.

During fine-adjust manipulation of outer position 306 of each foot against attached inner position 304, the structure of foot 302 serves in a highly advantageous manner. In particular, stiff beam elements 310 have a relatively high stiffness K in relation to narrower, arcuate soft beam elements 312 having a stiffness k. Accordingly, manipulation of foot 302 slidingly against support surface 45 using outer position 306 serves to apply biasing forces to hinging positions 314 (FIG. 24) defined on the foot. Motion of the hinging positions is limited, however, by the higher stiffness of stiff beam elements 310. In this way, the motion of each foot is favorably attenuated by the factor $k/(K+k)$. In and by itself, this configuration is considered to be highly advantageous. Stated in a slightly different way, it is important to understand that foot 302, in a relaxed state, defines a footprint on support surface 45. This footprint, with manipulation of outer position 306, changes or deforms in way which serves to move hinging positions 314 at least generally along arcuate paths 322 thereby pivoting around attached inner position 304. Consequently, links 46 and 48 move so as to move optical component 36 in a highly advantageous spring-attenuated manner. In terms of modifications, the present invention considers any configuration as within its scope wherein changes in a footprint configuration or foot shape result in movement of optical component 36. In this regard, it should be appreciated that hinging positions 314 may be located at any suitable locations within the overall foot structure. Moreover, there is no requirement for a symmetrical foot arrangement, even though such an arrangement may serve as an enhancement in terms of predictability of optical component movement in view of contemplated foot motion.

It should be appreciated that changing the distance between positions 304 and 306 of each foot in any direction, while the foot is biased against support surface 45, is accompanied by movement of optical component 36. Movement of positions 304 and 306 of each foot toward and away from one another along line of symmetry 307 (the x axis in FIGS. 23 and 25) causes optical component 36 to move in an attenuated manner along a predetermined path in the vertically oriented xy plane (see path 76 of FIG. 2). Movements of outer position 304 having a component that is orthogonal to line of symmetry 307 serve to rotate both hinging positions 314 about attached inner position 304 in a manner which influences orientation parameters of optical component 36 in addition to its position in the xy plane.

Still referring to FIGS. 24 and 25, it is important to understand that bracket 300 is advantageous in respects beyond its already highly advantageous precision positioning capabilities. As one compelling example, horizontal weld shifts at outer attachment positions 306 result in correspondingly smaller shifts in stiff beam or spring elements 310. This translates to smaller shifts in the position of optical component 36. Likewise, vertical weld shifts at outer attachment positions 306 are also attenuated or reduced at the optical component, since such a weld shift must twist the foot structure about the inner attachment position 304 in order to shift the optical component. That is, the moment arm between hinge axis 314 and inner position 304 of each foot is short as compared to the moment arm between inner position 304 and outer position 306. As will be further discussed, hinge axis 314 essentially bisects inner position 314 such that the moment arm between the hinge axis and inner position is thought to be as small as is realistically possible. This feature, in and by itself, is considered to be highly advantageous.

It should be appreciated that, where the foot of the present invention is attached to support surface 45 at multiple attachment points, for example, by replacing inner attachment position 304 with two or more attachment points in the manner illustrated by FIGS. 14–21, the multiple attachment points cooperate in a manner which defines a pivot point or pivot region that is arranged between the attachment points. Accordingly, motion of hinging positions, as well as general deformation characteristics of the fine-adjust foot of the present invention, may be characterized as pivoting about the defined pivot point or, alternatively, about a pivot region.

While "soft-spring stiff-spring attenuation", which may be referred to herein as "spring-attenuation," is known in the field of mechanical engineering of precision instruments, it is important to understand that the prior art, to Applicant's knowledge, is entirely devoid of any applications wherein this principle has been used specifically to attenuate weld shifts in optical component mounting applications. For example, in conventional instruments, spring leverage is used to attenuate motion of a positioning screw to achieve finer positioning resolution than that of the screw. The present invention, in contrast, is considered to apply this principle in a heretofore unknown and highly advantageous manner which is neither trivial nor obvious. In doing so, it is further considered that sweeping and, in many instances, empirically verified advantages have been provided over the state-of-the-art, as will be further addressed.

Figure 26:
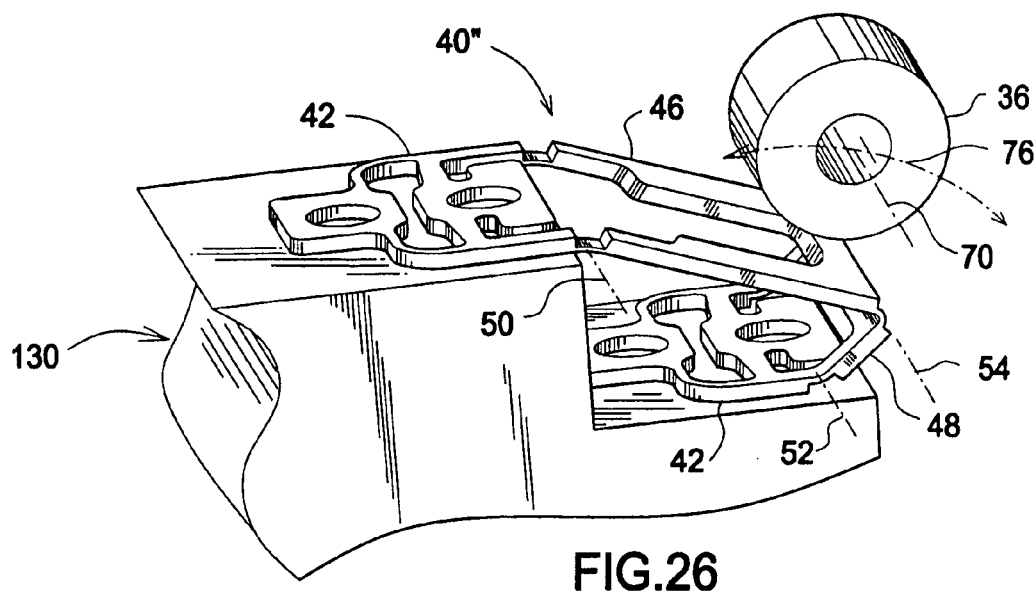
FIGS. 26, 27 and 28 are each diagrammatic views, in perspective, illustrating support brackets which resemble support brackets initially shown in FIGS. 7–9, respectively, but which further include highly advantageous fine-adjustment feet.
Figure 27:
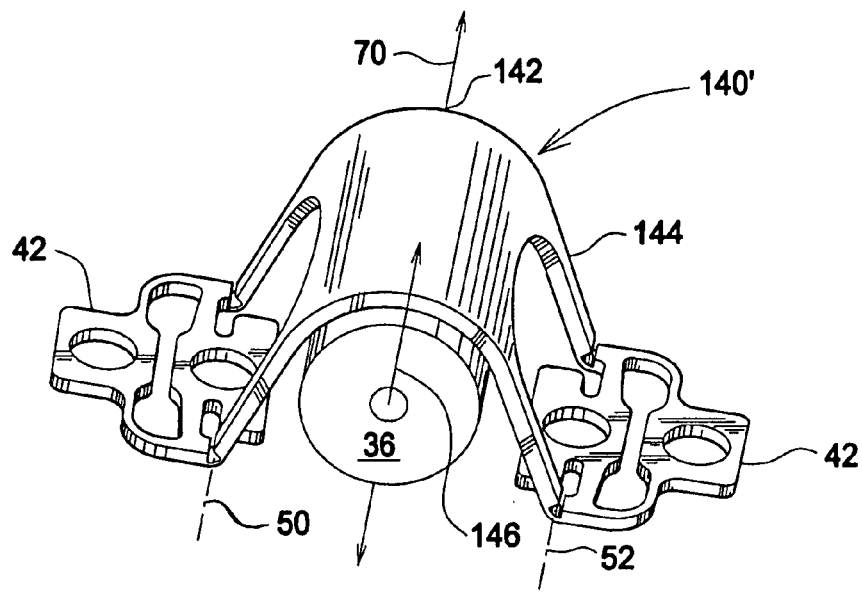
Figure 28:
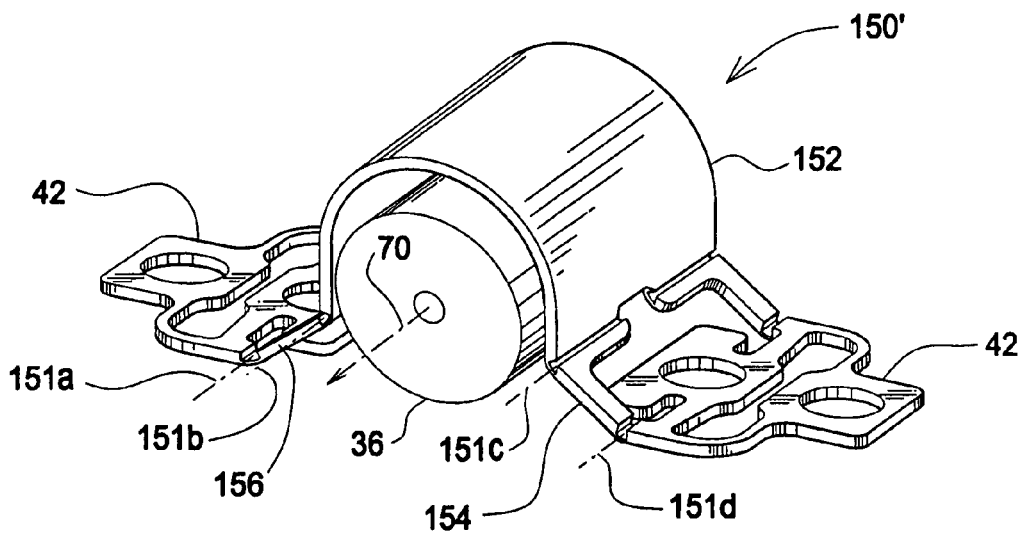

FIGS. 26, 27 and 28 illustrate support brackets which resemble support brackets initially shown and described in FIGS. 7–9, respectively, but which further include fine-adjust feet 42. These modified support brackets are denoted by overall reference numbers taken from FIGS. 7–9, but having an additional prime (') mark appended to the original reference number. It should be appreciated that these modified support brackets share all of the advantages of their counterpart, unmodified brackets while further providing the advantages described with regard to fine-adjust foot 42, as described.

Figure 26A:
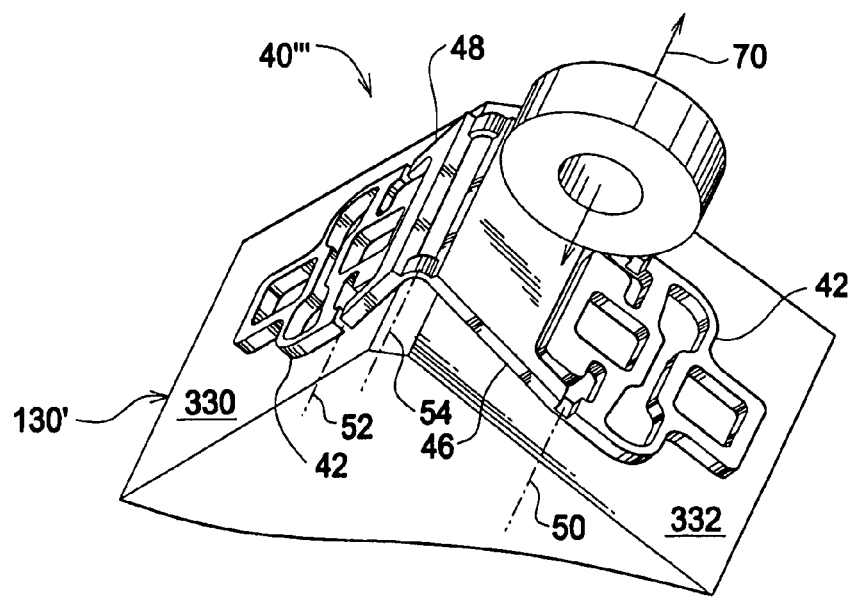
FIG. 26a is a diagrammatic view, in perspective, illustrating a support bracket which resembles the support bracket of FIG. 27, however, being configured for using non-parallel support surfaces.

FIG. 26a illustrates a support bracket, generally designated by the reference number 40''' and which resembles support brackets 40' of FIG. 7 (using directly manipulable feet) and 40" of FIG. 26 (using spring attenuation, directly manipulable feet), thereby sharing their advantages. Bracket 40''', however, is supported by a support structure 130' which includes non-parallel support surfaces 330 and 332. In the present example, support surfaces 330 and 332 are orthogonal with respect to one another, but it is to be understood that this is not a requirement such that any suitable angle may be formed by the intersection of the two surfaces.

With regard to the bipod or dual foot support brackets of the present invention described throughout this disclosure, it is worthwhile to note that these support brackets are compact with respect to the optical axis, thereby providing for compact stackability of multiple arrangements along the optical axis, in sharp contrast to many prior art arrangement such as, for example, Wolfgang and Webjorn, described above.

Figure 29:
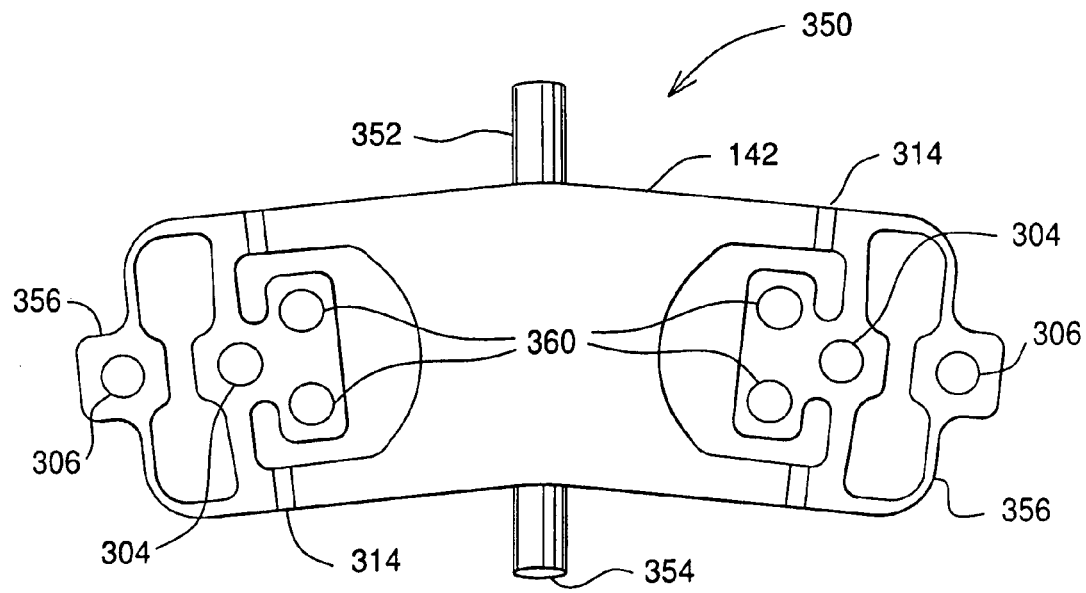
FIG. 29 is a diagrammatic, plan view
Figure 30:
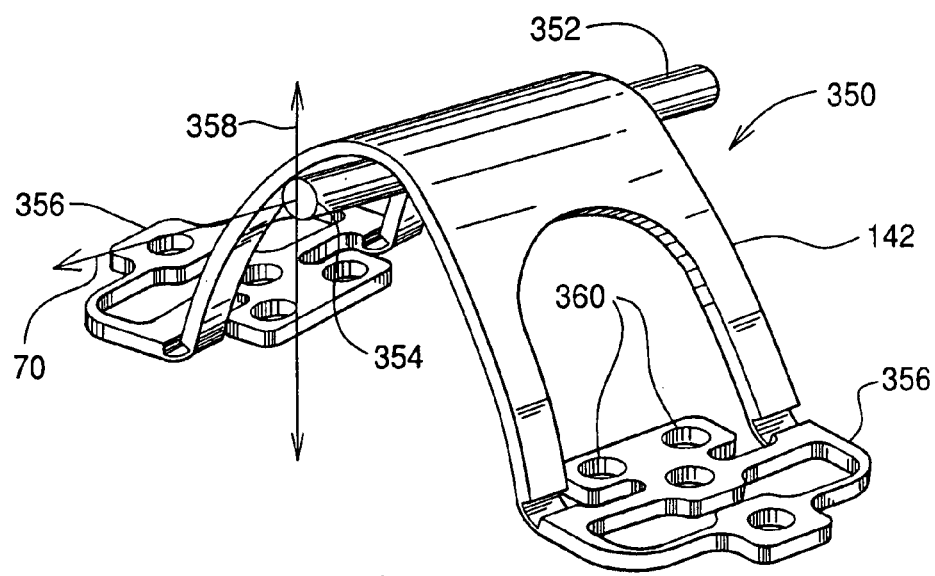
FIG. 30 is a diagrammatic, perspective view, collectively illustrating a fine-adjust support bracket, produced in accordance with the present invention and specifically including fine-adjustment feet which are configured for receiving rotational or twisting manipulations to move the support bracket against a support surface with which it is engaged.

FIGS. 29 and 30 illustrate a fine-adjust support bracket, produced in accordance with the present invention and generally indicated by the reference number 350. Bracket 350 is generally configured in the manner of bracket 140' of FIG. 27 and is shown supporting an optical fiber 352 (only partially shown) having an input face 354. Further, bracket 350 includes fine-adjust feet 356 which are generally similar to foot 302 of FIG. 24 and are specifically configured for cooperating with a dual tip manipulation tool, which may resemble the manipulation tool shown in FIGS. 14 and 15, in order to produce rotation or twisting of the feet as they are biased against support surface 45 during the initial coarse adjustment procedure. In the present example, feet 356 are configured for rotation using a pair of manipulation apertures 360. Further examples of manipulation tools and foot configurations which enable the application of such rotational forces are given in FIGS. 16 through 21, in the instance of a foot which is not configured for spring-attenuated fine-adjustment. In this regard, it is considered that one of ordinary skill in the art may readily configure a spring-attenuated fine-adjustment foot for rotational manipulation in view of this overall disclosure.

Still referring to FIGS. 29 and 30, bracket 350 is illustrated after having been fixedly attached to support surface 45 using its inner attachment positions 304. As a result of equal rotational forces applied to the feet, link 142 is resiliently deformed in a way which moves input face 354 of the optical fiber along a vertically oriented path 358, as seen in FIG. 30. By moving feet 356, either in unison or independently, orientation parameters of input face 354 such as, for example, pitch may be influenced in a selected manner. It is to be understood that the positional orientation illustrated in FIGS. 29a and 29b has been accomplished through the attachment of only inner positions 304 to support surface 45. Accordingly, a fine-adjustment step may then be performed consistent with the foregoing descriptions and illustrations using the highly advantageous fine-adjust foot of the present invention. That is, a manipulation tool may be used to engage outer foot positions 306 whereby to influence the orientation of input face 354 in a highly controlled manner with respect to certain orientation parameters. For example, pitch of the input face may be influenced by moving one or both of outer foot manipulation positions 306 laterally (for example, along the axis of optical fiber 352) and fine positioning movement along predetermined path 358 may be accomplished by moving both positions 306 in a particular way. With regard to these figures, it should be appreciated that orientation changes resulting from positioning manipulation have been exaggerated for purposes of illustrative clarity.

Figure 31:
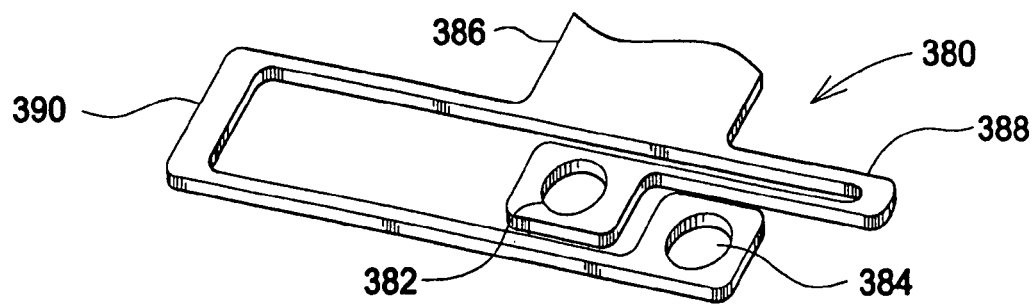
FIG. 31 is a diagrammatic, perspective view of a first asymmetric fine-adjust spring-attenuation foot produced in accordance with the present invention.

Although the configuration of the fine-adjust spring-attenuation foot of the present invention has, thus far, been illustrated as having a symmetrical configuration, it is to be understood that this is not a requirement. As a first example, FIG. 31 illustrates a first asymmetric fine-adjust spring-attenuation foot which is generally indicated by the reference number 380. Foot 380 includes a first manipulation/attachment location 382 and a second manipulation/attachment location 384. First location 382 is connected to a main tab 386 of the foot via a high-stiffness stage 388 while second location 384 is connected to main tab 386 via a low-stiffness stage 390. Main tab 386 may be attached to the remainder of an overall support structure, for example, using hinges. In operational use, coarse positioning may be accomplished using first manipulation location 382. Thereafter, location 382 may be fixedly attached (or attachments may be made proximate to location 382, serving to at least generally fix its location). Fine-adjustment then proceeds using second location 384 by moving it in any direction while biased against a support surface (not shown). As in all examples herein, where a foot is moved against a support surface, the use of the aforedescribed movement and attachment modes are useful.

Figure 32:
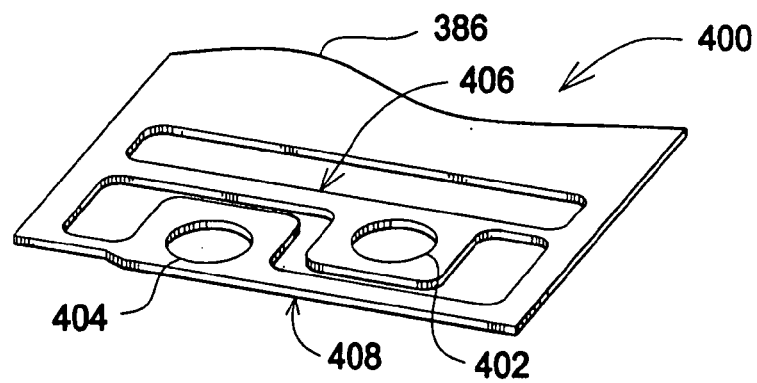
FIG. 32 is a diagrammatic, perspective view of a second asymmetric fine-adjust spring-attenuation foot produced in accordance with the present invention.

Turning to FIG. 32, a second asymmetric spring-attenuation fine-adjust foot is generally indicated by the reference number 400. Foot 400 includes a first manipulation/attachment location 402 and a second manipulation/attachment position 404. First location 402 is connected to main tab 386 of the foot using a high-stiffness stage 406 while second location 404 is connected to main tab 386 using a low-stiffness stage 408. During operational use, coarse positioning may be accomplished using first manipulation location 402. Thereafter, location 402 may be fixedly attached (or attachments may be made proximate to location 402, serving to at least generally fix its location). Fine-adjustment then proceeds using second location 404 by moving it in any direction while biased against a support surface (not shown).

Figure 33:
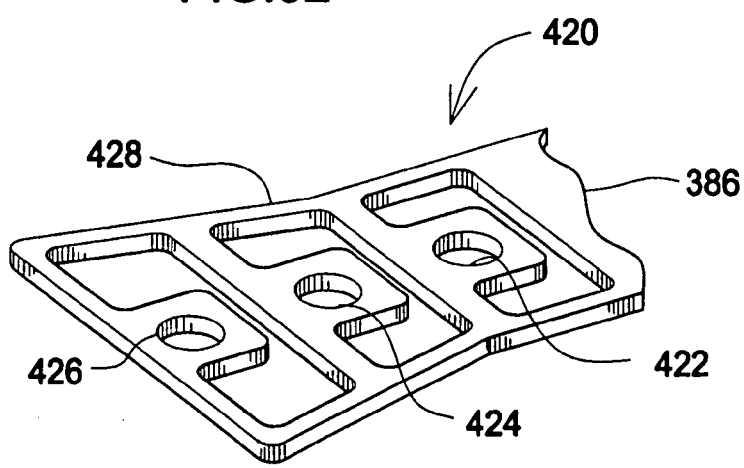
FIG. 33 is a diagrammatic, perspective view of a staged-bias spring-attenuation foot produced in accordance with the present invention.

FIG. 33 illustrates a staged-bias spring-attenuation foot produced in accordance with the present invention and generally indicated by the reference number 420. Foot 420 includes main tab 386 within an overall structure of three or more manipulation/attachment positions. In the present example, three manipulation/attachment positions are shown, indicated by the reference numbers 422, 424 and 426. These positions are interconnected by an overall beam structure 428. In use, coarse manipulation is first employed and innermost position 422 is fixedly attached. Second position 424 is then manipulated with a first stiffness in a first fine-adjustment step. Second position 424 is then fixedly located in a suitable manner. Thereafter, third position 426 is manipulated with a second, lower stiffness in a second fine positioning step. In this way, any number of progressively lighter stiffness stages may be cascaded, for example, to provide progressively finer adjustment stages.

Figure 34:
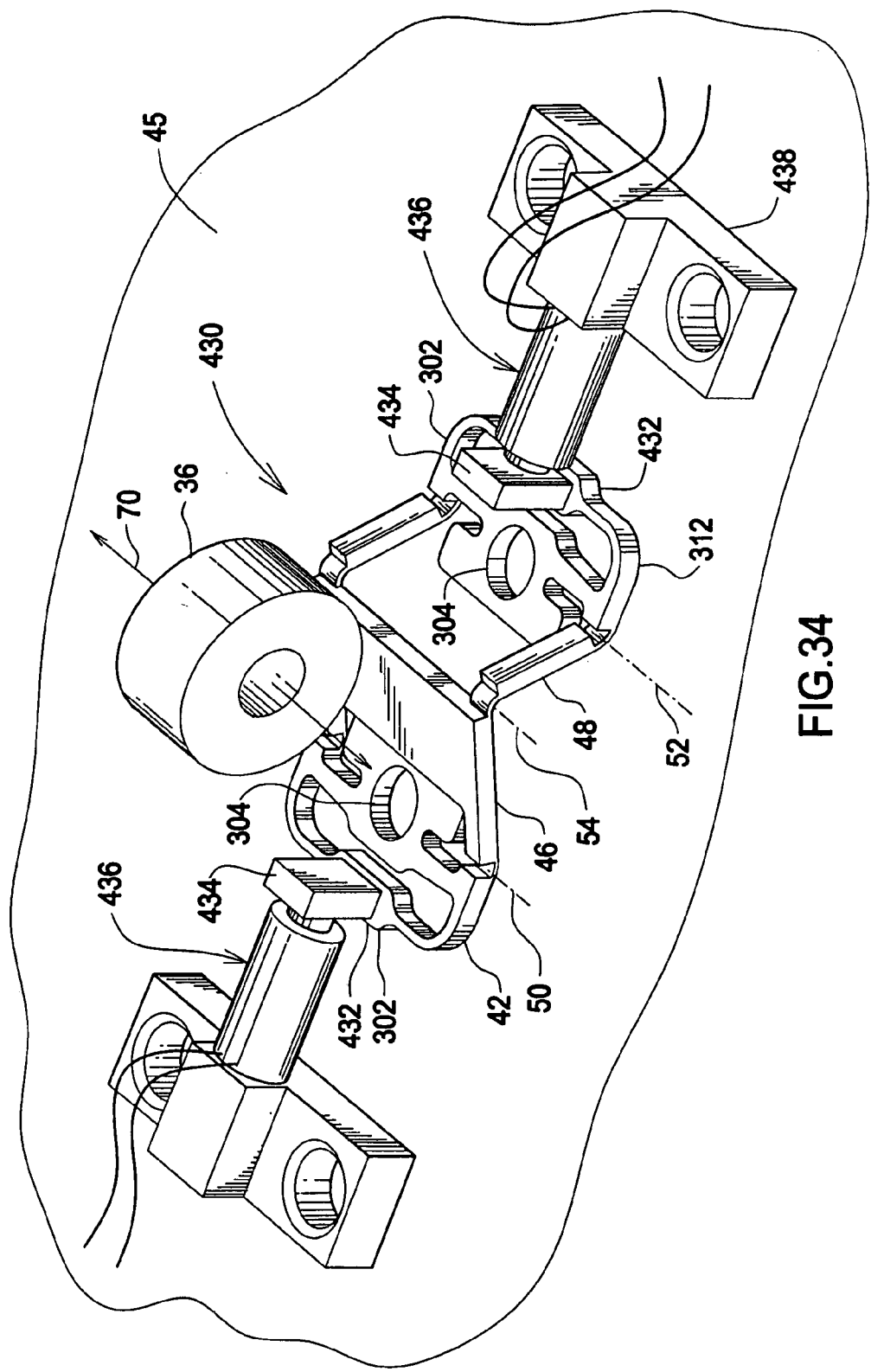
FIG. 34 is a diagrammatic, perspective view of a modified version of the highly advantageous fine-adjust support bracket of the present invention, shown here to illustrate active alignment using transducers which manipulate the fine-adjustment tabs or positions of the support bracket in accordance with the present invention.

Referring to FIG. 34, a modified version of the highly advantageous fine-adjust support bracket of the present invention is generally indicated by the reference number 430. Bracket 430 falls generally within the three-hinge class described above with reference numbers applied accordingly. Support bracket 430 differs, however, in having an outer tab 432 provided in place of outer manipulation/attachment position 306 (see, for example, FIG. 22). Outer tab 432 further supports a manipulation post 434 which is arranged for movement using in-situ transducers 436. In this regard, it should be appreciated that outer tabs 432 are not intended to be fixedly attached to a support surface, but provide for continuous adjustment of the position of optical component 36, even after having fixedly attached inner positions 304. Transducers 436 may comprise, for example, a piezo crystal arrangement or some other suitable form of transducer that includes a transducer foot 438 that is fixedly attached to support surface 45 in a suitable manner while an opposing, movement end of the transducer is attached to manipulation post 434. In such an implementation, electronic controls may be used to actively maintain the position of the optic.

A number of alternative implementations will now be described with reference to FIGS. 35–55, each implementation employs spring-attenuation for the purposes of fine positioning while further serving to attenuate attachment shift. In all of these alternative implementations, attachment shifts are spring-attenuated in one or more spatial dimensions. Mechanical components comprising the stiff-spring elements are denoted as K while elements comprising the soft-spring elements are denoted as k. Any of the described structures may be fixedly attached to a mounting surface in any suitable manner such as, for example, by welding, adhesive bonding or any of the other attachment methods described in this overall disclosure. In the instance of supporting an optical component, the mounting surface is understood to be rigidly attached to the walls or base of a photonics module.

Figure 35:
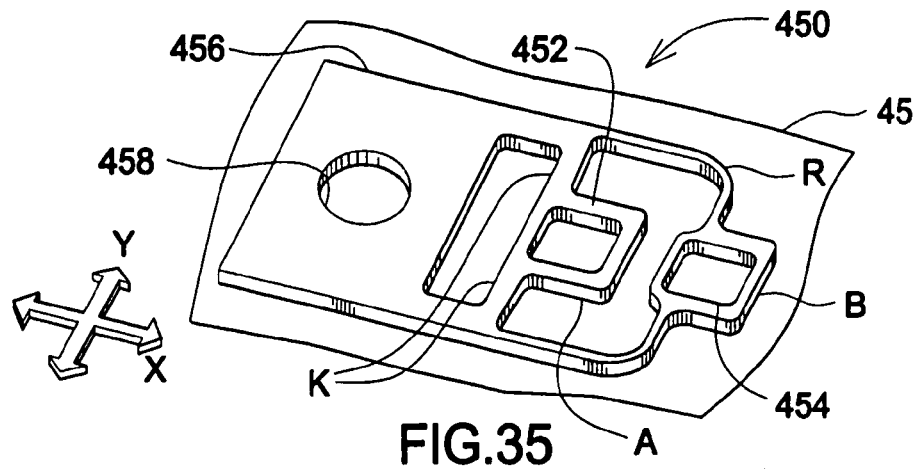
FIG. 35 is a diagrammatic, perspective view of a highly advantageous spring-attenuation foot, produced in accordance with the present invention, shown here to illustrate details of its structure.

Referring specifically to FIG. 35, a spring-attenuation foot is suited for positioning an optical component (not shown) in two dimensions and is generally indicated by the reference number 450. It is noted that foot 450 is generally related to spring-attenuation feet described above such as, for example, foot 302 of FIG. 25. Foot 450 includes first and second engagement and/or attachment positions 452 and 454, respectively, formed in surrounding tabs A and B. The tabs are interconnected by soft and stiff-spring elements k and K, respectively, which are also connected to a main tab 456. The latter defines an attachment well 458 for supporting an optical component (not shown). Attachment well 458 may receive a support post (not shown) which, in turn, supports an optical component (not shown). It is to be understood that attachment well 458 is not required and that main tab 456 may be used in any suitable way so long as the component being positioned is supported by the main tab in some manner.

Using foot 450, two-dimensional coarse-positioning is accomplished by sliding the entire structure into a desired position on mounting surface 45 and then attaching tab A thereto. Any positional shifts occurring during this attachment are compensated for by adjusting the position of tab B along x and y axes to fine-position a supported component using spring-attenuation. Further, as described above, any attachment shift which does occur upon fixedly attaching tab B to the support surface is advantageously attenuated at main tab 456. For example, moving tab B along the x-axis fine-positions a supported component along the x-axis while moving tab B along the y-axis rotates the structure about tab A, which allows the supported component to be, for example, pitched relative to a vertical plane (not shown) extending through the x axis. It is noted that thin, flexible beams (k) connecting tab B to the rest of the structure are made to allow spring-attenuated motion in both x and y. Thus, spring-attenuated fine-positioning and fastening in the xy plane is achieved by sliding tab B into the desired position on the mounting surface, and then fixing tab B to the mounting surface. Still further details will be provided below with regard to the use of this structure for fine positioning.

Figure 36:
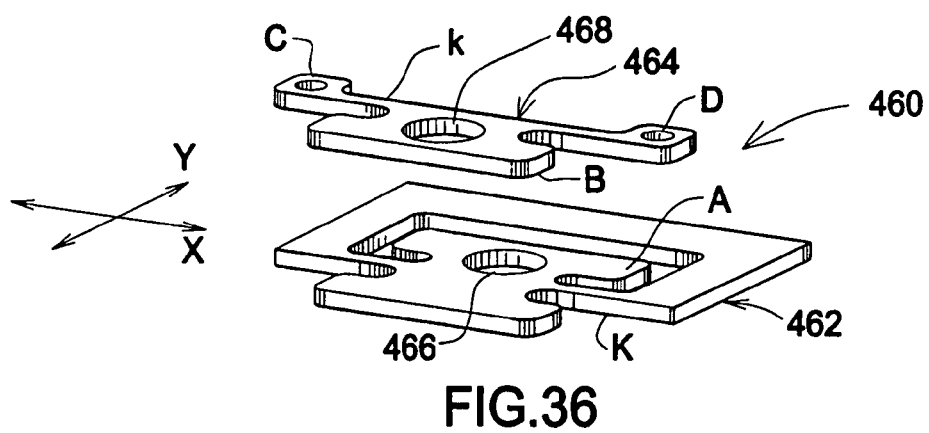
FIGS. 36 and 37 are each diagrammatic, perspective views illustrating a two-piece implementation of a spring-attenuation foot produced in accordance with the present invention and shown here to illustrate details of its structure and assembly.
Figure 37:
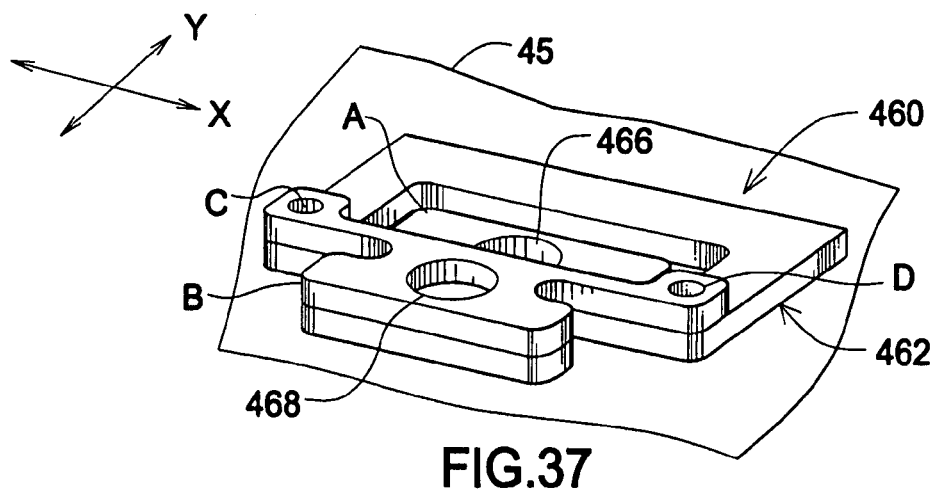

Now directing attention to FIGS. 36 and 37, a spring-attenuation foot structure, that is functionally similar to those described above, is generally indicated by the reference number 460. Foot 460, however, is a two-piece implementation including a base portion 462 which engages support surface 45 and an upper portion 464. The latter defines tab B while base portion 462 includes tab A. Positioning upper portion 464 on top of base portion 462, as shown in FIG. 37, advantageously allows the foot to take up less width along the x axis. Two-dimensional coarse-positioning is accomplished by moving base portion 462 slidingly against mounting surface 45 and, thereafter, attaching tab A to the mounting surface, for example, using a base portion attachment region 466. Tabs C and D on upper portion 464 are then attached, for example, by welding or other suitable techniques, to base portion 462 to form the assembled structure shown in FIG. 37. Spring-attenuated post-weld adjustment is then achieved at least in the x direction, and potentially in the xy plane, by sliding tab B around on top of tab A using an upper portion manipulation/attachment region 468, and then welding tab B to tab A, for example, at region 468. This movement and subsequent attachment may be accomplished using the movement and attachment modes taught in detail above. It is of interest to note that, in the assembly of FIG. 37, soft-spring members k sit directly above and slidingly against stiff-spring members K, lending to a very compact implementation. It is contemplated that this overall assembly may be fabricated as a single part, with part of the structure folded onto itself (not shown).

Figure 38:
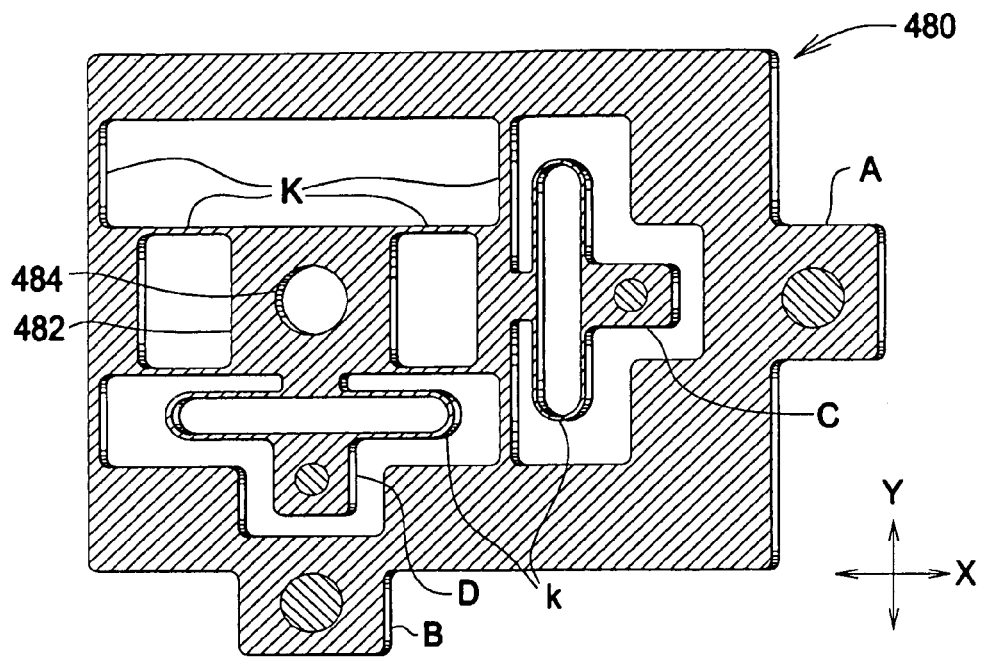
FIG. 38 is a diagrammatic, plan view of a spring-attenuated foot structure, produced in accordance with the present invention, and shown here to illustrate details of its highly advantageous configuration.

FIG. 38 illustrates another spring-attenuated foot structure, in a plan view, generally indicated by the reference number 480 for accomplishing fine positioning. A support tab 482 may support an optical component (not shown), for example, on a post (not shown) having an end received in a support well 484 or some support structure hingedly attached to tab 482. Soft-spring elements, k, are indicated, as well as stiff-spring elements, K. It is noted that the upper surface of structure 480 is diagonally shaded for clarity while manipulation/attachment positions have opposing diagonal shading. Using foot 480, coarse-positioning is accomplished by sliding the entire foot structure into the desired position on a planar mounting surface (not shown). Thereafter, manipulation/attachment tabs A and B are attached, for example, by welding to the mounting surface. Spring-attenuated post-weld correction in two dimensions is achieved thereafter by moving tabs C and D along the x and y axes, respectively. It should be appreciated that these movements influence support tab 482 in an at least somewhat interdependent manner. As shown, this structure is best used if tab D is welded prior to tab C. Tab C is then re-positioned to correct for any shifts in the x-direction of tab D (shifts of tab D along the x-axis are not attenuated), and then attached in place.

It is considered that foot 480 is completely unlike the prior art at least for the reason that it exhibits attenuation of attachment shifts rather than merely providing fine positioning of a component. Fine positioning mechanisms are known in the prior art as described, for example, in *Flexures* by Stuart T. Smith, but are expressly limited to fine positioning. In this regard, the teachings of the present invention are considered to surpass the state-of-the-art in a way that is neither trivial nor obvious by providing for precise, permanent fine-positioning in combination with additional and heretofore unseen capabilities for maintaining an established or desired position through attenuating attachment shifts.

Figure 39:
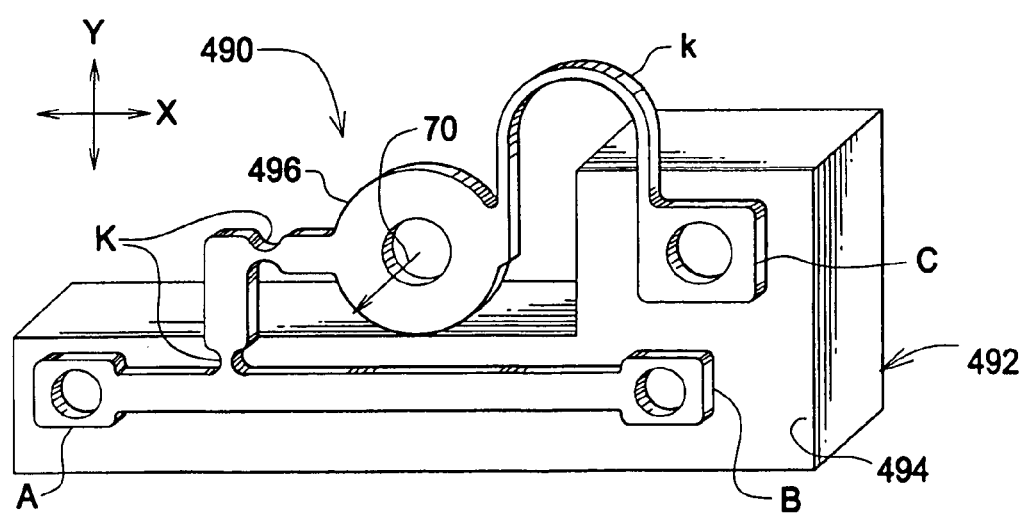
FIG. 39 is a diagrammatic, perspective view of a spring-attenuated support arrangement, produced in accordance with the present invention, shown here to illustrate details of its highly advantageous structure.

Turning to FIG. 39, a spring-attenuated support arrangement, produced in accordance with the present invention, is generally indicated by the reference number 490. Support arrangement 490 is supported in a generally vertical plane by a support structure 492 defining a support surface 494. Support arrangement 490 includes manipulation/attachment tabs A–C and a support section 496 defining an aperture configured for receiving, as an example, an optical component. The tabs and support section 496 are interconnected by an arrangement of stiff, K, and soft, k, spring elements, as indicated. In this regard, it should be appreciated that this support arrangement may be modified in an unlimited number of ways in view of this disclosure. Positioning of support section 496 is accomplished in two dimensions by first coarse-positioning support arrangement 490 slidingly against surface 494. Thereafter, manipulation/attachment tabs A and B are attached to surface 494. Post-attachment adjustment in two dimensions is performed by moving a single tab C slidingly against support surface 494 and then attaching tab C to surface 494. It is noted that arcuate flexural element k, joining tab C to support section 496, allows relative motion of tab C with respect to the optic in both x- and y-directions. Hence, this single flexural element, in conjunction with the two stiffer notch spring elements K, provides for spring-attenuation of any attachment shift at support section 496 of any attachment shift arising upon attachment of tab C. The present example serves to illustrate that support surfaces may be arranged in many different ways while still remaining within the scope of the present invention in view of this overall disclosure.

Figure 40:
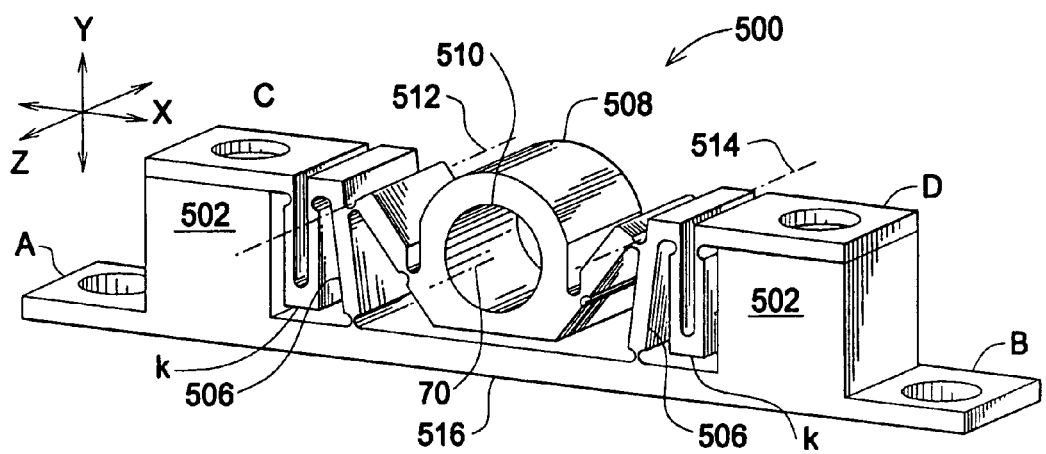
FIG. 40 is a diagrammatic, perspective view of a highly advantageous component support structure, produced in accordance with the present invention, illustrating details of its structure, including an arrangement of hinged members supporting an optical mount.

FIG. 40 shows a component support structure produced in accordance with the present invention and generally indicated by the reference number 500. Coarse positioning in the xz plane is accomplished by sliding the entire structure into the desired position on a planar mounting surface (not shown) and then attaching tabs A and B to the mounting surface. For purposes of fine positioning, manipulation/attachment tabs C and D are slidingly engagable against support posts 502. An arrangement of hinged members extends between tabs C and D including a pair of hinged posts each of which is indicated by the reference number 506, and all of which cooperatively support an optical mount 508 defining a device receiving aperture 510. Each hinge post is attached at one end to either hinge axis 512 or 514 while the opposing end of each hinge post is hingedly attached by a stiff notch spring to a base 516 that is common to support posts 502. The upper ends of hinge posts 506 are fine-positioned (spring-attenuated) along the x-axis using spring-attenuation arrangements, one of which is formed between tab C and hinge axis 512 and another one of which is formed between tab D and hinge axis 514. Each spring-attenuation arrangement include a lowermost distal end defining soft-spring elements k. Stiff-spring elements K are formed proximate to the upper ends of hinge posts 506 by notch spring configurations, as illustrated. Fine positioning is accomplished by moving tabs C and D along the x-axis slidingly against upper surfaces of support posts 502. These tabs are then affixed in a suitable manner wherein the spring-attenuation arrangements provide highly advantageous attachment shift attenuation. This structure may be formed by any suitable method including, for example, by EDM.

Still referring to FIG. 40, it should be appreciated that the exemplary support structure between hinge axes 512 and 514 is representative of the aforedescribed four-hinge structure and is produced in accordance with teachings above related thereto. Further, other structural classes described above such as, for example, the three-hinge or flexible web classes may be employed between hinge axes 512 and 514.

Figure 41:
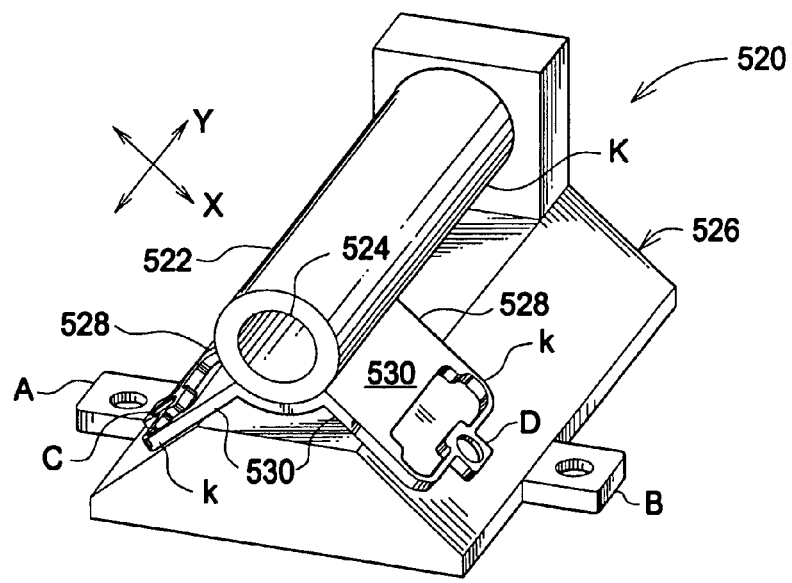
FIG. 41 is a diagrammatic, perspective view of another component support structure, produced in accordance with the present invention, shown here to illustrate details of its structure for use in three-dimensional fine-positioning wherein the optical component is supported by a cylindrical tube.

Turning now to FIG. 41, another component support structure produced in accordance with the present invention, generally indicated by the reference number 520, is illustrated which provides for three-dimensional fine positioning. Structure 520 includes a cylindrical support tube 522, although any suitable form may be used, defining a through-hole 524 for receiving an optical component such as, for example, a lens or optical fiber. Support tube 522 is cantilevered from a base arrangement 526 and may flex for purposes of moving the optical component in the xy plane with stiff-spring constant K. A pair of spring-attenuation feet 528 include manipulation/attachment tabs C and D and a main tab 530. In each foot 528, a soft-spring element k interconnects main tab 530 with its associated manipulation/attachment tab, C or D. Main tab 530 of each foot is, in turn, fixedly attached to support tube 522. In the present example, this pair of feet is integrally formed, but this is not a requirement. Coarse positioning is accomplished by slidingly moving support structure 520 including tabs A and B against a support surface (not shown) and then attaching these tabs to the support surface. Fine positioning is carried out thereafter by manipulation of tabs C and D. These latter tabs are then attached to opposing sloped surfaces of base arrangement 526. Again, any attachment shift at tabs C and D is attenuated in a highly advantageous way at the distal end of support tube 522 by soft-spring constant k.

Figure 42:
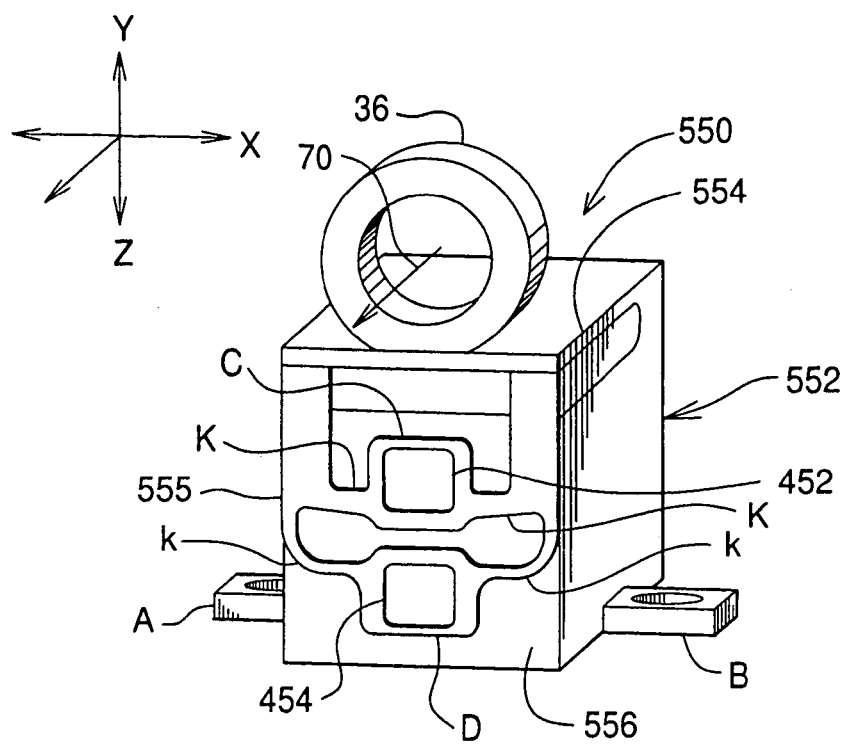
FIG. 42 is a diagrammatic, perspective view of still another component support structure, produced in accordance with the present invention, illustrating details of its construction including a springboard configuration.

FIG. 42 illustrates another implementation of a support structure, produced in accordance with the present invention, and generally indicated by the reference number 550. Structure 550 includes a base 552 defining tabs A and B, and further defines a flexible springboard 554 attached to the base. Springboard 554 supports a diagrammatically illustrated optical component 36 proximate to the distal end thereof. A modified form of spring-attenuation foot 450 of FIG. 35 (or foot 302 of FIG. 22) is provided, indicated by the reference number 555, which is connected proximate to the distal end of springboard 554 and which applies a footprint to a surface 556 that is defined by base 552. Coarse positioning in the indicated xz plane is accomplished by sliding the entire structure into a desired position against a mounting surface (not shown) and then attaching tabs A and B to that mounting surface. It is noted that the movement and attachment modes, with their attendant advantages, are readily employed, as is generally the case throughout this overall disclosure. To achieve at least y axis positioning, spring-attenuation foot 450 is used. Specifically, tab C is moved at least along the y axis, and then attached to surface 556, thereby accomplishing coarse positioning. Fine positioning then employs movement of tab D by which the position of component in the xy plane may be influenced. It is noted that in a slightly different implementation, spring-board 554 may provide stiff-spring constant K whereby a soft-spring attenuation foot such as is shown, for example, in FIG. 41 may be used, having a single manipulation/attachment tab. It should be appreciated that structure 550 accomplishes positioning in three dimensions.

Figure 43:
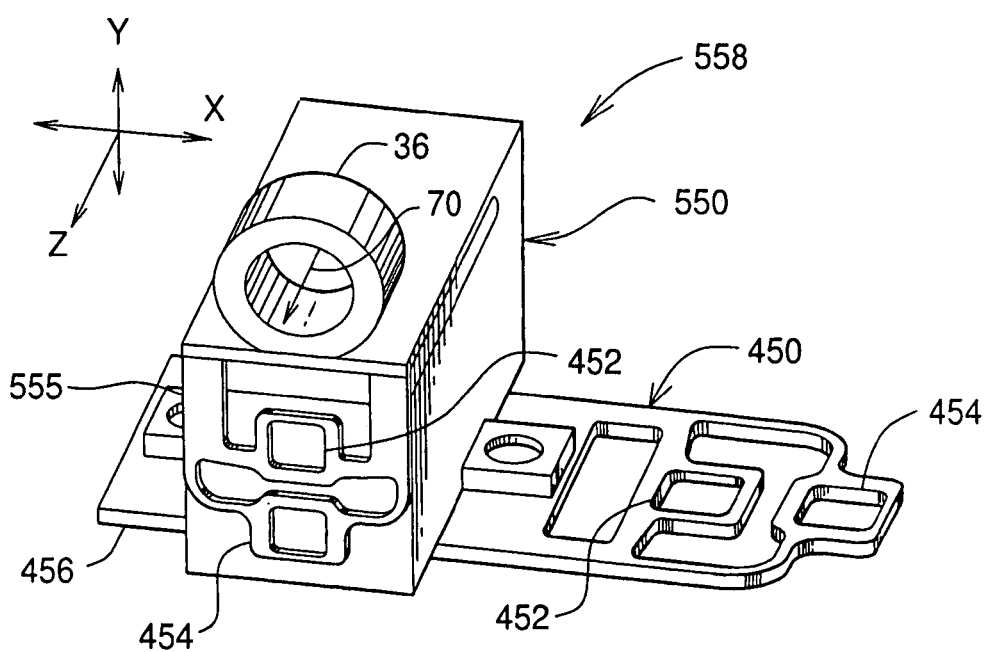
FIG. 43 is a diagrammatic, perspective view showing a combination support arrangement which is made up of the spring-attenuation foot of FIG. 35 supporting the support structure of FIG. 42, thereby providing for multidimensional fine-adjustment of the position of an optical component.

Now directing attention to FIG. 43, it is to be understood that the support arrangements described herein may be combined in any number of useful configurations to achieve fine-adjustment and spring-attenuated attachment shift correction in all dimensions. As an example, FIG. 43 illustrates a combination support arrangement that is generally indicated by the reference number 558 and which includes spring-attenuation foot 450 of FIG. 35 having its main tab 456 supporting support structure 550 of FIG. 42. This configuration provides for fine positioning along the x axis using foot 450 and along the y axis using spring-attenuation foot 555 of structure 550, further providing attachment shift attenuation, as well as fine positioning, in both the x and y dimensions. As one alternative, the resulting structure need not be produced as an assembly of two separate parts, but may be produced integrally (not shown), for example, by machining.

Figure 44:
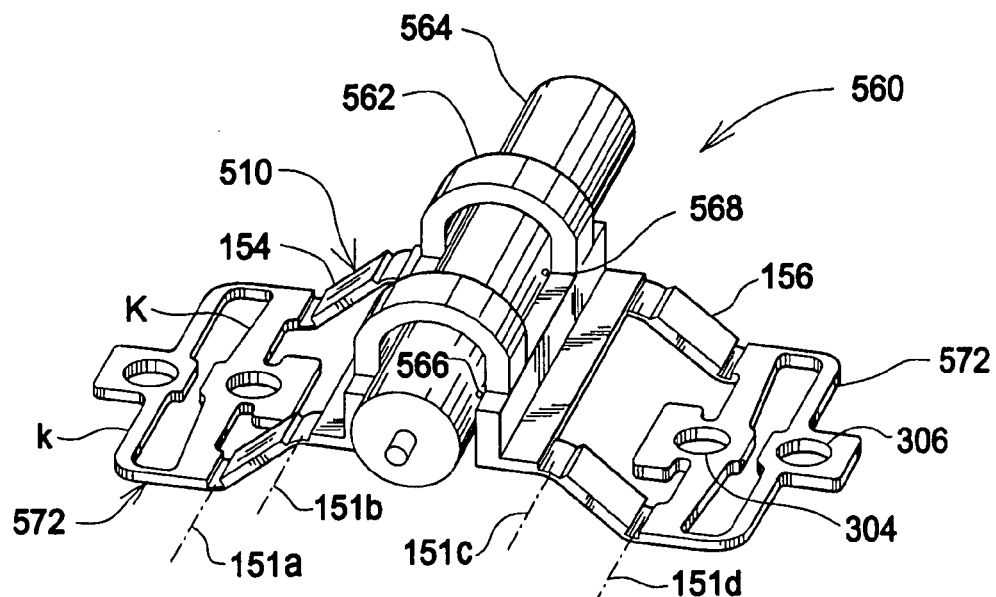
FIG. 44 is a diagrammatic, perspective view showing a four-legged support clip configured with highly advantageous spring-attenuation feet, produced in accordance with the present invention, shown here to illustrate details of its structure.

Turning now to FIG. 44, it should be appreciated that the structures and method of the present invention may be employed for purposes of improving the performance of almost any mounting structure used in the prior art, and particularly those which exhibit attachment shift such as is seen, for example, in laser welding attachment. FIG. 44 embodies one such example using a four-legged support clip that is generally indicated by the reference number 560. Clip 560 includes a center portion 562 which supports, by way of example, an optical fiber 564 using inverted U-shaped cross members. The fiber ferrule may be laser welded to center portion 562 at weld points 566 and 568, among others. Generally, in the prior art, some level of precise positioning of the fiber is performed prior to initial welding of the ferrule to the clip. Finer adjustment is accomplished during and/or after the multiple-weld attachment of the optic to the clip. In terms of fine positioning, it will be remembered from previous discussions that Jang, like other prior art implementations, at least some of which employ U-shaped clips, utilizes laser hammering whereby additional welds are made between the ferrule and clip 560, thereby attempting to induce strains in strategic locations to bend the mounting fixture back into a desired position. Still other prior art clip arrangements rely on post-weld bending, as described above, particularly in attempting to compensate for attachment shift.

Still referring to FIG. 44, the present example, in contrast to prior art techniques, serves to demonstrate the remarkable advantages which accompany the practice of the present invention. Specifically, the Jang clip is modified, as illustrated in FIG. 44, in a way which provides the benefits of the present invention and which eliminates, based on Applicants' experience, the need for complex and potentially unreliable laser hammering for the purpose of fine positioning and attachment shift compensation. Specifically, a four-hinge support arrangement 570 (see, for example, FIGS. 9 and 12) has been incorporated, in accordance with the teachings of the present invention, including highly advantageous spring-attenuation feet 572 (see, for example, FIGS. 24 and 35). Rather than using a complex laser hammering procedure, fine positioning is accomplished by direct engagement of feet 572 consistent with the teachings herein. As another example (not shown), the four-legged clip of Webjorn, described above, benefits from incorporating the spring-attenuated foot structure of the present invention at least in the "front" pair of feet, close to the optical component. In essence, the foregoing examples serve to illustrate replacement of bending and/or laser hammering with the more deterministic and generally more reliable approach of the present invention. Accordingly, a wide range of support structures may benefit from the teachings herein.

Figure 45:
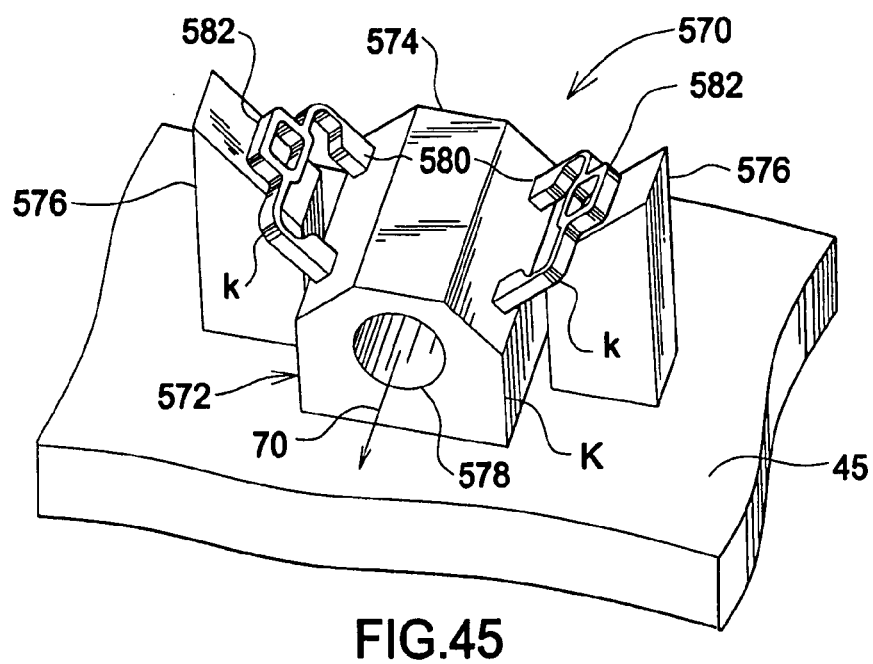
FIG. 45 is a diagrammatic, perspective view showing a support structure, produced in accordance with the present invention, with an optical component supported by a compliant block that is in communication with spring-attenuation feet.

Referring to FIG. 45, it should be appreciated the concepts and sub-structures directed to the use of spring-attenuation for the combined objectives of fine positioning and attenuation of attachment shift may employed as features in virtually any structure that exhibits some level of compliance in one or more dimensions. To that end and serving as a first example, FIG. 45 illustrates a support arrangement that is generally indicated by the reference number 570 and is produced in accordance with the present invention. Support arrangement 570 includes a base structure 572 that is made up of a center, compliant block 574 that is arranged between a pair of pedestals 576. Compliant block 574 may be formed from any suitable material such as, for example, rubber, pedestals 576, likewise may be formed, for example, from harder material such as a metal. At the same time, however, it is to be understood that the compliant blocks of FIG. 45, may be representative of an elastic structure that is comprised of underlying simple and/or complex structures. The compliant block and pedestals are arranged on and attached to support surface 45 in order to accomplish coarse positioning. An optical component is mounted in a passage 578 defined by compliant block 574. A pair of spring-attenuation feet 580 are in communication with compliant block 574 and, in one implementation, may be formed integrally therewith, but this is not a requirement. Manipulation/attachment tabs 582 of the feet are disposed against upper surfaces of pedestals 576. With the optical component mounted in compliant block 574, tabs 582 are manipulated in accordance with the teachings herein and, thereafter, fixedly attached to pedestals 576 in order to accomplish fine positioning while, at the same time, attenuating any attachment shift seen at the optical component which arises upon attaching tabs 582 to the support pedestals. In this example, stiff-spring K is provided by compliant block 574, and soft-spring k is provided by beams making up portions of feet 582, similar to teachings above. It is noted that the present example, akin to those of FIGS. 36, 39 and 41, utilizes a support structure which itself intentionally serves as the stiff-spring. Other, previous examples, at least to a good approximation, include structures having separate subcomponents, one of which primarily acts as a supporting, kinematic structure and another of which induces spring-attenuated adjustment and which is employed primarily for purposes of attenuation of attachment shift.

Figure 46:
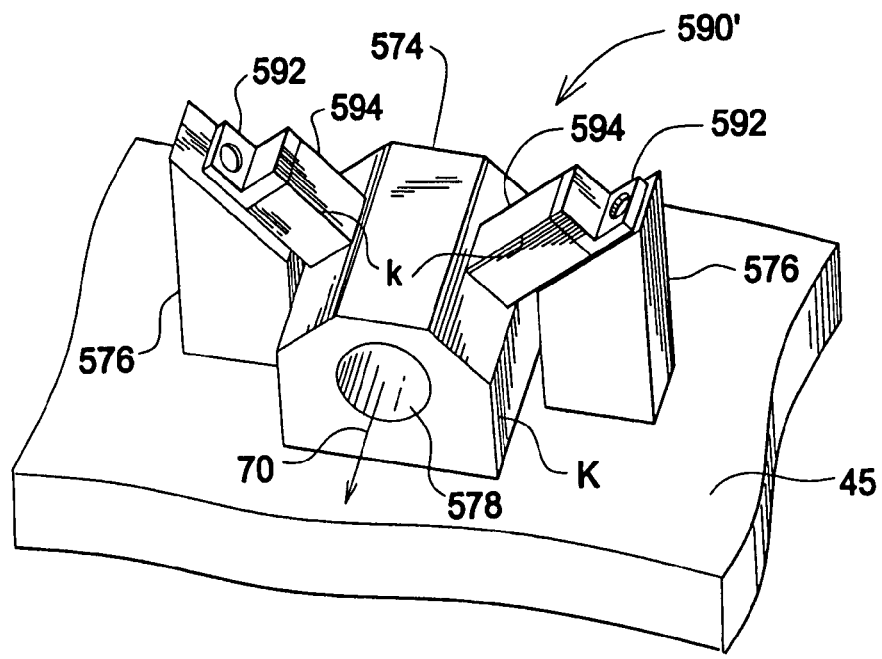
FIG. 46 is a diagrammatic, perspective view showing another support structure, produced in accordance with the present invention and resembling the support structure shown in FIG. 45, except for its use of compliant biasing members in place of spring-attenuation feet.
Figure 47:
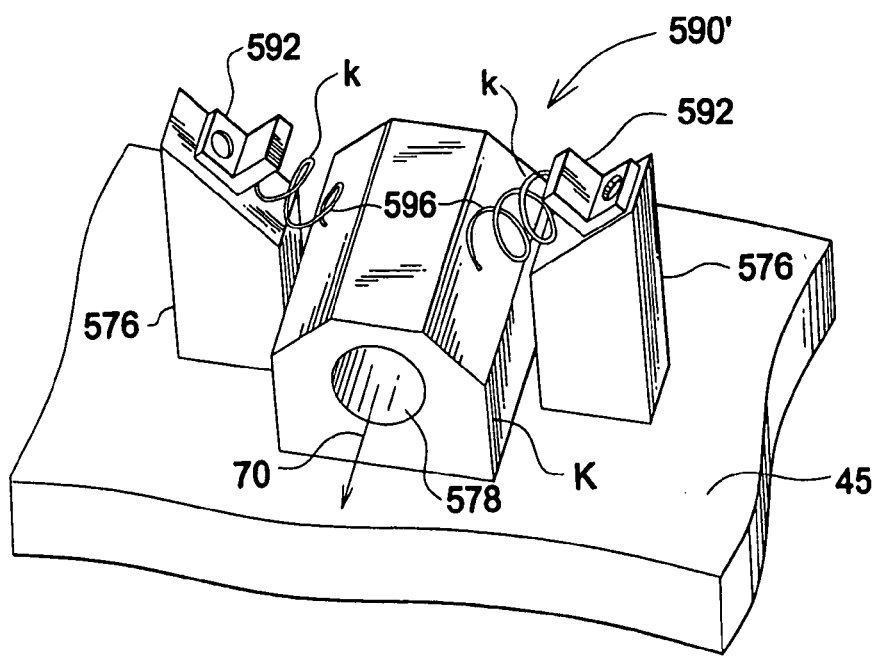
FIG. 47 is a diagrammatic, perspective view showing still another support structure, produced in accordance with the present invention and resembling the support structure shown in FIG. 45, except for its use of coil springs in place of spring-attenuation feet.

As a second example, FIG. 46 illustrates a support arrangement that is generally indicated by the reference number 590 which resembles structure 570 of FIG. 45, but which includes a modified arrangement for inducing spring-attenuated forces against compliant block 574, as being exemplary of one possible alternative to the use of accomplishing spring-attenuation without using flexural beam members. Specifically, arrangement 590 includes a pair of L-shaped feet 592 arranged for movement against the upper surfaces of pedestals 576 and subsequent attachment thereto in accordance with the teachings of the present invention. A compliant biasing member 594 is positioned between each foot 592 and compliant block 574. That is, member 594 may be attached at its opposing ends to compliant block 574 as well as one of L-shaped feet 592. In view of the present example, it should be appreciated that any compliant material or part, including an actual spring, may be employed in all or most of the structures described herein. As an example, FIG. 47 illustrates a modified version of arrangement 590, indicated by the reference number 590' using a pair of coil springs 596 as a replacement for compliant biasing members 594.

In one general implementation of the teachings of the present invention, as described above, a structure and method for using a spring-attenuation mechanism is provided integral to the feet (or foot) of an optical mounting bracket to achieve both fine positioning and decreased sensitivity to attachment shifts. In this regard, spring-attenuation advantageously provides for converting a given motion at one point into a corresponding smaller motion at another point. The present invention exploits this advantage in a heretofore unrecognized way at least to reduce the effect of horizontal (in plane) weld shifts on a final position of an optical component. A second benefit of spring-attenuation resides in mitigation of the effect of stick-slip and other practical limitations experienced in adjustment resolution: whatever resolution is attained in manipulating manipulation/attachment tabs is still further improved through attenuating action of the spring-attenuation foot mechanism of the present invention.

In this portion of the disclosure, specific design considerations and approaches thereto are described that may be advantageous in achieving contemplated attributes such as:

Reduction by a factor of 3 to 30 of in-plane weld shift, as measured at the optical component, by using spring-attenuation.

High attenuation ratios attainable in a practical way within a relatively small footprint, as an advantage over conventional leverage.

Footprint minimization.

Flexible beams that may be sized and designed for a minimum of plastic deformation. Beam configurations, described herein, are designed to minimize the extent of plastic deformation while maintaining a relatively small footprint.

If a bracket is designed for fine-adjustment in a plane orthogonal to the optical axis axis, certain features in the foot may further reduce sensitivity to attachment shifts in the direction of the optic axis by "absorbing" those shifts with flexible joints or members.

Bracket-foot configurations allowing for at least some fine-adjustment in the z direction (generally, along the light path), as well as configurations allowing for angular adjustment.

Reduction of vertical attachment shift or tool-release spring-back by strategic use of leverage: proper foot design and proper orientation in the bracket still further reduces the effect of undesired vertical shifts, for example, vertical attachment shift of a foot. Certain features can absorb vertical shift with flexible joints or members.

Thermal stability and long-term drift.

A conceptual understanding of "spring-attenuation", as applied by the present invention, versus "spring leverage", which is referred to in the literature as well as mechanical levers in general.

It should be appreciated that spring-attenuation, as recognized herein, is not the only available mechanism for improving foot design to mitigate attachment shifts and to improve positioning resolution, even if it ultimately becomes the most preferred and straightforward method in view of this overall disclosure, as one aspect of the present invention. For example, levers, flexures, and other mechanisms may alternatively be used to achieve various advantages. Moreover, the attachment or locked mode of the present invention serves as one example which achieves highly advantageous attachment shift attenuation. Inasmuch as the use of spring-attenuation, as taught herein, is a sweeping advantage standing in its own right, it should be appreciated that another fundamental recognition herein resides in the very notion of directly manipulating the feet of a support bracket for positioning an optical component. Accordingly, various foot-related mechanisms are described in this disclosure in order to achieve even finer positioning resolution than that which is available using directly a manipulated flat-footed bracket.

With regard to spring-attenuation versus spring-leverage, it should be appreciated that the spring-attenuation foot of the present invention uses a series spring arrangement for fine positioning to provide a reduced motion at some selected point relative to the motion of some remote point— the foot attenuates motion. While the prior art, particularly in the field of precision instrument design, refers to this general arrangement as "spring leverage," it is important to understand that this arrangement embodies important distinctions from what is commonly referred to as a lever.

Specifically considering mechanical levers, any lever in any configuration has a defining feature: mechanical levers transform between high-displacement low-force at one point and low-displacement, high-force at another- which makes their action reversible. Specifically, levers operate according to the most basic relationship $(F \times l)_{input} = (f \times L)_{output}$. This force-displacement relationship is common to all simple machines that are based on actual "leverage" including inclined planes, threads, pulley blocks, and kinematic mechanisms. On the other hand, the spring-attenuation foot of the present invention transforms high-displacement input at one point to low-displacement output at another point at nearly constant force.

Referring again to FIG. 35, unlike the action of a mechanical lever, the action within the spring-attenuation foot of the present invention is not reversible. That is, moving tab B results in attenuated movement of main tab 456. However, movement of main tab 456 does not produce an increased displacement at tab B, thus moving inconsistent with the movement of a purely mechanical lever. This distinction is readily apparent when compared to a structure which employs mechanical leverage. It is noted that the distinction applies to a soft-spring in series with a stiff-spring. Attaching any structure to main tab 456 which resists its motion such as, for example, exerting force against a springboard, as in FIG. 42, or against a compliant block, as exemplified by block 574 of FIG. 45, or a bracket, for example, including a flexible web member, as in FIGS. 13, 27, 29 and 30, will introduce another stiffness in parallel with the stiff-spring and will subsequently change the force balance. In one useful implementation, the stiff-spring of the attenuator is configured to be at least 10 times stiffer than any structure attached in parallel with it; so, to a good approximation, the resulting force exerted by the structure on the stiff-spring element may be ignored. In determining attenuation levels, the relationship $X/x=(K+k)/k$ applies where k is the soft-spring value and K is the stiff-spring value. X represents an actual, applied movement magnitude and x represents the attenuated movement magnitude. For values of K/k greater than 10, this relationship may be approximated as $X/x \approx K/k$. According to this latter definition, attenuation always has a value that is greater than one. As a note, when the soft and stiff-springs are of equal stiffness, the attenuation is equal to two.

It is considered that the design of beam elements to provide strength and stiffness suitable for use herein is within the capability of one having ordinary skill in the art in view of this overall disclosure. Accordingly, the scope of this discussion is limited to special considerations in the context of the present invention for minimizing residual stress and shrinking the overall footprint of spring-attenuators.

Initially, it should be recalled that the kinematic structure (for example, three and four-hinge class structures described above) attached to the spring-attenuation foot itself influences the correlation between spring-attenuated output (or overall foot position changes) and motion at the optical component; this correlation is not necessarily a 1:1 correspondence.

A spring-attenuator mechanism may be approximated by three parameters, as follows:

Attenuation: A ratio of input displacement of the soft-spring to output displacement of the structure. In the present application, it is an objective to attenuate, or reduce, the attachment shift.

Range-of-motion: A maximum extent of optic motion that can be achieved by moving the fine-adjust feature or tab. Range-of-motion of the optical component is equal to the total travel of the fine-adjust (soft-spring) divided by the attenuation. Maximum fine-adjust travel is limited by plastic deformation in the soft-spring, and is therefore a function of both material properties and geometry. (Note that for purposes herein, the range of motion at optical component is smaller than the travel of the fine-adjust.)

Maximum allowable force: The force required to push the fine-adjust to its maximum extent.

For a given overall size, the designer selects a balance between range of motion and attenuation: longer range of motion implies lower attenuation, since the maximum fine-adjust deflection is essentially fixed, being limited by size and geometry. Clearly, the bare minimum range of motion for the structures herein is driven by the nominal aggregate uncertainty of positioning and attachment shift during the first stage of adjustment and attachment—after initial "coarse positioning" attachment there is some net error in the position of the optical component which must fall within the range of motion, at the optical component, allowed by the spring-attenuator and the kinematic structure. In practice, the range of motion often must be larger yet to account for manufacturing tolerances in the height of the optic axis relative to the mounting surface. For the most part, the structures disclosed herein exhibit 4 to 12 times attenuation and a 10 to 25 µm optic range of motion, using brackets made, for example, with stainless steel.

Another important design consideration has to do with force: the spring-attenuator must be capable of producing the force needed to deform or move the kinematic structure. The minimum input force applied to the spring-attenuator during adjustment is that required to deform the structure, therefore it is desirable to minimize the amount of force required to control the structure. This, in turn, assures that any applied force provides the desired range of motion for a minimum stress. As one example, in the three-hinge class of structure (see, for example, FIG. 22), this is accomplished by thinning the hinge areas. For elastic and four-hinge types of structures (FIGS. 27 and 28, respectively), somewhat stiffer hinges are required to provide a minimum stiffness to resist shock and vibration, as described previously, which requires the attenuating feet to exert correspondingly more force. Maximum force is limited by the onset of plastic deformation in the soft-spring.

In the spring-attenuation foot, as exemplified at least by FIGS. 24, 35 and 37, the spring elements consist of beams, which to the first order can be modeled using handbook equations for beam stiffness. A "beam" is usually understood to mean a structural element that is loaded primarily in bending, although the actual stress and deformation state of a real beam will result from all loads: bending plus compression, torsion, and applied moments. One important aspect of beams for spring-attenuator design herein resides in allowing large differences in stiffness with minor variations in geometry—this property of beams allows for producing spring-attenuators within a remarkably small footprint. It is noted that the scale length for these systems is fundamentally driven by the size (and therefore mass) of the optical component; for example, a positioning and attachment bracket ten times smaller than the lens would probably not be rigid enough to hold the lens for typical shock and vibration specifications. The stiffness of any beam without applied moments depends on the third power of the ratio of depth to length, where depth and length dimensions are measured in the plane of bending—the plane of the foot. For example, a beam 2.1 times deeper than another of the same length will be about ten times stiffer in bending, providing eleven times motion attenuation. This is strictly true for "flexural" beams—those at least about ten times longer than they are wide—and becomes less accurate as this aspect ratio decreases. For lower aspect ratios, the designer should consider the effect of shear and local changes in beam cross-section, which is most easily accomplished with Finite-Element Analysis (hereinafter FEA).

Continuing to describe spring-attenuator design considerations, the soft-spring will usually experience higher peak stress than the stiff-spring. One reasonable design goal for the soft-spring is to minimize its stiffness while keeping peak stress within an acceptable limit—about 80% of yield for designs herein. This is most effectively achieved by making the beams longer, but this increases the footprint [Stiffness/max stress is proportional to ($1/length^2$) multiplied by (Modulus/yield stress)]. Another option is seen in choosing a material with a high ratio of elastic modulus to yield stress such as beryllium copper, titanium or hardened steel. Of course, any suitable material that is currently available or yet to be developed may be utilized based on various considerations. For example, titanium and beryllium copper are more expensive, more difficult to work with, and less safe to handle than steel, while full-hard steel will not allow plastic deformation for forming the structure or bending the hinges. Quarter-hard stainless steel presently appears to provide a favorable compromise between the need for plastic deformation in the structure and the need for a high ratio of elastic modulus to yield stress in the soft-spring. The type of structure described with reference to FIGS. 36 and 37 allows the soft-spring and stiff-spring elements to be formed from unlike, but most appropriate materials such as, for example, beryllium copper for the soft-spring and annealed low-carbon steel for the stiff-spring and structure.

Regardless of the material choice and available footprint, the particular geometry of the soft-spring will have the most significant effect on its stress distribution. In one approach, the material may be used as "efficiently" as possible—to strain the largest amount of material as nearly uniform as possible. This consideration suggests soft-spring beams that are curved with a radius of the same order of magnitude as the beam length, compound fillets at the roots (i.e., ends of the beam), and an overall taper from the roots, where bending stress is highest, to center, where the lengthwise stress is highest. Beams employing various combinations of these features are seen throughout the figures, but fabrication techniques can limit the extent to which all of these design features may be employed in any particular volume-produced attenuator design. None of the designs shown are particularly divergent from what can be accomplished through a variety of reasonably low-cost manufacturing techniques. FEA is indispensable for designing beams with such complex features and only a few well-chosen design iterations are needed to produce an acceptable design for a particular application.

Figure 48:
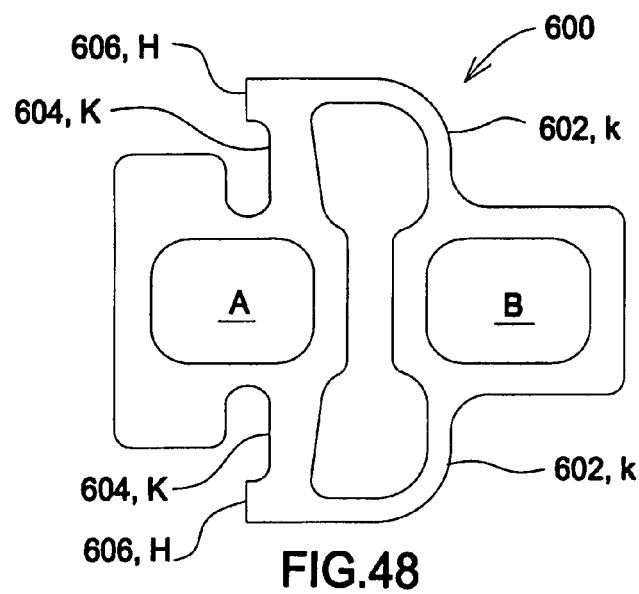
FIG. 48 is a diagrammatic, plan view showing an alternative configuration of a spring-attenuation foot, produced in accordance with the present invention, showing details of its structure, including generally square manipulation recesses.

One highly advantageous structure for spring-attenuation, shown in FIG. 48 and generally indicated by the reference number 600, includes two symmetric pairs of planar beams with different depths with the soft beam (k) pair indicated by the reference number 602 and the stiff beam (K) pair indicated by the reference number 604. Hinging positions (H) are indicated by the reference number 606. Manipulation/attachment positions or tabs are indicated as A and B, with the latter comprising the fine positioning adjustment tab. It is noted that foot 600 is a modified form of foot 302 of FIG. 24, as will be described. With tab A attached to a support surface (not shown), foot 600 advantageously provides a nearly pure translation movement to hinges H without significant twisting out of the plane of the foot. The positions of hinges 606 are made nearly insensitive to undesired foot rotation during attachment or manipulation by arranging the hinge axis (common to both hinges), stiff-spring K, and the initial attachment point A, all at least approximately collinear. Spring/beam regions are preferably slightly thinner (not visible in this view) than remaining portions of the foot, such that the beam members do not themselves slidingly contact the support surface. This arrangement not only provides a smoother motion during fine-adjustment, but further serves to prevent the beam/spring elements from sticking, for example, on a piece of dirt or surface irregularity during adjustment, only to release later and misalign the optic. While this feature is desirable, it may be difficult to produce with certain fabrication methods and may, therefore be omitted without substantially limiting any of the functionality of foot 600 with its attendant advantages. In this regard, Applicants have empirically and routinely observed observe tenth-micron resolution when sliding stainless steel metal feet over a stainless steel supporting surface. It is noted that incorporation of this relief in the beam elements will, however, allow the stiff beam to deflect vertically as a reaction to the forces and moments imposed by deforming the structure. Therefore, the stiff beams should be formed sufficiently short and wide so as to avoid bending contact with the support surface—such a situation could potentially create an undesirable stick-slip motion of the optical component during fine-adjust or produce a shift after the device manufacture is complete.

Still referring to FIG. 48, one way in which foot 600 differs from previously described foot 302 of FIG. 24 resides in the configuration of manipulation/attachment positions A and B. That is, rather than the circular configuration shown in FIG. 24, these positions are shown in the present figure having a generally square configuration with rounded corners. This may be an advantageous configuration for use in spring-attenuated feet. Surprisingly, however, manipulation tool 90 (see, for example FIG. 3) is used having circular manipulation shoulder 98. This arrangement, using a round tool in a square hole, is thought to advantageously minimize "cross-coupling" during foot manipulation. As the tool is moved in a direction perpendicularly with respect to one sidewall of the square manipulation position, it engages/disengages only that sidewall. In contrast, where the recessed circular sidewall of a circular foot manipulation position is larger in diameter than the diameter of a circular manipulation shoulder that is used to engage it, the tool may engage the circular sidewall of the manipulation position at a point not exactly collinear with the motion of the tool. Depending on the coefficient of friction and the relative sizes of the two circular diameters, this could lead to a slight component of motion that is normal to the direction of travel of the tool (a cross-coupled motion) and make the optimization a bit more complicated.

The square pocket manipulation configuration of FIG. 48 serves in a way which is thought to prevent this by ensuring that, if the tool moves approximately perpendicular to a sidewall, the foot will move in the tool direction. At the same time, it should be appreciated that for a given tool outer diameter, the square pocket is necessarily larger in area than a circular pocket. During attachment by welding, this larger distance between weld pool and the thicker portion of the foot may allow the thinner portion in the weld region to deflect more upon welding so as to produce slightly more attachment shift. For this reason, round, minimum-sized manipulation positions may be used for feet without spring-attenuation, and the square manipulation positions may be used for structures with spring-attenuated feet. Alternatively, a foot may include a combination of circular and square manipulation positions. For example, Position A in the present illustration may have a circular configuration (not shown) while position B may have a square configuration. In sum, it should be appreciated that attachment shift is generally not particularly critical when using spring-attenuated feet such that a balance may be struck between attachment shift and precise positioning.

While foot 600 of FIG. 48 produces sufficient attenuation for use in immediate applications and provides a quantum improvement over many aspects of the state-of-the-art, the present invention contemplates various other applications, for example, that may require still finer adjustment or which may be directed to reducing larger attachment shifts. In addition to increasing beam length, many other configurations which rely on the teachings herein are possible for producing arbitrarily high attenuation while making efficient use of space, as will be seen.

Figure 48A:
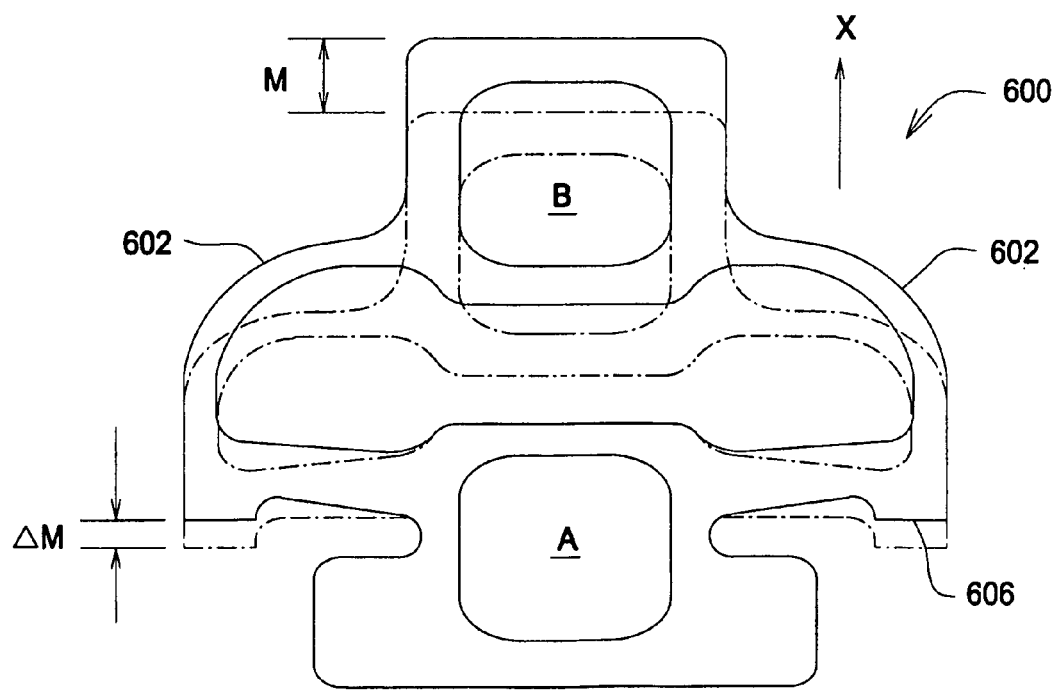
FIG. 48a is a diagrammatic, plan view showing the spring-attenuation foot of FIG. 48, showing its relaxed shape, as well as its deformed footprint resulting from direct manipulation.

Referring to FIG. 48a, foot 600 is illustrated in a relaxed state, as outlined by dashed lines and in an adjusted or deformed footprint state, as outlined by solid lines, after having moved manipulation position B in an x direction, as indicated by an arrow. In this regard, it should be noticed that movement of manipulation position B by a distance M in the x direction, caused by direct manipulation, is significantly greater than the resultant movement $\Delta M$ of hinging positions 606 in the x direction, thereby illustrating the highly advantageous spring attenuation action of foot 600 which is consistent with such action provided by all of the spring attenuation feet described in the context of this overall disclosure.

Figure 49:
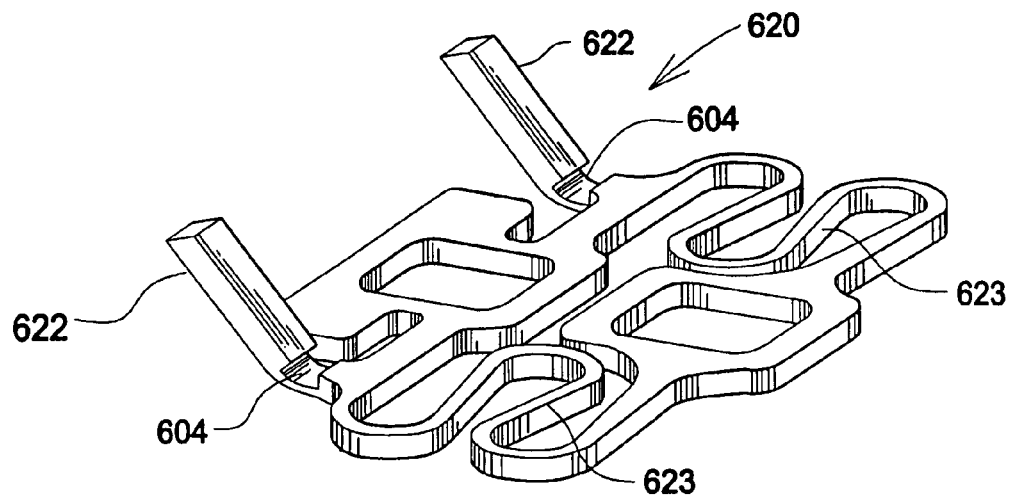
FIG. 49 is a diagrammatic, plan view showing another alternative configuration of a spring-attenuation foot, produced in accordance with the present invention, showing details of its structure including a highly advantageous serpentine soft-spring member.

Turning to FIG. 49, an alternative spring-attenuation foot produced in accordance with the present invention is generally indicated by the reference number 620. Legs 622 (partially shown) form a portion of an overall support structure and are attached to hinging positions 604. This foot differs from foot 600 in its use of a soft-spring 623 with a flattened coil or "serpentine" shape, thereby providing a very low stiffness within a small footprint and maximum stress. Again, the designer should consider out-of-plane buckling for spring elements of this type, especially if the distance between the ends of the spring is long relative to the material length of the spring.

Figure 50:
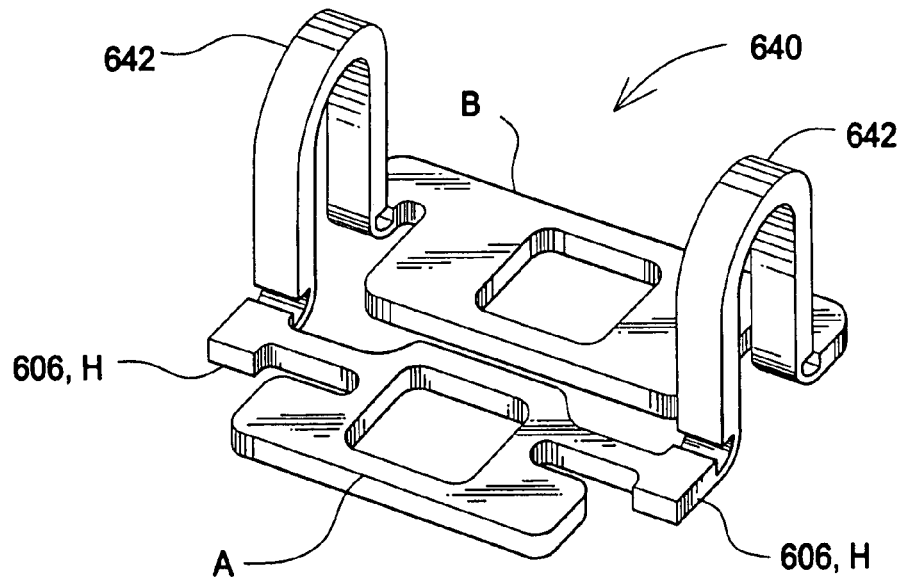
FIG. 50 is a diagrammatic, plan view showing still another alternative configuration of a spring-attenuation foot, produced in accordance with the present invention, showing details of its structure including a highly advantageous out-of-plane soft-spring member.

Referring to FIG. 50, another alternative spring-attenuation foot, produced in accordance with the present invention, is illustrated generally indicated by the reference number 640. Foot 640 includes out of plane, arched springs 642 which are hinged to tabs A and B for purposes of increasing attenuation while minimizing footprint. It is noted that these arched springs may be somewhat challenging to form with repeatability, and are formed best with annealed metal. In this connection, however, it is thought that acceptable tolerances are quite readily achievable in view of increased attenuation levels.

Figure 51:
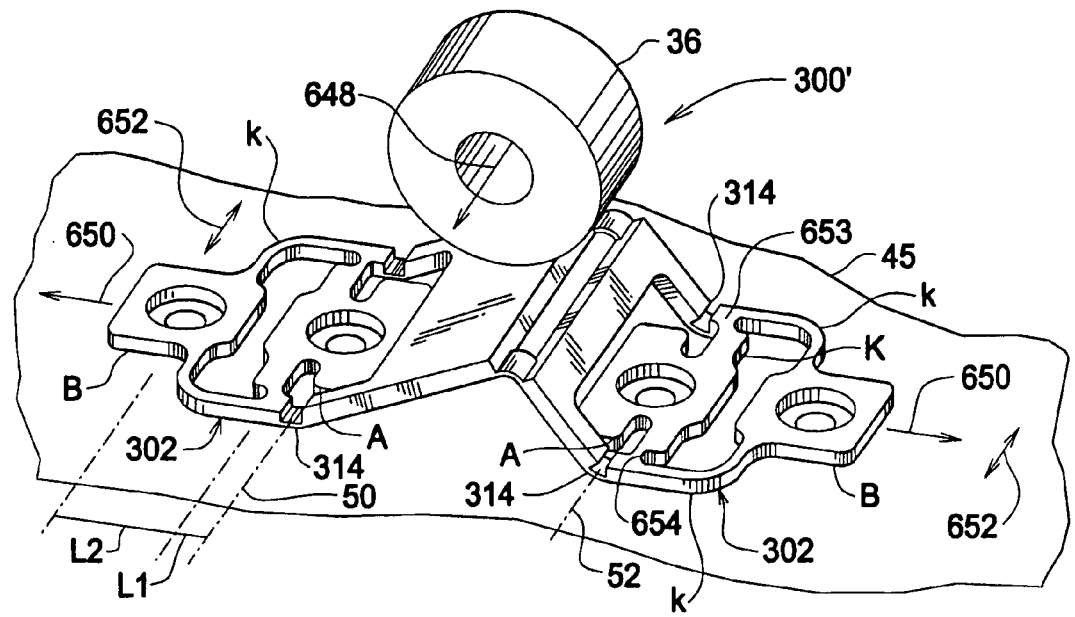
FIG. 51 is a diagrammatic, perspective view showing a modified form of a three-hinge bracket produced in accordance with the present invention.

Referring to FIG. 51, a slightly modified form of three-hinge bracket 300 is illustrated, indicated by the reference number 300", again for purposes of describing its functionality responsive to attachment shifts and, particularly, weld shifts. Tabs A and B are indicated, consistent with the FIG. 48 described above, while optical component 36 includes an optic axis 648. Applicants have observed experimentally that weld shifts occur in any direction, which is seemingly random. Although the present application has, thus far, primarily discussed how the structures described herein perform in a direction 650 indicated by arrows, that is, for movement of either foot towards and away from the other foot, it should be noted that the support arrangements of the present invention are specifically designed to provide spring-attenuation of a weld shift occurring in any direction. To that end, the manner in which the support structures of the present invention attenuate weld shift which occurs at fine-adjustment positions (tab B), for example, in directions 652, indicated by double-headed arrows, that are parallel to optic axis 648 (still in the plane of support surface 45), and a "vertical" shift (perpendicular to both support surface 45 and optic axis 648) will be described immediately hereinafter.

Still referring to FIG. 51, for a weld shift at tabs B in the direction parallel to optic axis 648 (along direction 652), arc-shaped soft-springs k deform in much the same fashion as for a shift in direction 650. Responsive thereto, stiff beams K provide a rotational stiffness at a point 653 (only one of which is indicated), which is of the same order as its translational stiffness. For most configurations, a soft-spring with uniform stiffness in the plane of the support surface is a natural result of designing the beam for minimum stress and maximum deflection, as described previously. It is important that soft beam k be sufficiently thick in the region near the attachment point to stiff beam K so to prevent unexpected deformation during manipulation.

By simple modification of stiff beam K, the structure may be designed explicitly to include fine-adjustment in the direction along optic axis 648, in addition to attenuating shift in this direction. One example is shown in FIG. 51, in which a small notch 654 has been cut from the end of stiff beam K. This reduces the rotational stiffness of the stiff beam about point 652, while retaining most of the translational stiffness. As described above, a motion along optic axis 648, or a rotation of the foot in the support plane may be advantageously used to produce a twisting or degree of "pitch" to the optic when connected to an appropriate structure.

Continuing to refer to FIG. 51, for a weld shift in the vertical direction (normal to feet 302), soft-spring k will be slightly stiffer than for in-plane shifts and stiff beam K will usually be less stiff (loaded in nearly pure torsion) than for in-plane shifts. However, the tooling and attachment scheme of the present invention limits vertical shifts at the fine-adjust point due to welding or tool release, as previously described. In practicing the present invention, Applicants have observed vertical shifts routinely less than 0.5 μm. This motion is reduced not only by the spring-attenuation of the foot structure, but also by mechanical leverage. It is observed that a vertical motion at tab B produces a motion at hinges 314 in an opposite direction according to lengths projected parallel to direction 650 (shown adjacent to one of the feet) in a ratio of a first projected length L1, between hinge 314 and an effective end of the stiff beam, to a second projected length L2, between tab B and the effective end of the stiff beam. That is tab B (at the center of the attachment shift) and hinge axis 314 form the ends of levers, each having an effective fulcrum position provided by the twisting of stiff beam K. As previously discussed, the attachment shift responsive motion of hinging position 314 is further reduced at the optic by structural attenuation.

Figure 52:
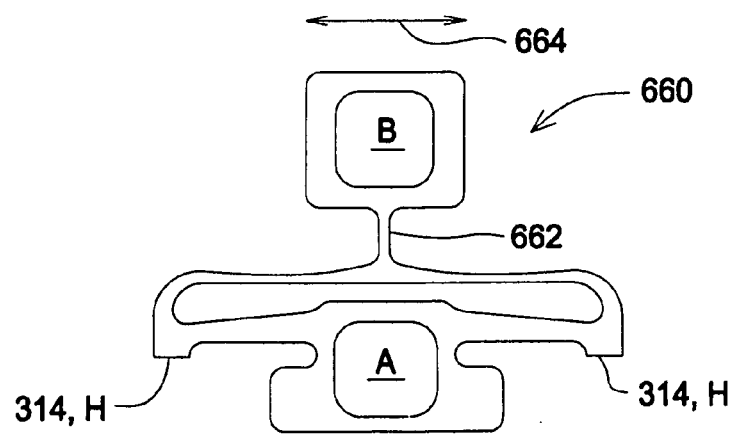
FIG. 52 is a diagrammatic, plan view showing a spring-attenuated foot, produced in accordance with the present invention, illustrating details of its structure.

Referring to FIG. 52, a spring-attenuation foot structure, produced in accordance with the present invention and generally indicated by the reference number 660, is illustrated which uses separate spring elements to attenuate motion in respective directions. Specifically, a beam 662 allows fine-adjust attachment point B to shift parallel to the optic axis, in a direction 664, without causing a significant motion of the structure attached at hinging positions H (also indicated by reference number 314); consequently, however, beam 664 does not allow for significant correction of attachment shifts in direction 664. It should be appreciated that this foot structure is a variation relating to fundamental recognitions teachings herein. In one exemplary implementation, foot 660 may be useful for fitting into certain devices that constrain the shape of the spring-attenuator footprint.

Figure 53:
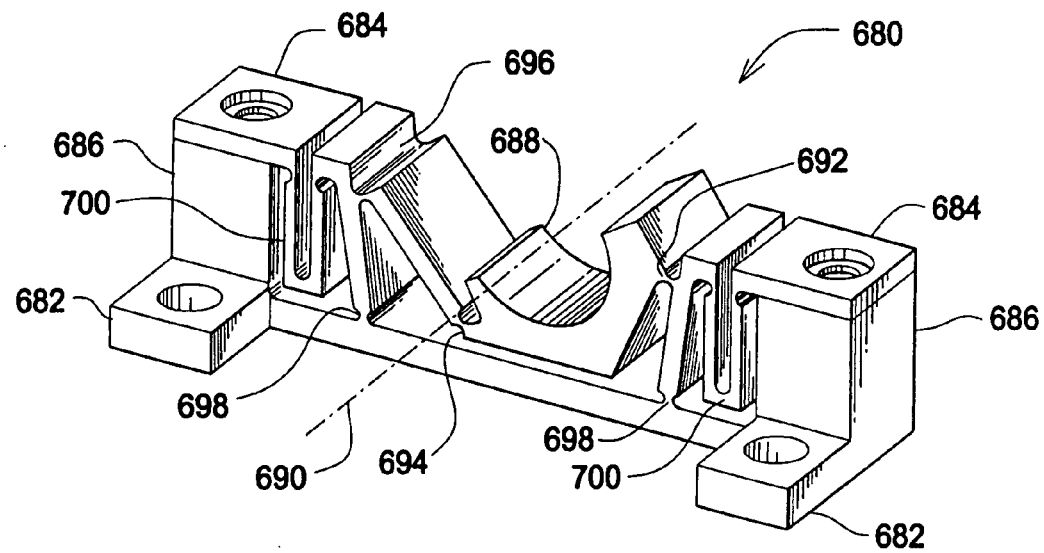
FIG. 53 is a diagrammatic, perspective view showing a support structure, produced in accordance with the present invention, illustrating details of its construction wherein spring-attenuation elements are built into portions of the structure other than its feet.
Figure 54:
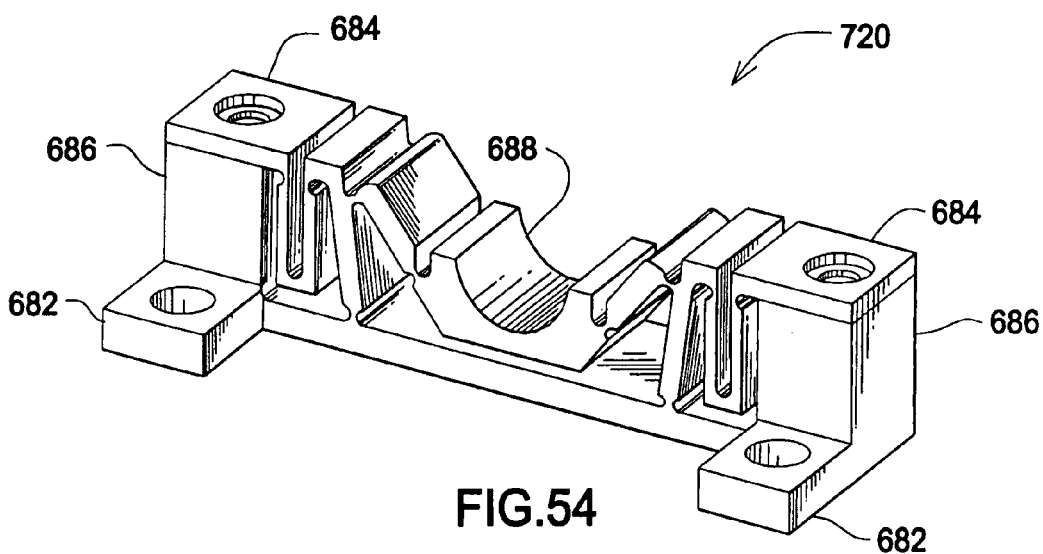
FIG. 54 is a diagrammatic, perspective view showing another support structure which resembles the structure of FIG. 53, but which includes a four-hinge support arrangement residing between a pair of support posts.

Referring collectively to FIGS. 53–54, as will be described in further detail, configurations are demonstrated in which the spring elements do not reside separately in the foot or the end of the leg of the structure, but are integral to the structure itself. These structures attenuate weld shift in the plane perpendicular to the optic axis, similar to the structures previously described; but, they are relatively stiff in the direction of the optic axis and do not provide spring-attenuation in this dimension. In this regard, lenses, like other optical components are least sensitive to motion along their axis, so these structures remain very useful for lens mounting, among other applications.

Turning specifically to FIG. 53, a support structure, produced in accordance with the present invention, is generally indicated by the reference number 680. This structure may be coarsely positioned (for example with a "pick and place" robot) on a support surface (not shown) and attached at tabs 682. A comparison of structure 680 with previously described structure 500 of FIG. 40 may be made by the reader in order to gain a sufficiently complete understanding of its attributes. Sliding tabs 684 against support pedestals 686 provides fine-adjustment of an optic holder cradle 688 within a plane that is at least generally perpendicular to an optic axis 690. An optical component (not shown) may be supported and attached in cradle 688 in any suitable manner so as to define optic axis 690. During the initial coarse positioning, no vertical adjustment is available; accordingly, fine positioning provides the entire required range-of-motion for vertical adjust. A typical vertical coarse positioning accuracy is ±0.0005 inch. With a spring-attenuation of 10×, the required range of motion of tab 684 is then 0.005 inch for vertical adjust, and an additional 0.005 inch for horizontal adjustment. Moving tab 684 by 0.010 inch provides an approximately 0.0025 inch radius range of motion to the optic with 10× attenuation of the attachment shift.

Still referring to FIG. 53, to accommodate such a relatively large range of motion during fine positioning, hinges 692, 694 and 696 function individually as structural kinematic hinges, and collectively as a portion of the stiff-spring. The remainder of the stiff-spring stiffness is generated by hinges 698. All stiff spring hinges are allowed to deform plastically, but still provide an effective stiffness that is at least ten times greater than the stiffness of U-shaped spring-attenuation elements 700. The concept of allowing the stiff-spring element to deform plastically may be applied to any structure herein to increase the available range-of-motion. The number of adjustment cycles is determined by factors including material strain hardening such that special design consideration should be given to material choice and analysis of residual stress.

FIG. 54 illustrates a support structure 720 which still more closely resembles structure 500 of FIG. 40, including support cradle 688 for receiving the optical component.

Figure 55:
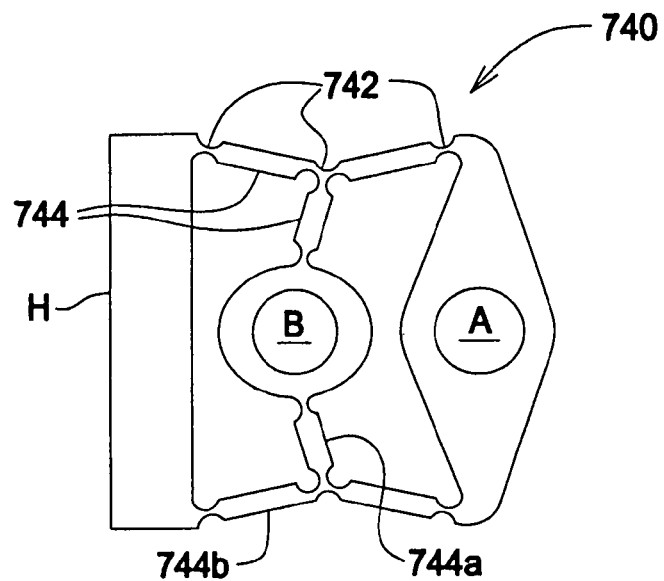
FIG. 55 is a diagrammatic, plan view showing another highly advantageous implementation of a foot, produced in accordance with the present invention, shown here to illustrate an arrangement of hinges and struts which provide spring-attenuated fine-adjustment.

Turning to FIG. 55, another implementation of a foot in accordance with the present invention is generally indicated by the reference number 740. Foot 740 includes attachment tabs A and B, consistent with previous descriptions as well as a hinging axis H. Like previous implementations, the foot is first attached at a tab A, then re-adjusted and secondly attached at a point B in a way which produces advantages consistent with those described above. In this form of structure, a linkage causes deformation of the foot and a motion at H that is less than the motion of tab B. Specifically, this particular example uses a kinematic linkage composed of flexural hinges 742 and thicker struts 744. It is noted that, as struts 744a become more nearly orthogonal to struts 744b, the amount of attenuation increases and the available range of fine-adjust motion decreases. It should be appreciated that there are many configurations for achieving this mode of reduction. One potential advantage of this embodiment resides in the fact that the final stiffness provided by the foot to point H may be higher than that in a system based on elongated spring-attenuation members. High stiffness, however, is not required for immediate purposes, but could be advantageous for a structure required to produce larger forces in order to position the optic. Moreover, both approaches to foot design use direct manipulation, spring-attenuation feet in a manner that is consistent with the overall teachings of the present invention.

Referring again to FIGS. 4 and 5, attention is directed to one aspect of the attachment mode wherein frictional is employed to resist attenuation, for example, during attachment by welding. In this regard, it should be appreciated that the bias force 100, used to increase frictional resistance to weld shifts, may be capable in some instances of generate changes in the shape of the mounting surface immediately beneath the foot which, in turn, may result in changed optical coupling when the biasing force is removed. Any such effect is readily minimized or essentially eliminated, however, by supporting the structure directly under the positions where force is applied. It should be recognized that, for a given optical module, there are numerous configurations that may be employed; the magnitude of the subject effect will, of course, vary depending on the structure, as will the various options for addressing it. Those skilled in the art will recognize that one very straightforward approach is to support the module directly underneath the spots where a biasing force is applied, and to avoid exerting force elsewhere on the module.

In very limited cases, a vertical bias force of several pounds, in order to implement the attachment mode, may be unacceptable. In these situations several options remain:

Lower biasing forces may be employed so long as tolerances and resulting alignment precision remain acceptable.

Again, lower biasing forces may be employed, recognizing that adjustment precision is reduced. Responsively, spring-attenuation is designed in to provide correspondingly larger attenuation so as to "absorb" resulting, larger attachment shifts. This approach may potentially require a larger footprint and/or a reduced fine-adjustment range.

Use rigid motion stages and manipulators, as opposed frictional forces, to resist attachment shift.

Use some balance struck between two or more of these items 1–3.

With regard to item 3, the use of "hard" tooling in these limited circumstances, it should be appreciated that the manipulation configurations described above are either useable as-is or readily adaptable. For example, the sharp tip manipulation configuration shown in FIGS. 18 and 19 may be used. In embodiments using a manipulation recess in the foot (see, for example, FIGS. 14 and 15, the manipulation tool and cooperating recess may employ, for example, a conical configuration so as to eliminate play between the foot and manipulation tool to rigidly hold the foot in place during attachment. In this regard, Applicants are unaware of any prior art approach that uses such clamping or gripping of a foot arrangement in order to resist attachment shift. This alternative approach taken by the present invention is considered to be highly advantageous in and by itself.

Once again considering thermal design and long-term stability, the present invention incorporates design features intended to prevent drift for the rated lifetime of the device, typically twenty years. Mechanisms contributing to drift include: differential expansion during device temperature cycles, external shock and vibration, and creep.

Optoelectronic devices must operate over a temperature range that varies by 50 to 100° C. Considering that typical values of Coefficient of Thermal Expansion (CTE), change-in-length per length per unit change in temperature, for metals is approximately 10 to $20 \times 10^{-6}/°$ C. and the positioning structures herein are dimensionally on the order of 1 to 8 mm, a structure designed without regard for temperature performance could move the optic by approximately 5 to 20 microns over a 100° C. temperature change—potentially causing degradation of device performance. Accordingly, the support structures of the present invention are designed with consideration for the material CTE and structural kinematics, such that the optic is provided with an effective CTE that is appropriate for interfacing with other components in a particular application. For example, if the lens mounting structure, the supporting surface, and the lens holding ring are all made of material with the same CTE, all dimensions change by the same proportion, such that the lens moves as if it is attached to a solid block of a material with that CTE. Any differences in CTE between components require the designer to also consider the kinematics of the structure.

The spring-attenuator feet shown, for example in FIG. 48, are largely athermal, even when the supporting surface has a different CTE, provided that the attachment point on tab A and the hinge points H are at least approximately collinear. Furthermore, any motion caused by differences in CTE between the spring-attenuator foot and the supporting surface is subject to spring-attenuation and, hence, is divided by the attenuation value.

As a structure deforms slightly with temperature changes, regions that have deformed plastically will change responsive to changing internal stresses. The slight motion of these regions as "yield boundaries" could cause a redistribution of internal stress and may be a mechanism for long-term drift of the structure. Accordingly, the spring-attenuators of the present invention may be fabricated from ¼-hard steel and are designed to induce a maximum stress that does not exceed yield.

Creep should not contribute substantially to drift. Although the stress in some of the spring-attenuators of the present invention may be within 50 to 80 percent of yield in some areas, the temperature of the structure normally remains below 100° C., which is less than 10% of the preferred materials' melting temperatures.

The use of laser welding has been described in detail above for purposes of forming attachments in the context of the present invention, however, it is to be understood that other attachment techniques may be utilized including, but not limited to other types of welding, soldering, or adhesive-based forms. It should also be understood that the benefits derived from the structures and method described herein extend not just to attachment by laser welding, but to any suitable method of attachment.

Significant benefits associated with the practice of the present invention include:

Reduced or essentially eliminated spring-back due to disengagement of tool or clamp, by restricting engagement of the mounting bracket to the very hardest segment—mainly the top of the foot or feet. Assuming the most basic precautions against warping of the feet, mentioned below, this benefit extends to methods of attachment considered to be within the scope of basic structures and methods described herein.

Frictional force between the foot and the mounting surface provides resistance to attachment shift, regardless of the method of attachment (welding, adhesive, etc.), as long as basic precautions are followed, as described. In this regard, it is clearly helpful to insure that the bottom of the foot and the top of the mounting surface are in intimate contact, with some vertical biasing, over at least a fraction of the total footprint.

The sheer simplicity of the attachment method, i.e., a flat plate being bonded to a flat surface, is conducive to high integrity bonds with minimum shift for any suitable bonding method. Other structures throughout the prior art typically use at least several joints with less symmetry and lower "ease of use." The fact that the present invention adjusts position by pushing the feet around, in the first instance, enables a remarkably effective use of flat plates as feet.

The kinematic structures of the present invention perform their basic functions irrespective of the attachment method. Main functions of these structures include, for example, providing support to the optic, allowing for adjustment of the optic along a predetermined path determined by the motion of the feet, and attenuating foot shifts at the optic as desired by application of mechanical advantage in the kinematics.

In cases where attachment shift requirements are not fully satisfied using foot manipulation and frictional shift resistance, spring-attenuators may be designed into the feet so as to still further reduce attachment shift, regardless of the chosen bonding technique.

Briefly considering the motivations which continue to drive the prior art, a traditional reliance on laser welding is thought to be seen largely for two reasons: first, the field of heating is modest when compared to most brazing or soldering, which helps reduce shift and warping. Laser welding is itself a form of spot-welding, to the extent that the field of heating is limited to the vicinity of the weld spot much in the same way as in properly managed resistance spot-welding. Certainly in photonic device manufacturing it is beneficial to minimize the field of heating—one does not generally want to "cook" the entire module in order to make an attachment. Second, perhaps more importantly, laser welding is a non-contact method. In this regard, it is submitted that most configurations in the prior art would behave very poorly if the attachment system came into contact with the assembly during positioning and attachment. For example, in all of the prior art methods of which Applicants are aware, it would be extremely difficult to utilize resistance spot-welding without suffering large shifts, since typical spot-welding electrodes apply several pounds of force.

By contrast, the approach of the present invention lends itself rather nicely to spot-welding. Specifically, the present invention already may use an electrode-like structure for positioning; and already may introduce several pounds of force at the tool in order to achieve fine positioning and minimal shift.

Based on state-of-the-art resistance spot-welding, so called "parallel gap" resistance spot-welding appears as an attractive and highly advantageous option in the context of the present invention. The parallel gap technique is typically preferred for resistance spot-welding a thin metal plate (2–10 mils) to a thicker metal plate (>50 mils); the use of parallel probes provides a mechanism to minimize heating of the thick mounting plate, since the current path follows a curved path limited to the neighborhood of the weld, as is known in the art.

Figure 56:
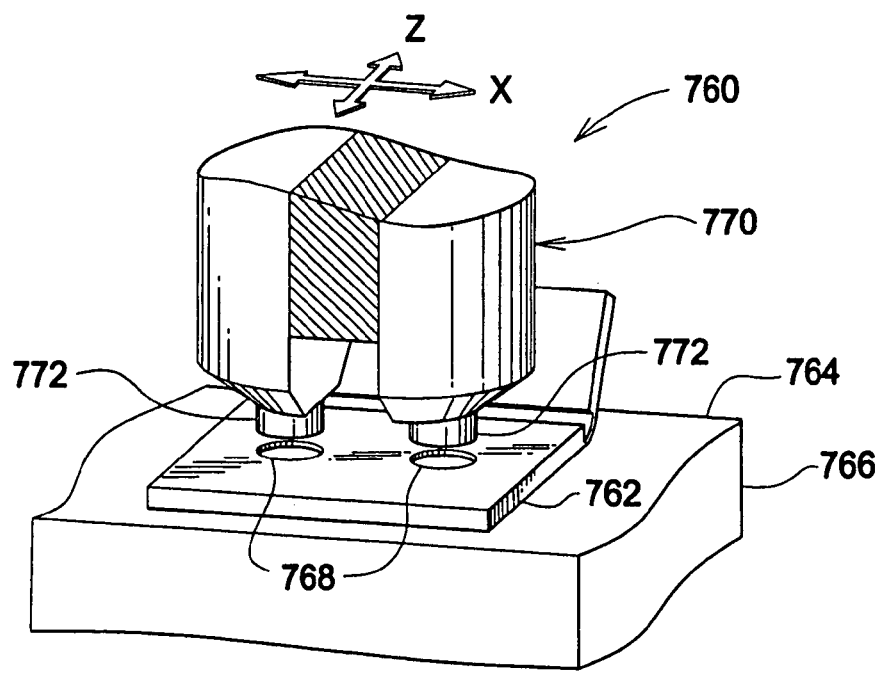
FIG. 56 is a diagrammatic, perspective view illustrating one configuration of a system for performing parallel gap resistance spot-welding on a support structure foot in accordance with the present invention for purposes of attaching the foot to a support surface.

Referring to FIG. 56, one configuration of a system using parallel gap resistance spot-welding, in accordance with the present invention, is generally indicated by the reference number 760. System 760 includes a foot 762 having a lowermost support surface (not visible) that slidingly engages a support surface 764 of a support structure 766 which is only partially shown. Foot 762 includes a pair of indexing recesses 768 and is hingedly attached to an overall support structure which is only partially illustrated. Indexing recesses 768 may comprise slight divots in the upper surface of foot 762 which may be formed, for example, by etching. Peripheral sidewalls of the recesses may be as small as, for example, 1 mil. A manipulation/attachment tool 770 includes a pair of manipulation and weld electrodes 772, shown hovering immediately above recesses 768 for purposes of illustrative clarity and about to engage the recesses. One of the benefits of system 760 resides in the capability to simultaneously use the weld electrodes as a manipulation tool in the manner illustrated. That is, electrodes 772 may be used to push against the peripheral sidewall of recesses 768 with the lowermost surface of foot 762 in sliding engagement with surface 764 in a manner that is similar to that described with regard to region 84 of FIG. 3. Moreover, the aforedescribed movement and attachment or locked modes, along with their attendant advantages, are equally applicable with regard to this implementation. It is noted that a circular configuration of electrodes 772 and recesses 768 is not required and that any suitable shape, such, as for example a square pocket or recess may be used. With regard to details concerning the attachment mode, when the spot-weld is actually accomplished, it is noted that pressure may be applied to indexing recesses 768 in a highly advantageous manner with respect to limiting attachment shift since downward biasing force applied by electrodes 772 is in the immediate weld region, as will be described immediately hereinafter.

With regard to reduction of attachment shift, it is recognized herein that spot-welding force requirements, typically several pounds such as employed in the system of FIG. 56, and similar implementations, are consistent with the desired force needed to manage weld shift by utilizing friction, as described in the teachings above which consider laser welding using the highly advantageous feet of the present invention. The fact that the welding electrode and the manipulator are one and the same is even further advantageous in eliminating the need to clear the laser beam, as in laser spot-welding. In the context of laser welding, it will be recalled that to avoid spring-back from tool liftoff, the weld spot was placed as close as physically possible to the manipulator tip. In the case of spot-welding this occurs naturally, insuring that the tool liftoff occurs very close to the weld nugget, hence minimizing spring back due to micron or sub-micron warping of the plate in the vicinity of the weld.

Figure 57:
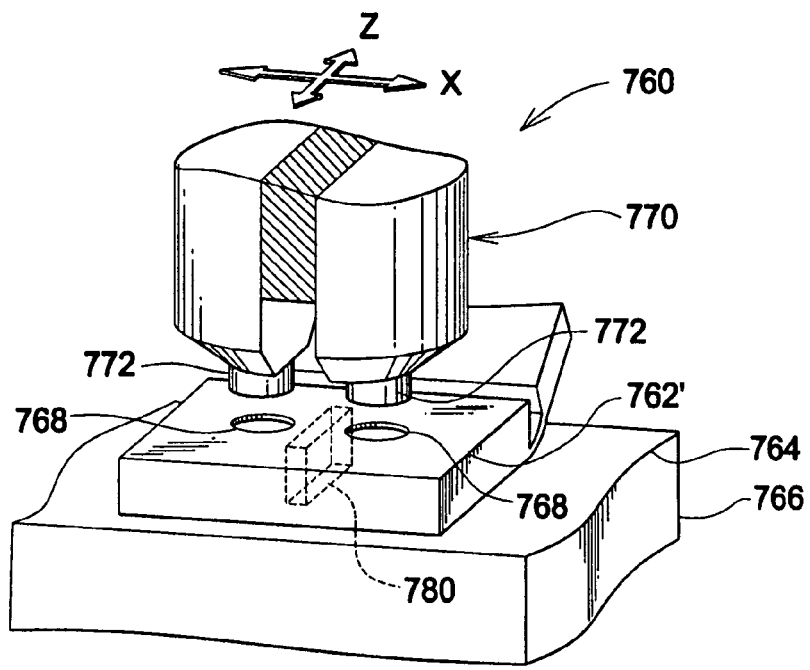
FIG. 57 is a diagrammatic, perspective view illustrating a modified system for performing parallel gap resistance spot-welding on a support structure foot, in accordance with the present invention, having a slot or gap introduced in the configuration of the foot.

Turning to FIG. 57, an alternative configuration of system 760 is illustrated wherein a foot 762' includes a void 780 in the form of a slot or gap that is introduced between recesses 768 to reduce so called "shunt" heating of the foot—with the intention of eliminating certain current paths that produce excess heating.

Another useful form of attachment is known as "resistance spot brazing." In this process, the parts to be joined (i.e., lowermost surface of a foot as well as the support surface engaged therewith) are coated, at least at the joining surfaces, with brazing materials having a lower melting temperature than the parts to be joined. In the context of the present invention, this method can be used to reduce the field of heating, which may in turn reduce weld shifts, reduce warping, and allow further control over the extent of the weld nugget, since the nugget cannot penetrate deeper than the coating. Still further control of the weld nugget is provided in a specific implementation to be described immediately hereinafter.

Figure 58:
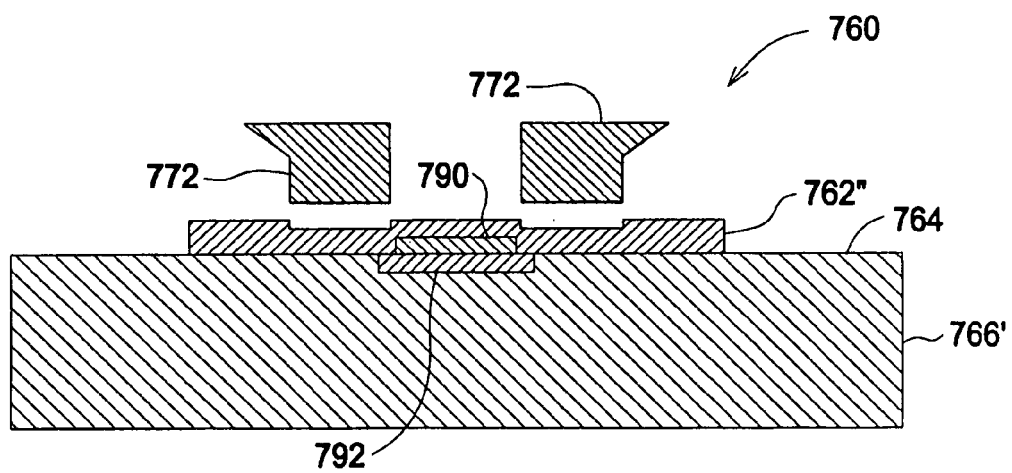
FIG. 58 is a diagrammatic, cross-sectional view, in elevation, of a system configured for performing resistance spot brazing on a support structure foot, in accordance with the present invention, for attachment of the foot to a surface.

FIG. 58 is an elevational view, in cross-section, taken through a modified foot 762", a modified support structure 766' and tool 772 which illustrates an alternative configuration of system 760 for purposes of attachment in the practice of the present invention using resistance spot brazing. More specifically, this configuration resistance brazes foot 762" and support structure 766' to one another. To that end, foot 762" includes a first inset 790 that is filled with brazing material while support 766' includes a second inset 792 that is also filled with brazing material. Heating is induced using electrodes 772 in a manner that is known in the art. With regard to this alternative configuration, it is suggested that physical asymmetries in weld nuggets may often be a factor in producing weld shifts—misshapen and oblong weld nuggets exhibit less symmetry and are more likely to pull in a preferred direction—by introducing a well-defined finite braze area, and applying just enough heat to insure that insets 790 and 792 both melt entirely, the production of a well-defined symmetric weld nugget is contemplated which, upon cooling, may produce less shift.

Having considered various attachment techniques using welding, adhesive attachment techniques will now be addressed for use in the practice of the present invention. Initially, if it is assumed that adhesive is strategically introduced so that some fraction of the footprint of the foot remains in contact with the mounting surface, the position of the foot may be adjusted prior to curing—in this method, the curing step is analogous to spot-welding, as taught above.

Continuing to discuss adhesive attachment, adhesives generally require at least a minimum bond thickness. Clearly, in sub-micron precision mounting, adhesive bonding flat plates to a flat mounting surface may be problematic if no measures are taken to achieve sub-micron level control over the final adhesive thickness. The configurations shown in FIGS. 59–63 representatively address this issue. Generally, inset adhesive areas insure a specific glue thickness while peripheral surface-to-surface contact sets the foot height before and after bonding. The manipulation tool is intentionally placed over an area with surface-to-surface contact in order to minimize spring back.

Figure 59:
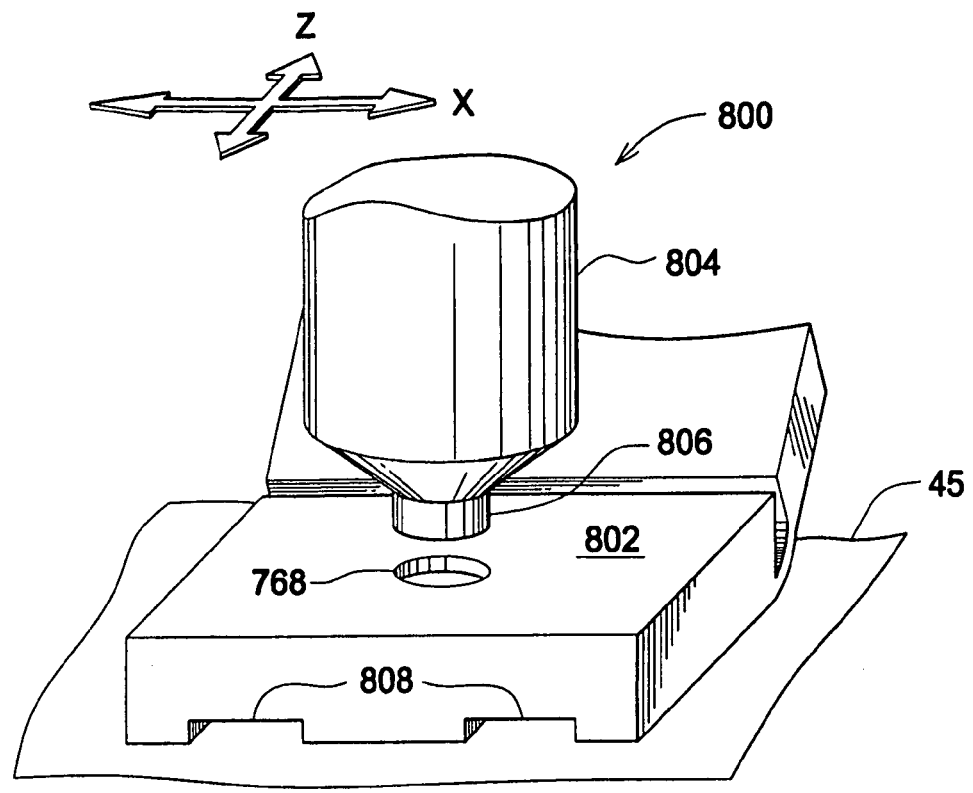
FIGS. 59 and 60 are diagrammatic, perspective views, of an adhesive attachment system, produced in accordance with the present invention, illustrating details with regard to adhesively attaching a support bracket foot to a support surface wherein a lower surface of the foot includes slot-like adhesive recesses.

Referring to FIG. 59, an adhesive attachment system is illustrated, produced in accordance with the present invention and generally indicated by the reference number 800. System 800 includes a foot 802 defining one recess 768, however, a pair of recesses may be provided where the capability to twist the foot during manipulation is desired. Again, foot 802 is hingedly attached to an overall support structure which is only partially shown. Manipulation of foot 802 is performed by engaging recess 768 using a manipulation tool 804 having an engagement end 806 and moving the foot against support surface 45.

Figure 60:
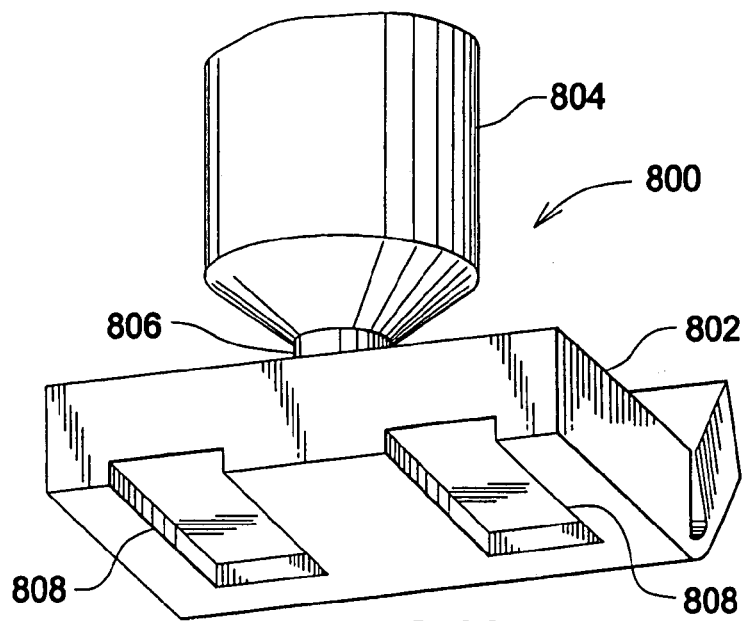

Turning to FIG. 60 in conjunction with FIG. 59, the former provides a perspective, bottom view of foot 802 wherein it is seen that the foot includes a pair of parallel adhesive insets 808 arranged spaced equally offset from manipulation recess 768. With regard to the latter, it should be appreciated that a manipulation recess is not a requirement, as an exemplary alternative, foot 802 may be configured in a manner that is consistent with that shown in FIGS. 18 and 19, using a sharp manipulation point which penetrates the surface of the foot to a limited extent for accomplishing manipulation of the foot. Associated descriptions of FIGS. 18 and 19 provide specific details with regard to implementation of such an arrangement. In all of the adhesive-based implementations described, care should be taken to avoid adhesive working out of the adhesive insets during the adjustment phase, while the foot is manipulated against the support surface. One approach resides in injecting the adhesive through holes (not shown), after fine positioning is achieved. As a further enhancement, a pattern of holes (not shown) in the top of the foot extending to the position of the adhesive may be useful for admitting UV rays in the case where a UV cure epoxy is used. With regard to adhesives that are suitable for use herein, any suitable adhesive currently available or yet to be developed may be used. Presently available options include, as examples, thermally cured epoxy or UV cure epoxy.

It should be appreciated that there are other ways to insure a set height of the foot against the support surface when potentially influenced by adhesive. For example, if no adhesive reservoirs or insets are provided, another approach may use a powder-loaded or bead-loaded adhesive. Applicants have found that glass powder loaded UV cure adhesives work very well to maintain a set gap when two surfaces are pressed together. It appears from empirical data that the glass powder acts to maintain a gap size roughly equal to the average size of the glass bits—the glass powder granules hold the two surfaces apart to set and maintain a natural spacing before and after curing.

Figure 61:
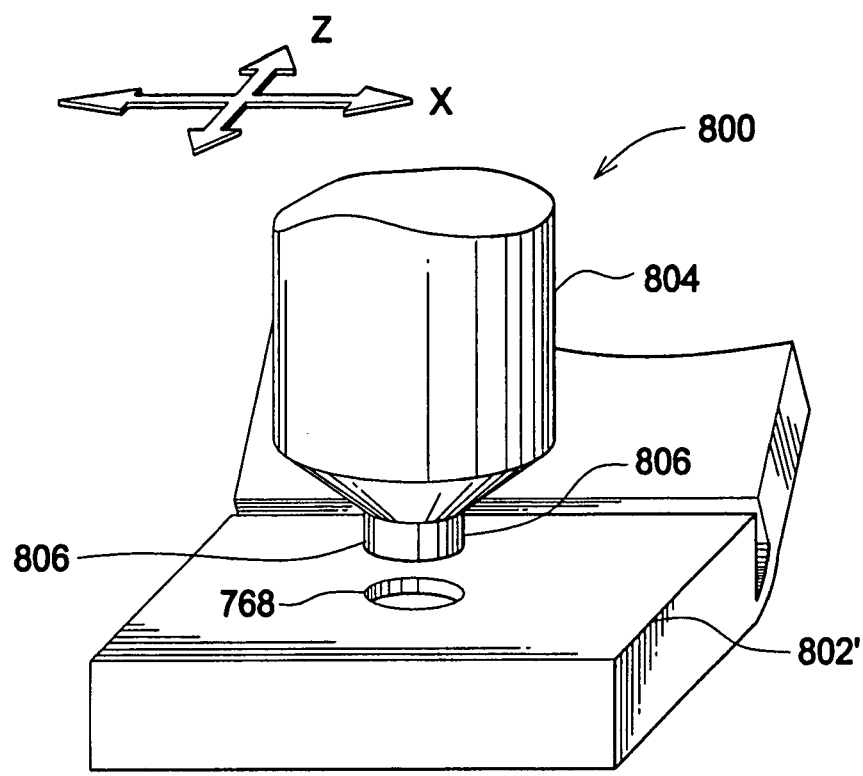
FIGS. 61 and 62 are diagrammatic, perspective views, of an alternative adhesive attachment system, produced in accordance with the present invention, for adhesively attaching a support structure bracket foot to a support surface wherein a lower surface of the foot includes a circular adhesive recess.
Figure 62:
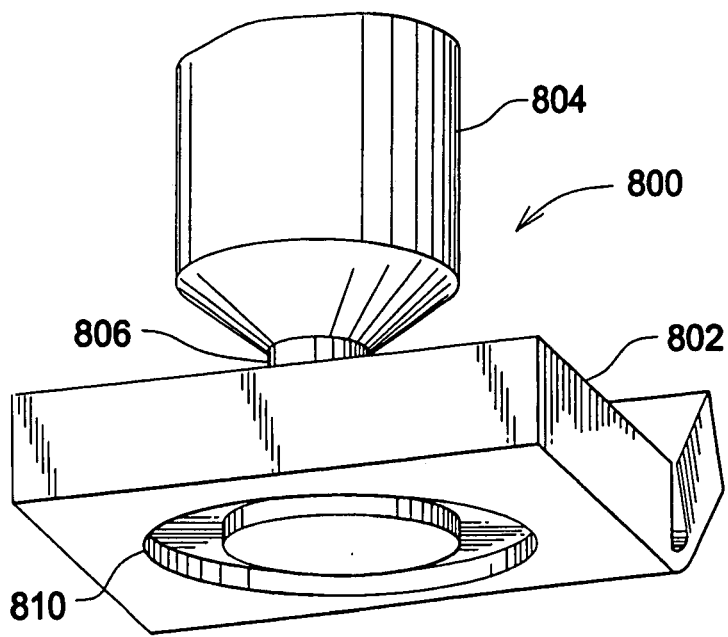
Figure 63:
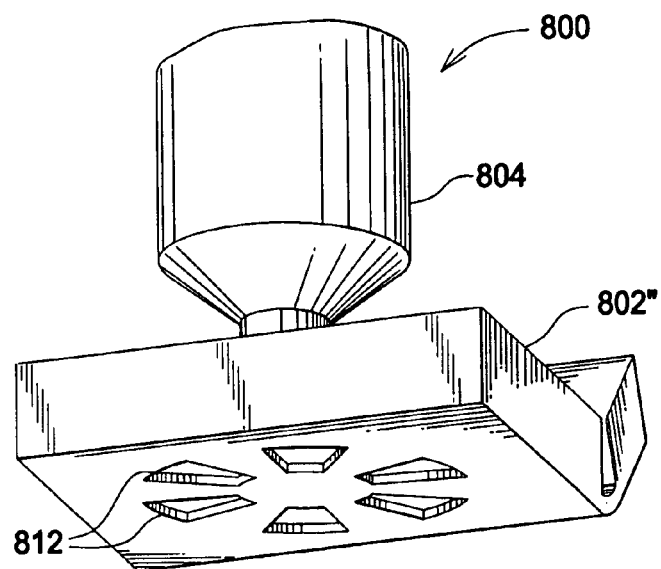
FIG. 63 is a diagrammatic, perspective view of still another alternative adhesive attachment system, produced in accordance with the present invention, for adhesively attaching a support structure bracket foot to a support surface wherein the lower surface of the foot includes wedge-shaped adhesive recesses.

FIGS. 61 and 62 illustrate system 800 including a modified foot 802". Specifically, as seen in FIG. 62, the foot includes a circular adhesive inset 810 which surrounds recess 768 in an equidistant manner in the sense of a plan view. FIG. 63 illustrates still another arrangement of adhesive insets of another modified foot 802 indicated by the reference number 812 wherein the adhesive insets comprise wedge shaped cavities arranged so as to surround manipulation recess 768 in the sense of a plan view. It is to be understood that adhesive recesses may include an essentially unlimited number of configurations, all of which are considered to fall within the scope of the present invention, and that the specific configurations shown herein are not intended as being limiting.

Soldering is still another attachment approach which may be used in the practice of the present invention for purposes of foot attachment. One manner in which this approach may be implemented includes heating the entire area around a support bracket wherein the support bracket includes a pair of feet, which in many cases would be synonymous with heating the entire base-plate on which the mounting surface is located. Adjustment of the position of the feet, and hence the optic, is then accomplished before cooling the system so as to permit the solder to harden. If the bracket feet and the mounting surface are composed of non-solderable metal, appropriate surfaces may be plated with nickel-gold layers, or some other solder-compatible metals known to those skilled in the art.

Aside from a concern arising with regard to heating the entire structure, which is a motivation for focusing on spot-welding methods, the possibility of soldering raises some of the same concern as seen in adhesive attachment: solder joints require a finite thickness which may be difficult to control to sub-micron tolerances. If no precautions are taken, and the feet are merely soldered down with a conventional solder pre-form covering the entire bottom of the foot, the final solder thickness, probably at least 0.5 mils in thickness, would be somewhat difficult to control. The final height of the optic may vary accordingly. To address this, methods reflecting those discussed above with regard to using adhesives may be employed. Specifically, a solder pre-form may be inserted into an inset "reservoir" using, for example, the same geometrical concepts as in FIGS. 59–63 above. Alternatively, solder may be loaded with spacer beads that maintain a steady height during positioning, which presumably takes place with molten solder, and after positioning when the solder is hardened.

The foregoing descriptions serve to demonstrate the strength of the overall approach of the present invention with respect to a multiplicity of differing bonding methods. It should be evident, in view of the examples herein, that the structures and method of the present invention are applicable over a wide range of attachment methods. For example, it is to be understood that there are many ways to bond two flat surfaces together in a lamination, and many known methods of lamination will afford the ability to slide the feet prior to some bonding event. Clearly, most, if not all, viable bonding methods will be accompanied by some degree of shift. In many cases, if the foot and mounting surface are at least partially in contact, frictional force aided by downward biasing of the foot, will reduce or eliminate attachment shift.

Figure 65:
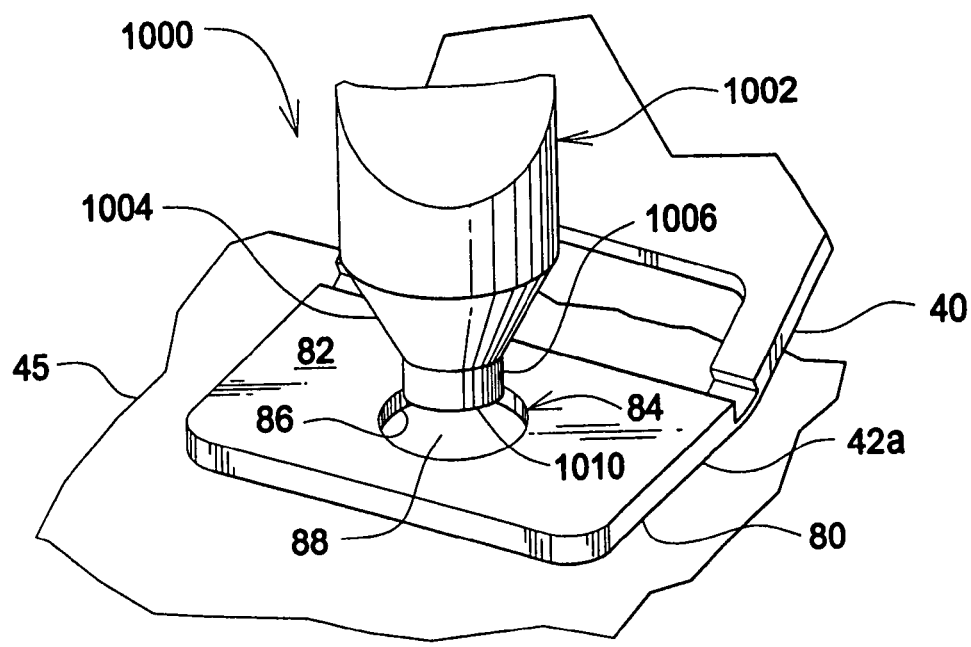
FIG. 65 is a diagrammatic view, in perspective, of one embodiment of a resistance spot welding system, produced in accordance with the present invention, for high precision welding of a workpiece to a support surface using a combination manipulation and welding tool.

Turning once again to the topic of resistance spot welding, attention is immediately directed to FIG. 65 which illustrates one embodiment of a highly advantageous resistance spot welding system, generally indicated by the reference number 1000, produced in accordance with the present invention. System 1000 includes foot 42a, comprising one of the feet of bracket 40, described above with regard to FIGS. 2 and 3. While foot 42a has been described in the context of laser welding to support surface 45, it is to be understood that this foot is useful in a resistance spot welding implementation with minimal, if any, modifications. To that end, of course, foot 42a must be formed from a suitable electrically conductive material such as, for example, stainless steel.

As noted above, laser welding applied to weld region 84 of foot 42a and resistance spot welding are subsets of the overall art of spot welding. In this regard, it is submitted that one of ordinary skill in the art would strongly favor non-contact welding using a laser in high precision applications, since contact forms of spot welding are generally thought by the prior art to induce undesirable weld shift by virtue of the very contact that is required to perform the weld. Photonics assemblies, in particular, are highly sensitive, throughout the entire assembly process, to deformation due to any external forces. Thus, laser welding has been perceived as providing the only viable non-contact method for heating and melting a weld joint in these applications. Moreover, post-weld adjustments have been performed using "laser hammering" to achieve more precise positioning. While laser welding is highly effective for these purposes, there are certain advantages attendant to the use of a suitably implemented resistance spot welding configuration when compared to laser spot welding, as will be described below.

It has been found that system 1000 and its attendant method provide for low shift lap or foot welds using resistance spot welding—at least on the order of that seen when laser welding is used. Accordingly, this method is useful for, but not limited to, applications where parts are positioned and welded to tight (micron or sub-micron) tolerances relative to one another. While one highly advantageous application resides in photonics packaging, where mechanical assemblies routinely require micron or sub-micron precision, system 1000 and its use are equally applicable with respect to any circumstances requiring low shift lap welds.

Figure 66:
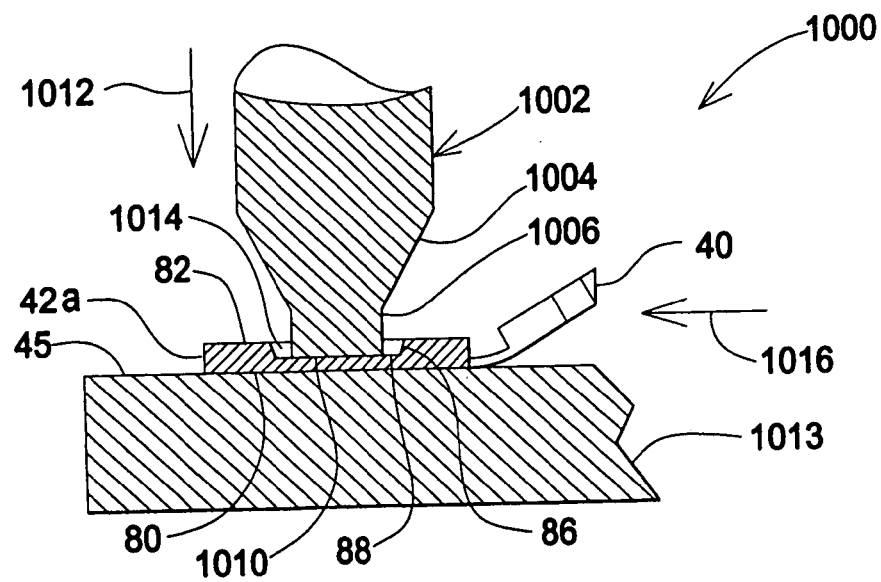
FIG. 66 is a diagrammatic view, in elevation, of the resistance spot welding system of FIG. 65, shown here to illustrate details of its structure.

Turning to FIG. 66 in conjunction with FIG. 65, attention is directed to a highly advantageous combination manipulator/welding tool 1002, which forms part of system 1000. It should be appreciated that tool 1002 has been illustrated to the extent that its features are regarded as heretofore unknown. Remaining portions of the tool, which are not illustrated, may be configured by one of ordinary skill in the art to cooperate with those features which are illustrated such as, for example, motion stages for achieving precision positioning. Tool 1002 extends to a free end 1004 having a peripheral side margin 1006 which delimits an end surface 1010. The latter is circular in shape, but it is to be understood that other suitable shapes may be used, as will be further described. End surface 1010 is electrically conductive for purposes of conducting an electrical current for spot welding foot 42a to surface 45, which is itself electrically conductive. In this regard, it should be appreciated that tool 1002 may be configured in any suitable manner to provide welding current. For example, the tool may be integrally formed, as shown, from an electrically conductive material. Alternatively, an electrode tip (not shown) may be supported by a non-conductive body. Moreover, it is to be appreciated that the overall shape of tool may be modified in any suitable manner so long as the requisite functionality is maintained. FIG. 65 illustrates free end 1004 hovering above weld region 84, while FIG. 66 illustrates end surface 1010, biased against weld region floor 88 by a biasing force 1012 in a direction that is indicated by an arrow. Force 1012 is at least generally normal to support surface 45. The diameter of end surface 1010 is sized such that an annular gap 1014 is formed between peripheral side margin 1006 of the tool and peripheral sidewall 86 of the weld region.

Tool 1002 is configured for selectively engaging foot 42a in a movement mode and a welding mode, based, at least in part, on the value of force 1012. During the movement mode, end surface 1010 of the free end and weld region floor 88 cooperate to establish a first set of characteristics therebetween which limit slipping of the free end on the weld region floor for a given biasing force 1012 of the free end against the weld region floor and for a given movement force 1016 (indicated by an arrow), in any selected direction along support surface 45 and at least generally normal to biasing force 1012, that is intended to move the foot along the support surface for positioning purposes. At the same time, lowermost surface 80 of foot 42a slidingly engages support surface 45, defined by a support arrangement 1013, such that surface 80 cooperates with support surface 45 to establish a second set of characteristics therebetween. The first and second sets of characteristics cooperate to provide for slidingly moving the foot along the support surface at given biasing force 1012 using given movement force 1016 such that the foot moves along the support surface before the free end slips against the weld region floor. It should be appreciated that the first and second sets of characteristics may be influenced in any number of ways so as to achieve the desired behavior, at least through adjusting coefficients of friction and through material selection. As one example, at least one of end surface 1010 and weld region floor 88 may receive an appropriate surface texture, for instance, through an etching process. As another example, end surface 1010 may exhibit a first value of hardness which is less than a second value of hardness that is characteristic of foot 42a and its weld region floor; as examples, forming end surface 1010 using copper and using stainless steel for the foot. Of course, any of these features may be used in appropriate combinations. It is thought that tool 1002, serving as an electrode and manipulator, which bears down directly above the weld may produce smaller weld shifts in cases where the weld area is smaller than the than the electrode tip area (i.e., end surface 1010). Results indicate that, so long as clean and precisely flat mating surfaces—produced, for example, by grinding or machining—provide adequate flatness so as to result in very low liftoff shift, as long as the downward force is provided in close proximity to the weld area. Under such circumstances, the tools described in this disclosure provide such close enough proximity that no liftoff shifts greater than 0.5 microns have been observed.

Figure 67:
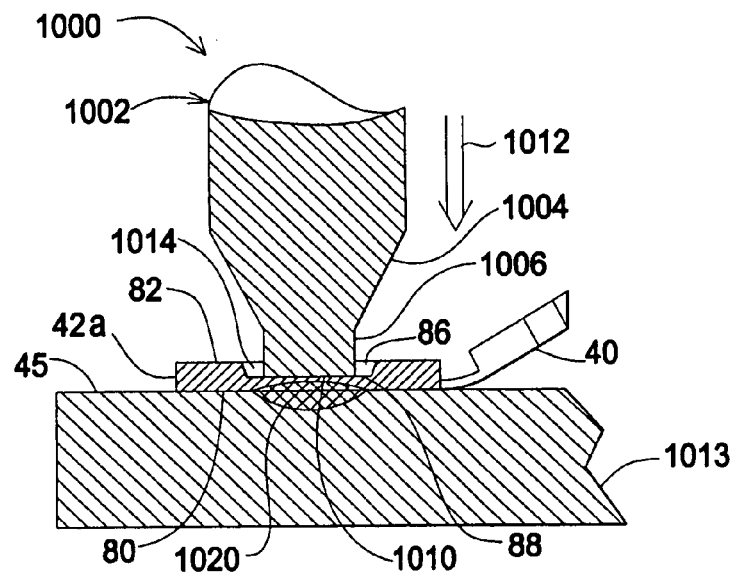
FIG. 67 is a diagrammatic view, in cross-sectional elevation, of the resistance spot welding system of FIG. 65, shown operating in a locked mode for purposes of forming the highly advantageous foot weld of the present invention.

Referring to FIG. 67, it should be appreciated that a contingency is provided in the event that end surface 1010 inadvertently slips against weld region floor 88. In particular and as will be illustrated in a subsequent figure, slip is advantageously limited to a controlled amount by direct engagement between side margin 1006 of free end 1004 and peripheral sidewall 86. By engaging the sidewall of the weld region, tool 1002 is able to resume movement of foot 42a in any selected direction. In this regard, it should be appreciated that end surface 1010 may be re-centered prior to welding, if so desired, in the event that a slip occurs. Still further provisions are described below which are thought to eliminate, from a practical standpoint, any significant influence on process outcome arising from tool slippage, for example, with respect to foot weld 1020 symmetry.

Still referring to FIG. 67, following positioning of foot 42a in the movement mode, a locked mode is entered, during which a foot weld 1020 is produced using an electrical current that passes through end surface 1010 of free end 1006, through weld region floor 88 and through support arrangement 45 using an electrical conductor arrangement and power supply that are readily provided by one having ordinary skill in the art in view of this overall disclosure. It should be appreciated that support arrangement 1013 may provide electrically conductive surface 45 in any suitable manner such as, for example, by being entirely formed from an electrically conductive material, or through the use of an applied coating or a laminated layer. During the locked mode, an increased, locked mode value of biasing force 1012 is applied such that welding induced movement of foot 42a relative to support surface 45 is resisted. It should be appreciated that discussions above with regard to both the movement and locked modes used in other implementations, described above, are applicable with respect to system 1000 even though the geometry is somewhat different. For example, an increase in biasing force is contemplated, commensurate to overcome weld shift forces that may potentially be encountered and at which any manipulator tool induced lateral movement of the foot would most likely produce a stick/slip motion, due to traction of the foot against support surface 45.

Referring collectively to FIGS. 65–67, suitable dimensions for foot 42a have been found to be approximately 2 mm in width and length, and having a thickness of approximately 0.25 mm, although many other dimensional configurations may be found to be useful in view of these overall teachings. The weld region may have a diameter of approximately 15–30 mils, while the weld region floor may be recessed by approximately 0.12 mm so as to have an approximately equal thickness thereunder. In this regard, it is submitted even limited reduction of the thickness of the weld region is advantageous in view of the teachings above. This described dimensional configuration was found to allow for a small weld with less shift, but still having sufficient strength for fixed attachment to support surface 45. Of course, the diameter of end surface 1010 is configured in view of the diameter of the weld region. In the present example, end surface 1010 may be approximately 0.5 mm in diameter. The weld pulse may be approximately 1 ms in duration with a current of roughly 0.3–0.5 KA. One suitable material for forming a workpiece, foot or associated bracket has been found to be stainless steel, although many other suitable materials may be employed. Tool 1002 may be formed, as an example, using copper which is relatively soft as compared to stainless steel. Again, the present invention is not limited to the use of copper or stainless steel and contemplates the use of any suitable material. In this example, the electrode may apply a force of approximately 2 pounds in the locked or welding mode. The movement mode force can range from approximately 0.5 pounds to 2 pounds. It is noted that the movement mode biasing force can be equal to the biasing force in the locked mode where traction of the workpiece foot surface is sufficient to overcome welding induced movement forces. Typical weld shifts have been demonstrated between 0.1 and 2 microns, while shift due to tool lift-off is normally between 0.0 and 0.2 microns.

Figure 68:
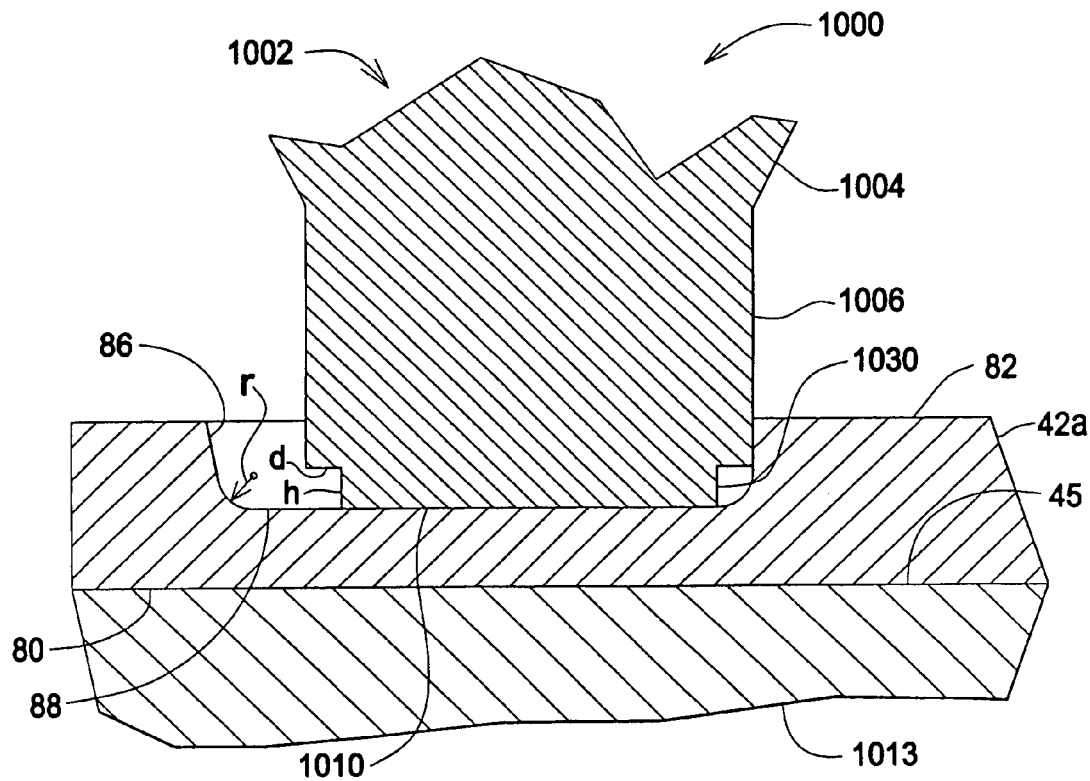
FIG. 68 is a further enlarged diagrammatic view, in cross-sectional elevation, of the resistance spot welding system of FIG. 65, shown here to illustrate one highly advantageous configuration for the free end of its manipulation/welding tool with the tool having slipped so that a side margin thereof engages a peripheral sidewall of the weld region that is defined by the workpiece.

Referring to FIG. 68, an enlarged view of an alternative configuration for free end 1004 of tool 1002 which is shown engaging weld region floor 88 with the tool having slipped such that side margin 1006 of the tool is in direct contact with peripheral sidewall 86 of the weld region. In this implementation, however, free end 1006 includes an inset end diameter 1030, at an inset distance d from peripheral side margin 1006, to delimit end surface 1010. The inset end diameter also includes a height h. At the same time, a radius r joins peripheral sidewall 86 and weld region floor 88 such that r is less than or equal to of d. Dimension h must be greater than zero, but less than the depth of weld region floor 88 from surface 82. It should be appreciated that this configuration and relationship is highly advantageous since d becomes a minimum spacing between peripheral sidewall 86 and peripheral end surface 1010. In this way, the free end of the tool is unable to ride up on radius r, which, if permitted would cause end surface 1010 to come out of contact with weld region floor 88. Moreover, this arrangement assures that foot weld 1020 is symmetrically formed beneath end surface 1010, even with tool slippage. One suitable implementation sets the value of d equal to that of h. In this regard, it should be appreciated that side margin 1006 may be treated in a way which insulates against electrical contact with sidewall 86. While radius r has been shown as an illustrative expedient, an actual radius is not required. Any suitable configuration may be used to connect the weld region floor with peripheral sidewall 86 so long as the configuration allows side margin 1006 of the tool to first physically contact peripheral sidewall 86 of the weld region.

Figure 69:
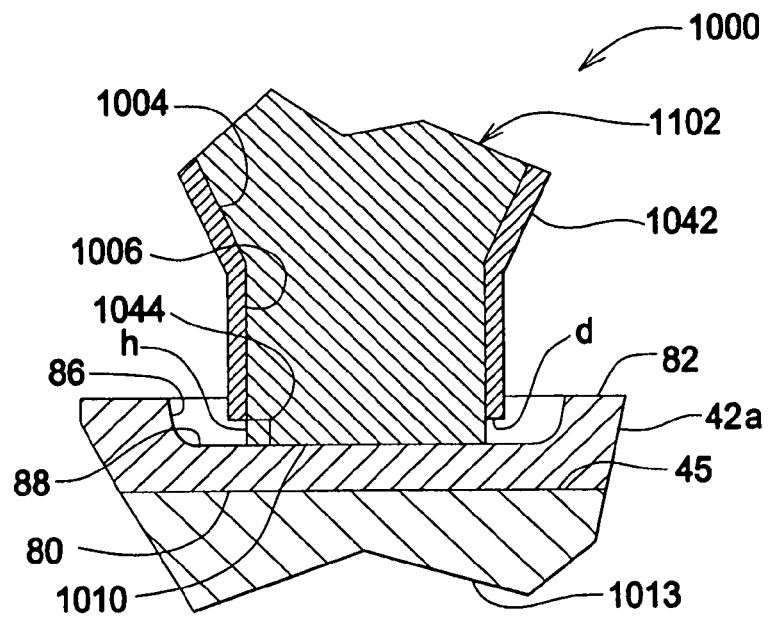
FIG. 69 is a further enlarged diagrammatic view, in cross-sectional elevation, of the resistance spot welding system of FIG. 65, shown here to illustrate another highly advantageous configuration for the free end of its manipulation/welding tool having an electrically insulative coating, but with the tool centered in the weld region, such that a sufficient slip of the tool causes the insulative coating to engage the peripheral sidewall of the weld region.

FIG. 69 is essentially identical to FIG. 68 with the exceptions that peripheral side margin 1006 of the tool has received an electrically insulating layer 1042 having thickness d, as was illustrated in FIG. 68, and that the tool is shown centered on weld region floor 88. In terms of dimension h, at least some portion of side margin 1006, immediately adjacent to end surface 1010 should be free of insulating material to form this dimension, but at a magnitude that is less than the depth of weld region floor 88 from surface 82. Accordingly, coating 1042 cooperates with radius r, or any other suitable configuration, for causing the coating to first come into contact with peripheral sidewall 86 in the manner of FIG. 68. Again, one practical implementation sets d equal to h. As described above, this arrangement provides for a symmetric foot weld notwithstanding tool slippage. It should be appreciated that dimension d can be made of any suitable combination of metal extending from inset diameter and insulation thickness, as is illustrated by an optional inset corner 1044.

Turning back to FIG. 65, the use of weld region 84 is considered to be highly advantageous in the resistance spot welding implementation of system 1000 for a number of reasons. First, the weld region provides for more predictable, controlled engagement in the movement mode with a contingency should a tool slip occur. Second, downset weld region floor 88 presents a thickness between itself and opposing attachment surface 80 such that a reduced amount of electrical energy is needed to make a weld. This results in lower weld shift, as compared to welding through the entire thickness of the plate-like foot. Third, by restricting thinning to the region to be welded, remaining portions of the foot, outside the weld region, retain full thickness and rigidity for purposes of resisting weld shift and warpage which could be induced thereby, as well as for resisting shock and vibration in a final welded configuration.

With regard to results that have been empirically demonstrated using system 1000, foot weld 1020 has been found to share the advantages previously described with regard to laser foot weld 110 of FIG. 5. The circular symmetry of resistance foot weld 1020 is thought to contribute to such demonstrated small weld shifts in the plane of support surface 45. As the weld shrinks on itself, this basic symmetry assures that the foot is not dragged in any particular direction. While one of ordinary skill in the art might assume that biasing force 1012, having a magnitude of approximately two pounds in the locked mode might itself produce an unacceptable weld shift, it is thought that weld shifts are remarkably low at least partly due to a high coincidence between application of the biasing force and the region of formation of foot weld 1020.

Having described the use of system 1000 and the highly advantageous results that are attendant to its use, it is worthwhile to now draw a number of comparisons with laser welding implementations. As noted above, it is submitted that one of ordinary skill in the art would not expect to see results that are at least as good, or better than those results demonstrated using laser welding. It is thought that such remarkable results are attributable, at least in part to, the weld electrode which delivers the welding current pressing down immediately against the weld, as it is formed. In a laser welding implementation, such immediate contact is not possible in order to provide for access by the laser beam. Moreover, the laser welding approach must melt the weld region floor from the top down—thereby melting the entire thickness of the foot in the weld region. System 1000, in contrast, is advantageously configured to form foot weld 1020 without melting the weld region floor proximate to end surface 1010 of the combination manipulator/electrode. Thus, stiffness of the foot is enhanced by melting a reduced volume of the foot. As will be described at an appropriate point below, it is generally desirable in resistance spot welding to form a weld nugget which does not reach an electrode that is applying the weld current.

Still drawing a comparison with laser spot welding, system 1100 may be used with any of the highly advantageous support brackets and assemblies described herein, in particular, with optics mounting structures having one or more feet slidingly engaged on mounting surfaces to achieve all of the benefits described with regard to these brackets. For example, the aforedescribed advantages of spring attenuation feet are readily provided even when used, for instance, in the described, three hinge structure with little or no modification. As in the laser welding implementations, a manipulation tool presses down with controlled force both during foot positioning and during welding. Conceptually, the mechanism for resisting weld shift using frictional force, arising in foot traction, is identical.

While the laser welding approach described herein is considered to provide sweeping advantages over the prior art, in and by itself, it is to be appreciated that advances now brought to light and presently under discussion with respect to resistance spot welding, serve to provide even further advantages, particularly in view of the now discovered capability of resistance spot welding to achieve comparable or even further reduced weld shifts. In particular, it is likely that a resistance spot welding implementation can be provided at a cost that is an order of magnitude lower than the present cost of a laser welding implementation. Aside from cost, laser weld heads are typically bulky, measuring approximately 3–6 inches across with protruding, stiff metal shielded fiber optics; the overall size and footprint of an assembly apparatus using resistance spot welding is significantly smaller. Since the manipulator and "weld head" of system 1000 are, for practical purposes, one and the same, space, access, and clearance is readily available for other instruments including, but not limited to cameras and parts loading apparatus. A further advantage is seen in that no protective eye shield is needed, so that the manufacturing tool can sit in open air. In combination with an overall smaller size, a resistance spot weld assembly apparatus is readily incorporated into an assembly process, or into a larger manufacturing unit or system. Liftoff shift is thought to be lower and less sensitive to process issues, such as flatness and particulate (dust or grit) contamination, since the tool presses down directly over the weld area. While hold-down peripheral to the weld, in a laser implementation, achieves dramatically reduced liftoff shifts compared to the prior art, somewhat tighter process control of flatness and contamination is worth consideration in this light. Moreover, the manipulator in a resistance spot weld implementation does not require a through passage for allowing the laser beam to reach the workpiece, thereby providing for a smaller tool which may readily translate into implementing a relatively smaller support bracket.

Figure 70:
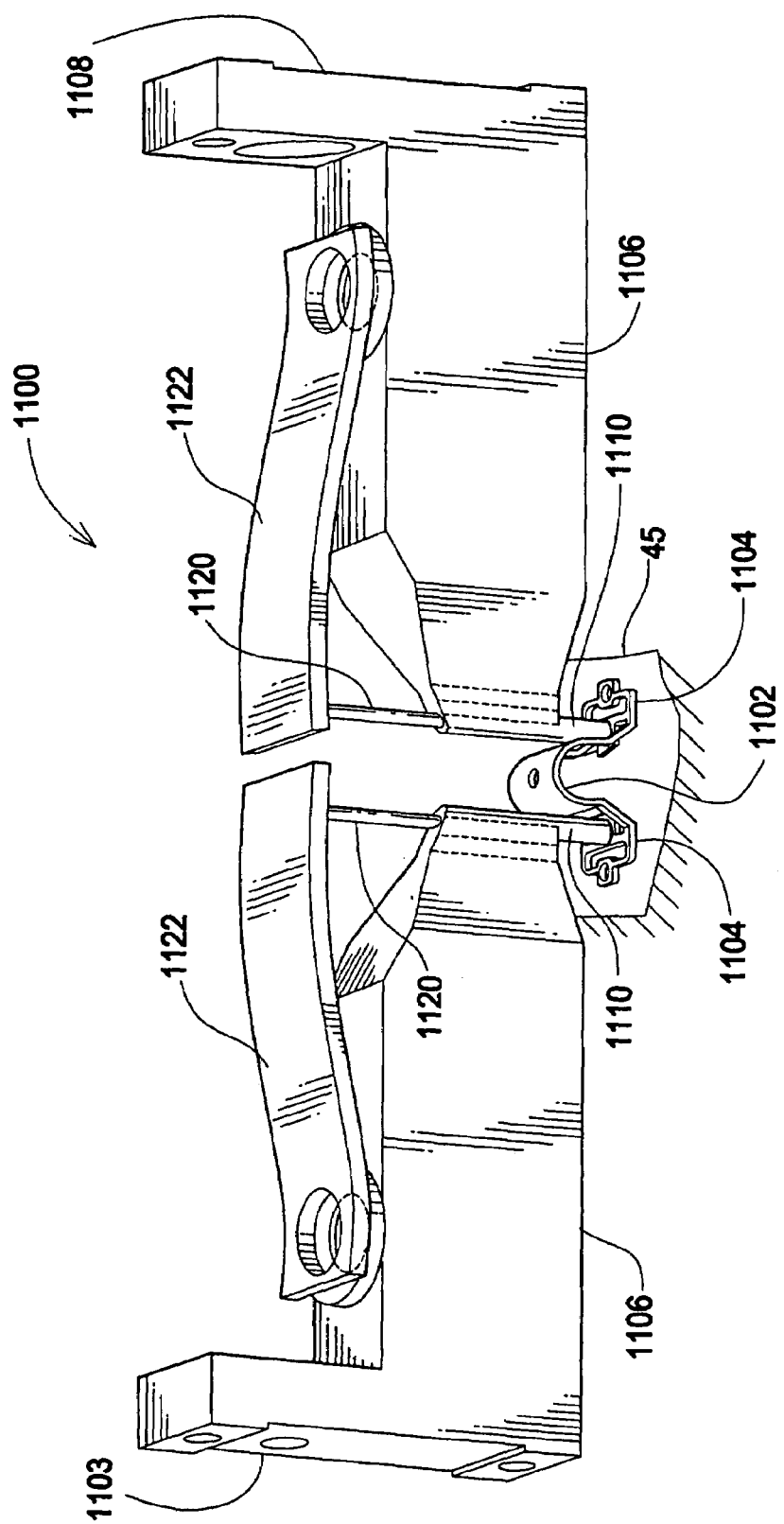
FIG. 70 is a diagrammatic view, in perspective, of another embodiment of a resistance spot welding system, produced in accordance with the present invention, for high precision welding of a workpiece to a support surface using a combination manipulation and welding tool having a "floppy electrode" configuration.

Attention is now directed to FIG. 70 which illustrates another embodiment of a highly advantageous resistance spot welding system, generally indicated by the reference number 1100, produced in accordance with the present invention. System 1100 is shown in operation using a bracket 1102 having feet 1104. It is noted that bracket 1100 resembles bracket 150 of FIG. 9, but having spring attenuation feet as shown, for example, in FIGS. 24 and 48. Like all bracket feet disclosed herein, either style of spring-attenuation foot is readily used in a resistance spot welding implementation when formed using a suitable electrically conductive material. Further details will be provided with regard to one way in which the foot of FIG. 48 can be used advantageously with its rectangular-shaped weld region.

Still referring to FIG. 70, system 1100 includes arms 1106 each of which includes an outward end 1108 that is configured for attachment to an appropriate motion stage, which is not shown and may be provided by one having ordinary skill in the art. Numerous commercially available XYZ stages may be used to push each arm back and forth for positioning, including, for example, Newport Model 462 stages, which can be configured such that the vertical force is established by pre-load springs (replaceable with desired spring constant) by simply lowering vertical position until the vertical actuator is disengaged and the pre-load spring, internal to the stage, maintains a set vertical downward force. In this setting, the horizontal actuators can be used to manipulate horizontal position of the plate while maintaining this set vertical downward force.

Each inward end of each arm 1106 supports a tubular member 1110, as will be further described. It should be appreciated that system 1100 is configured for simultaneously manipulating a pair of feet, however, this is not a requirement. A system may readily be implemented in a configuration for manipulating a workpiece or foot thereof by engaging one weld region at a time. Oppositely, a system can readily be implemented for simultaneously engaging three or more weld regions.

Figure 71:
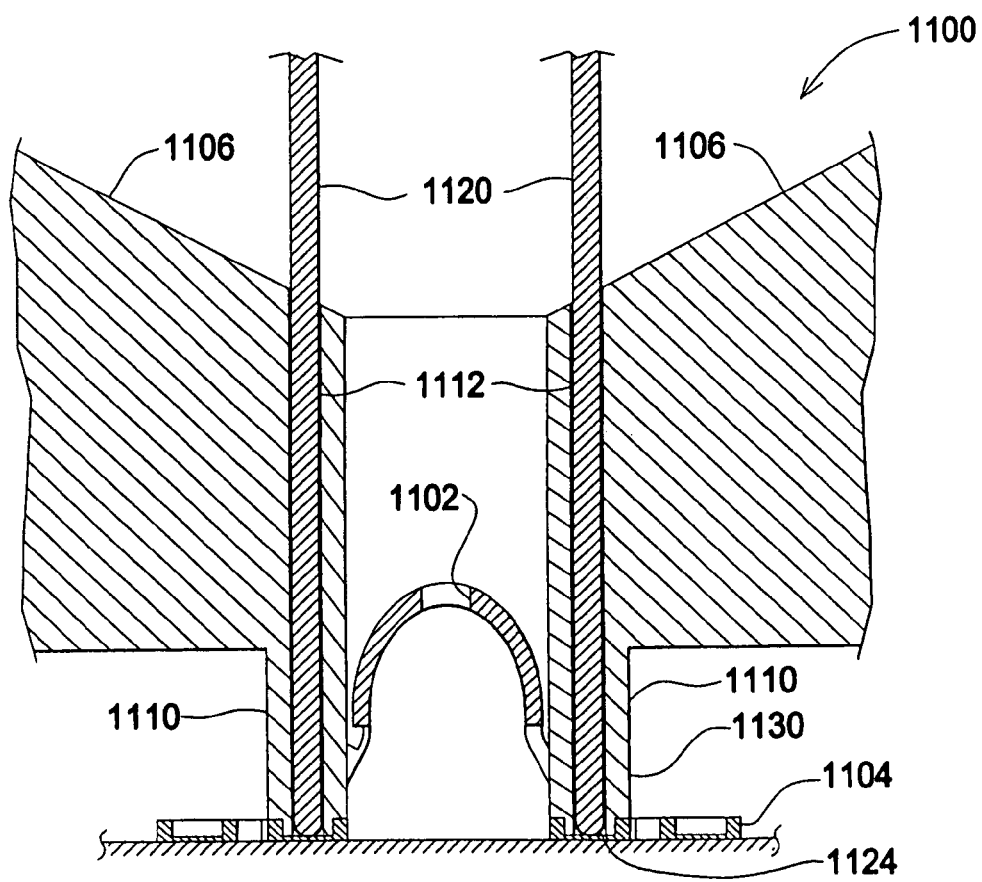
FIG. 71 is a diagrammatic, elevational view, in cross-section, of the system of FIG. 70, shown here to illustrate further details of its structure.
Figure 72:
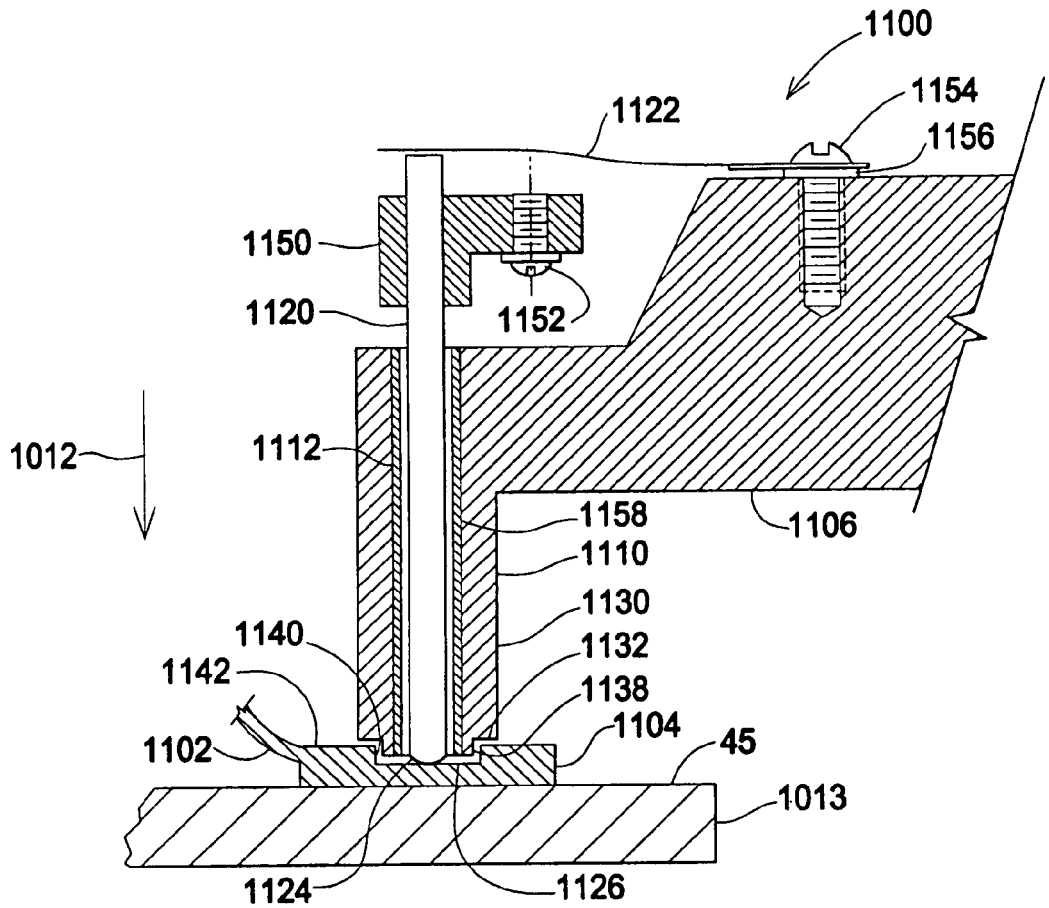
FIG. 72 is a further enlarged view, in cross-sectional elevation, of one embodiment of a manipulation/welding tool which may be used in the system of FIG. 70, shown here to illustrate further structural details and alternatives.

Referring to FIGS. 71 and 72, each tubular member 1110 defines a through-hole 1112 having a circular shape in cross-section. It is noted that FIG. 72 illustrates further details with respect to the structure of system 1100. It is emphasized that the figures are not to scale and have been presented in a way that is intended to enhance the reader's understanding. An electrode 1120 is received in each through-hole with an upper end thereof receiving a biasing force from a biasing member 1122 such that the electrode axially conducts the biasing force to an electrode tip 1124 in a way which urges the electrode tip against a weld region floor 1126 of foot 1104. Biasing member 1122 may be formed using any appropriate spring-like material such as, for example, spring steel. Biasing force may be adjusted, for example, by bending the biasing member, through material properties and dimensional modifications. Moreover, any suitable expedient may be used to apply the biasing force including, but not limited to a coil spring. Electrode tip 1124 may include a suitable rounded configuration for purposes of maintaining electrical contact with the weld region floor, for reasons to be described. In cross-section, electrode 1120 may be circular, polygonal or have some distorted variation or combination of shapes. In this regard, electrode 1120 may be referred to as a "floppy" electrode since it is intended to flex laterally at least with welding related forces, as will be further described. In conjunction with the flexible characteristics of electrode 1120, it is important that the electrode is loosely received in through hole 1112, as illustrated, such that the electrode is able to move freely in lateral directions from its centered position, for reasons to be described below. A suitable clearance may be in the range from approximately 3 to 10 mils surrounding the electrode.

Referring, in particular, to FIG. 72, a distal end 1130 of each tubular member 1110 is configured in a manner that is essentially identical to manipulator tool 90 of FIG. 3, described above, but with the exception that through-hole 1112 is configured for receiving floppy electrode 1120, rather than providing for the passage of a laser beam. In particular, distal end 1130 includes a peripheral downward facing biasing surface 1132 having a manipulation shoulder 1138 outwardly extending therefrom. Again, the configuration of manipulation shoulder 1138 engages a peripheral sidewall 1140 of foot 1104 in a way which provides for a predictable controlled value of movement tolerance when the foot is moved slidingly against support surface 45 in any selected direction using tubular member 1110. Peripheral biasing surface 1132 serves in a highly advantageous way to engage an uppermost surface 1142 of the foot in a way which applies biasing force 1012, indicated by an arrow, in order to hold the foot against support surface 45, consistent with the foregoing descriptions of the movement and locked modes. In particular, during the locked mode, for purposes of welding, a biasing force is applied by peripheral biasing surface 1132 in an annular region which surrounds the welding region immediately adjacent to weld region floor 1126 in order to resist weld shift. Thin, flexible electrode 1120 is, by design, not capable of generating enough force to overcome friction or "stiction" between foot 1104 and support surface 45, caused by the downward vertical biasing force 100 applied by tubular member 1110. That is, the electrode is incapable of moving the foot on its own, at least from a practical standpoint. It is noted that the present figure shows distal end 1130 hovering slightly above foot 1104 so that the features of the distal end are more readily discernable. It should be appreciated that electrical connections may be formed to electrode 1120 in any suitable manner. In the present example, a connection block 1150 is provided at the upper end of the electrode for connection with an appropriate electrical conductor using a threaded fastener 1152. In the event that arm 1106 is formed using an electrically conductive material, as well as resilient biasing member 1122, the latter may be electrically insulated from arm 1106 using a threaded fastener 1154 and insulating ring 1156.

Having described the structure of system 1100 in detail above, it should be appreciated that system 1100 is thought to share an important advantage with a laser welding implementation, while still providing the advantages of resistance spot welding. In this regard, it should be appreciated that a noncontact laser welding approach allows the weld region to move in an unconstrained way, while resistance to welding induced movements is provided as a result of traction between foot 1104 and support surface 45 with a locked mode value of biasing force 1012, as described above in detail. System 1100, has been designed in a highly advantageous way to decouple biasing force 1012 from electrode force, as independently applied by biasing member 1122, to hold electrode tip 1124 against weld region floor 1126. That is, the holding and manipulation arrangement embodied by arm 1106 and distal end 1130 of tubular member 1110 comprise a relatively rigid structure for applying force to the foot in order to maintain its position during welding. Electrode 1120 and its resilient biasing arrangement, in contrast, form a very flexible structure which allows electrode tip 1124 to move substantially compliant with weld region floor 1126 during welding. Applicants are unaware of any prior art configuration, using resistance spot welding, which provides for compliant movement of the electrode tip in directions that are generally parallel to the surface being welded. Moreover, compliant movement is also achieved in directions that are nonparallel or generally normal to weld region floor 1126, because elongated electrode 1120 readily flexes along its axial length with vertical movements of the weld region floor.

Still considering the advantages of system 1100, empirical results have demonstrated, in an essentially identical configuration, the production of weld shifts that are at least as small as those available through the use of laser welding, for example, on the order of 0.1 to 3 um. Moreover, it is submitted that the floppy electrode configuration brought to light by the present invention may form the foundation for next generation resistance spot welding implementations in which sub-micron weld shift parameters are mandated. Note that compliance of the electrode tip can, at least potentially, be achieved in the plane of the support surface using a rigid electrode that is supported for compliant movement at least in the plane of the support surface, for example, using springs.

Continuing to refer to FIG. 72, arm 1106 may be formed from any suitable material either electrically conductive or insulative. Suitable electrically conductive materials include, but are not limited to copper and tungsten. Suitable electrically insulative materials include, but are not limited to ceramics, Teflon® fluoropolymer and polymide. When an electrically conductive material is used to form tubular member 1110, an electrically insulative treatment 1158 may be applied to the inner wall of through hole 1112. Treatment 1158 may comprise an additional insulating tube that is disposed within the electrically conductive tubular member or any suitable thin coating material such as, for example, cured Polyimide or Teflon® fluoropolymer. Electrode 1120 may be formed, for example, using copper, hardened copper alloy, tungsten or other metal alloys. Dimensionally, the electrode should be sufficiently long and thin so as to provide the contemplated compliant movement at the electrode tip in view of the properties of the material that is used to form the electrode. Moreover, any suitable cross-sectional configuration for the electrode may be used as an alternative to a circular cross-section.

Figure 73:
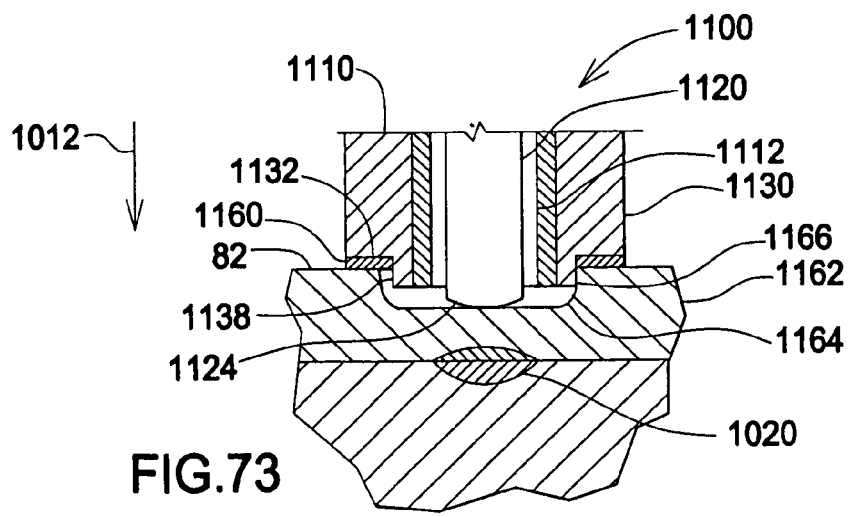
FIG. 73 is another greatly enlarged view, in cross-sectional elevation, of another embodiment of a manipulation/welding tool which may be used in the system of FIG. 70, shown here to illustrate further structural details and alternatives.

Attention is now directed to FIG. 73 which illustrates system 1100 in a slightly modified configuration. In this configuration, an electrically insulating, "slippery" washer is fitted against biasing surface 1132 and surrounds an upper portion of manipulation shoulder 1138. One suitable material for use in forming washer 1160 has been found to be TEFLON® fluoropolymer, although other materials, either currently available or yet to be developed, may be found to be suitable. System 1100, in this example, is being used with a spring attenuation foot 1162 having a square weld region recess 1164 such as is shown, for example, in FIG. 48, although other weld region recess configurations may be used. The appearance of the figure is essentially the same irrespective of whether the coarse or fine adjust weld region is in use. As described above, this arrangement, using a round tool in a square hole, is thought to advantageously minimize "cross-coupling" during foot manipulation. Specifically, as distal end 1130 of tubular member 1110 is moved in a direction perpendicularly with respect to one weld region sidewall, it engages/disengages only that sidewall. TEFLON® fluoropolymer washer 1160 is provided to ensure that the washer slips against surface 82 of the foot so movement of the foot is due, at least from a practical standpoint, to peripheral shoulder 1138 engaging one of sidewalls 1166 of the weld region. It is noted that peripheral shoulder 1138 is shown abutted against the rightmost peripheral sidewall such that a maximum tolerance gap is present between the leftmost sidewall and shoulder 1138. Accordingly, predictable motion tolerance is provided for with a maximum backlash that is equal to the maximum tolerance gap, upon reversal of motion direction. At the same time, electrode 1120 does not interfere with the controlled motion of the plate. A slight radius on electrode tip 1124 insures electrical contact, even if the electrode tilts within the through hole.

It should be appreciated that the floppy electrode implementation of the present invention, may readily be adapted to other attachment regimes with examples including, but not limited to resistance soldering, transient liquid phase bonding (TLP), and resistance brazing. In this regard, these alternative attachment regimes may require heating for longer time periods than that required in a spot welding process. For example, if heating were introduced over seconds or minutes, thermal expansion of the electrode may become a factor, particularly in the horizontal direction, where a rigid electrode is employed. The floppy electrode configuration is thought to resolve this potential difficulty. Moreover, tubular member 1130 may readily be thermally grounded to carry away excess heat for relatively long heating cycles.

The floppy electrode configuration of the present invention is highly advantageous in providing a manipulation and welding configuration in a single tool, at relatively low-cost, for producing high precision resistance spot welds. Further, this configuration provides an elegant manner in which compliant movement of an electrode tip can be accomplished in any direction such that the electrode tip essentially moves with the weld region at the point of contact in a way which produces little, if any influence on the welding process, especially in terms of weld shift. Accordingly, weld shift can be mitigated using other expedients. Applicants are unaware of any prior art which provides comparable advantages. For example, U.S. Pat. No. 4,831,228 (hereinafter the '228 patent) teaches a resistance spot welder which supports its electrode tip compliantly only in a direction that is normal to the welding surface. The goal asserted by the '228 patent is to provide for independent application of welding force with respect to clamping force—even though it appears that the two forces are, in fact, coupled by a spring constant. The driving motivation of the '228 patent is to manage situations, in heavy manufacturing, where warped or deformed parts must be forced together with extreme clamping forces that are not easily attained using electrodes. There is no mention of, nor need for compliant movement of the electrode tip with the weld region.

Generally considering all resistance spot welding configurations described herein, it is considered that one of ordinary skill in art may readily configure such a system in terms of weld current parameters with this overall disclosure in hand. Typically, a pulsed power supply delivers a current pulse sufficient to melt a weld nugget between the plates to form the contemplated foot weld. Ideally, the weld nugget extends only part way through the foot plate (see FIG. 73, as an example), and does not result in melting directly in contact with the electrode. For a given base material, plate material, and plate thickness, assuming welding-compatible materials, one skilled in the art can determine an electrode material, electrode shape, electrode force, and current pulse parameters (Pulse energy, rise time, pulse length, and fall time, for instance) that result in strong weld nuggets, in view of this overall disclosure.

It should be appreciated that the concepts which underlie system 1100 are readily adapted for use in other types of bonding configurations including, but not limited to:

1) Resistive spot brazing or soldering; the configuration would be similar or equivalent to a spot welding setup, but with the introduction of a filler material acting as a solder or braze;

2) Low temperature liquid phase transient bonding where layered buffer metals are melted to form a filler alloy that hardens as it alloys, where the alloy has a much higher melting temperature than the initial layers; and 3) Heat or UV cured adhesives or other heat activated bonding.

It is important to understand that the implementations described with regard to FIGS. 65–76 may serve fundamentally as the basis for alternative bonding configurations, particularly if heat delivery is required. Any generic heat activated process using direct contact to deliver heat is subject to at least the same sources of weld shift, as is resistance spot welding. Considered in this light, electrode 1120 of FIGS. 70–73 can be replaced with any suitable heating element, as will be further described.

Figure 74:
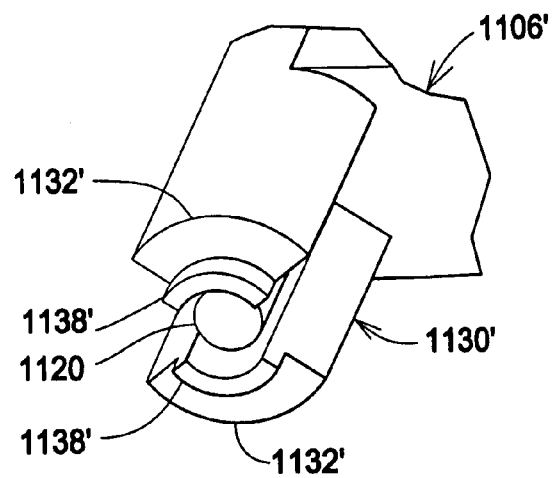
FIG. 74 is a diagrammatic perspective, bottom view of a modified manipulation arm, produced in accordance with the present invention, shown here to illustrate a pair of opposing biasing surfaces, each having an associated manipulation shoulder.

Turning now to FIG. 74, a modified arm 1106' is illustrated for use in system 1100. Arm 1106' is modified with respect to its distal end 1130' which is configured for applying a biasing force at least partially around a weld region. In particular, distal end 1130' is segmented to apply the biasing force using a pair of opposing biasing surfaces 1132', each of which is associated with a manipulation shoulder 1138'. Electrode 1120 is visible, partially retracted within distal end 1130'. Of course, electrode 1120 must be received loosely within any bifurcated distal end configuration to accommodate compliant movement of the electrode tip with the weld region, as described above.

Figure 75:
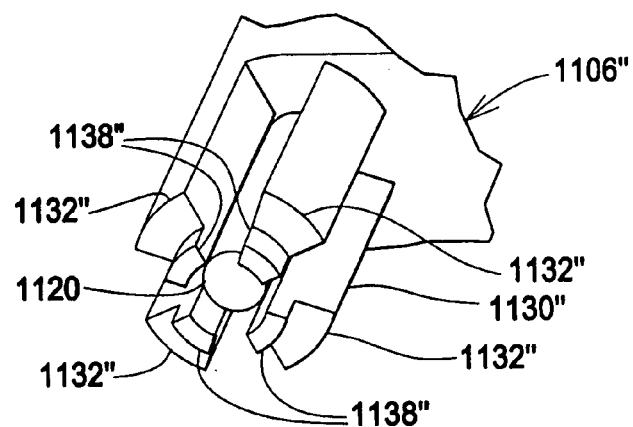
FIG. 75 is a diagrammatic perspective, bottom view of another modified manipulation arm, produced in accordance with the present invention, shown here to illustrate four equi-angularly spaced apart biasing surfaces.

FIG. 75 illustrates another modified support arm 1106" for use in system 1100. In this instance, arm 1106" includes a distal end 1130" which is configured for applying the biasing force using four equiangularly spaced-apart biasing surfaces 1132", each of which is formed as the end surface of a respective prong member. A manipulation shoulder 1138" extends outwardly in association with each biasing surface 1132".

In view of FIGS. 74 and 75, it should be appreciated that the distal end of the combination manipulation/welding tool of the present invention may be configured in an unlimited number of ways, while remaining within the scope of the appended claims. As an example, the tool end may have an outline and arrangement of biasing surfaces that is mandated by the configuration of a particular foot which is to be engaged by the tool. Accordingly, biasing surfaces may be arranged in any suitable manner to engage that foot. There is no requirement that the biasing surfaces be equi-angularly spaced about a weld region, nor that an even number of biasing surfaces is required. Moreover, there is also no requirement that the biasing surfaces be arcuate in shape, as depicted here- any suitable closed form outline may be used, which itself may be tailored to suit a particular foot configuration.

Figure 76:
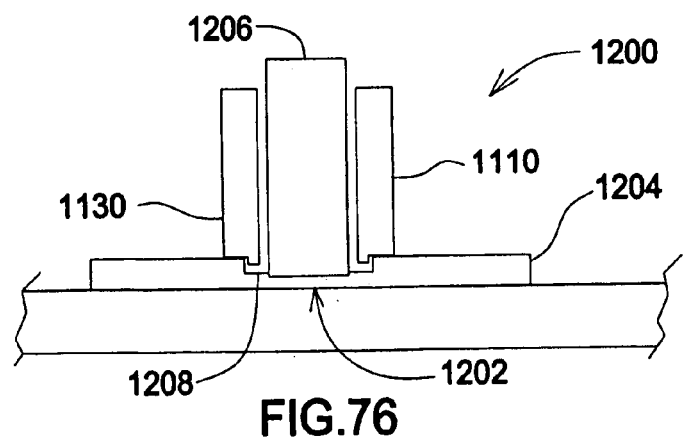
FIG. 76 is a diagrammatic view, in elevation and in partial cross-section, of a system, produced in accordance with the present invention, for performing heat activated bonding using a multifunction tool that is configured for cooperatively executing manipulation and attachment functions.

Attention is now directed to FIG. 76 which diagrammatically illustrates a system, generally indicated by the reference number 1200, for use in a range of alternative heat activated bonding implementations. While a configuration is shown for engaging a single attachment region 1202 of a foot 1204, it is to be understood that the system may readily be configured for simultaneously engaging, for manipulation and attachment purposes, two or more attachment regions that are formed, for example, as portions of one bracket. System 1200 includes tubular member 1110 having limited, if any modifications. The only substantive distinction, as compared with previous embodiments, resides in providing a heating arrangement 1206 which is a source of heat, rather than a source of current. Clearly, such a heating arrangement may be provided in an elongated configuration, or any suitable form, so as to provide for compliant movement at an attachment region floor 1208 so as to accommodate thermal expansion that is likely to be exhibited by any heating arrangement. Moreover, system 1200 uses free end 1130 in a manner which is consistent with its descriptions above with respect to the movement and locked modes. Of course, in the locked mode, heat is applied as opposed to an electrical current. Thus, even aside from the advantages of compliant movement, a single tool is configured for manipulating a workpiece against a support surface and then attaching the workpiece to the support surface in a highly advantageous way with all of the benefits inuring thereto. It is contemplated that heating arrangement 1206 may comprise an assembly. For instance, the heating arrangement may be a dual electrode, akin to what is used in the art of parallel gap spot welding, and appearing, at least from a functional standpoint, to resemble a miniaturized version of manipulation/attachment tool 770 of FIGS. 56 and 57.

In the specific instances of heat soldering or brazing, a structure may be provided in the workpiece having insets, such as shown in FIG. 58. In this case, the solder or braze material is contained in a "pocket" so that the plate does not give or deform responsive to the solder or braze material. The braze or solder filled pocket acts in many respects as the weld nugget discussed above; it melts due to heating, and it hardens to form a bond.

Figure 77:
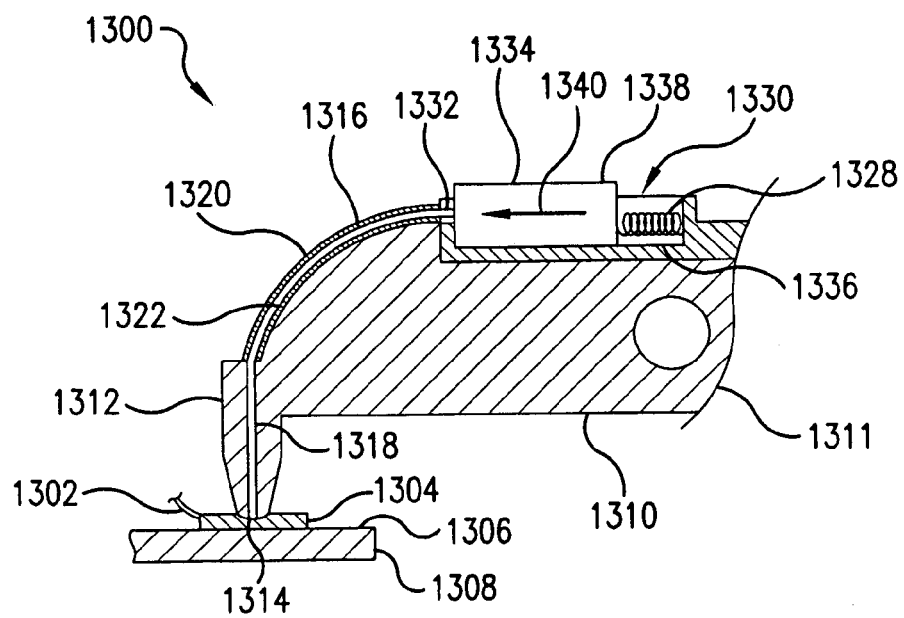
FIG. 77 is a diagrammatic cross-sectional view, in elevation, of one embodiment of a flimsy electrode resistance spot welding system for use in precision welding, shown here to illustrate details of its structure.

Still considering resistance spot welding implementations produced in accordance with the present invention, attention is immediately directed to FIG. 77, which illustrates a highly advantageous resistance spot welding system that is generally indicated by the reference number 1300. System 1300 is shown in operation using a bracket (only partially shown) 1302 having a foot 1304. The foot and bracket may be formed from plate material such as, for example, stainless 410, INVAR®, or KOVAR®. One familiar with spot welding will recognize that virtually any metal known to be "weldable" by resistance spot welding can be used, with appropriate measures taken. One suitable plate thickness has been found to be 10 mils although any other suitable thickness may be used, as will be further described. It is noted that bracket 1302 may resemble two-foot brackets described above and may include spring attenuation feet, although this is not required and is not the case in the present example. Foot 1304 is positioned against a support surface 1306 that is defined by a support body 1308 (partially shown). The support surface must be electrically conductive and suited to spot welding, although support body 1308 may be provided in a wide variety of configurations while still meeting these requirements.

Continuing to refer to FIG. 77, system 1300 includes a biasing arm 1310 having an inward end 1311 that is configured for attachment to an appropriate motion stage, which is not shown and may be provided by one having ordinary skill in the art. As described above, many commercially available XYZ stages may be used to move arm 1310 for positioning. As also described above, horizontal actuators of the motion stage can be used to manipulate horizontal position of foot 1304, in a movement mode, while maintaining a set vertical downward force. The biasing force can, as described above, be increased in a locked mode.

An outward end of arm 1310 supports a biasing and manipulation member 1312. The latter is configured to engage foot 1304 for manipulation and welding purposes, and for supporting an electrode tip end 1314 of an elongated flexible electrode 1316. A first electrode passage 1318 is defined by biasing member 1312 while a second electrode passage 1320 is defined by an elongated tube 1322 in an end-aligned relationship with the first electrode passage. A substantial portion of the length of electrode 1316 is slidingly received within the aligned first and second electrode passages. It is noted that any number of geometric configurations, as opposed to a tubular member, may be used to provide the second electrode passage. Moreover, a single passage may be provided in an overall integrally formed arm. As an alternative to a passage, a channel or slot may be used, so long as the electrode is sufficiently captured therein for purposes yet to be brought to light.

Continuing to describe FIG. 77, a resilient biasing arrangement 1330 is provided proximate to an upper end of electrode 1316 where an end portion 1332 of the electrode includes an unsupported portion between tube 1322 and a biasing block 1334. Biasing block 1334 is slidingly received in a cavity 1336 and resiliently urges end portion 1332 toward tube 1322 using a spring 1328 so as to apply a biasing force 1340, that is indicated using an arrow. The biasing force may be in a range, for example, from ¼ ounce to approximately 5 pounds. While the use of a coil spring is illustrated, it should be appreciated that any suitable spring or biasing force generating member may be utilized. As will be understood by one having ordinary skill in the art, the use of a spring provides for ready adjustment of the biasing force through adjusting or replacing the spring. Force 1340, therefore, urges upper end 1332 of electrode 1316 toward the electrode passage in a way which transfers at least a portion of the applied force as a resilient welding force to electrode tip 1314 such that the electrode tip is urged against foot 1304, as will be further described.

Figure 78:
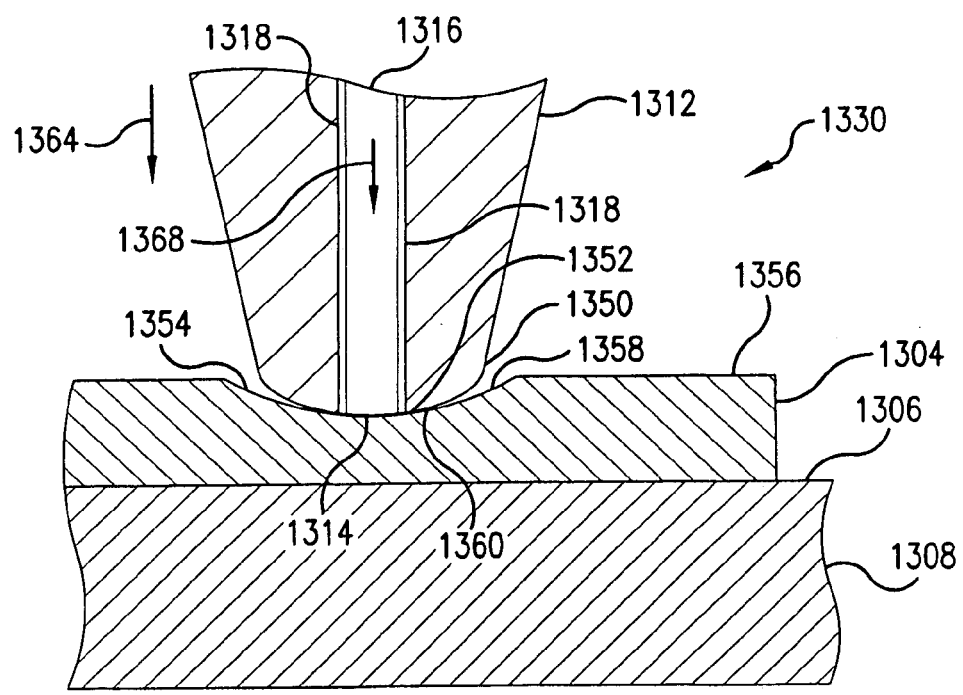
FIG. 78 is an enlarged, cross-sectional diagrammatic view, in elevation, of a manipulation tip and electrode tip forming part of the system of FIG. 77, shown here to illustrate further details of its structure.

Turning now to FIG. 78 in conjunction with FIG. 77, the former provides an enlarged view of part of biasing member 1312, foot 1304 and support arrangement 1308 in order to describe further details with regard to these components. In particular, biasing member 1312 includes an arcuate or curved biasing end 1350 which may also be described, for example, as being conical or arcuate in its cross-sectional configuration, having an exit opening 1352 defined at least approximately at the apex of the shape. Alternatively, biasing tip 1350 may include a relatively planar annular region surrounding exit opening 1352. The particular configuration of biasing tip 1350 may be established based on the configuration of a weld region 1354 that is formed within foot 1304. Weld region 1354, which may be referred to as a weld pocket, is formed inset with respect to an upper surface 1356 of the foot having a curved peripheral sidewall 1358 and a weld region floor 1360. The latter may be generally planar or may have a curved configuration, depending upon the specific manner in which the weld region is formed. The illustrated weld region floor includes a curvature profile that flattens upon approaching the center of the weld region, but which presents a curvature, at least approximately, throughout the weld region floor aside from its center point. Weld region 1354 may be formed in any suitable manner such as, for example, by etching using appropriate chemicals with a photolithographic mask. Of course, an overall initial thickness of foot 1304 is reduced beneath the weld region floor. Irrespective of the manner in which the weld region floor is formed and its specific configuration, biasing tip 1350 is formed having a suitable complimentary configuration such that biasing tip 1350 nests within the weld region as a biasing force 1364, indicated by an arrow, is applied by biasing tip 1312 against the weld region floor. During welding, the biasing tip applies biasing/holding force in the locked mode in an annular region of weld region floor 1354 that is immediately proximate to the exit opening of electrode 1316. The locked mode biasing force, therefore, is applied as closely as possible above the location of the actual weld that is to be formed. It has been found that there is no need to carefully match the radii of the weld region and the biasing tip. While it may be possible to fabricate parts with flat weld regions, low cost chemical etching of weld pockets results in weld regions with curvature as shown in FIGS. 77 and 78, although etched weld regions that are shallow but wide may be substantially flat in the center, with peripheral curved sidewalls. Small weld pockets, however, tend to exhibit curvature across most of the weld pocket, including the floor. In the present example, the minimum foot thickness remaining in the weld region floor is approximately 2 to 4 mils. A typical diameter of the etched region is anywhere from 15 to 40 mils. As described above with respect to other embodiments, system 1300 may be used in a movement or manipulation mode for precision positioning using force 1364 in a range of approximately ¼ pound to 5 pounds and in the locked mode, during welding, using force 1364 in a range of approximately 2 to 7 pounds, with higher force levels generally yielding lower weld shift. Of course, for any selected set of manipulation mode forces in a particular situation, the locked mode force should be greater than or equal to the manipulation mode force. Of course, an upper limit will be determined for the locked mode force by practical considerations such as, for example, the capability of the mechanism that is being used. Moreover, there may be an upper limit beyond which no appreciable reduction in weld shift is observed. As mentioned previously, the movement mode biasing force can be equal to the biasing force in the locked mode where traction of the workpiece foot surface at this force level is sufficient to overcome welding induced movement forces while still providing for movement. This behavior may, at least potentially, be achieved in a range of from 1 to 5 pounds of biasing force in any implementation described herein which uses a combination manipulation/biasing member. It should be appreciated that resilient force 1368 should always be less than biasing force 1364 so as to avoid excessive reduction of the biasing force, responsive to the resilient force, which would adversely influence weld shift or even liftoff of the biasing tip from the weld region.

Figure 79:
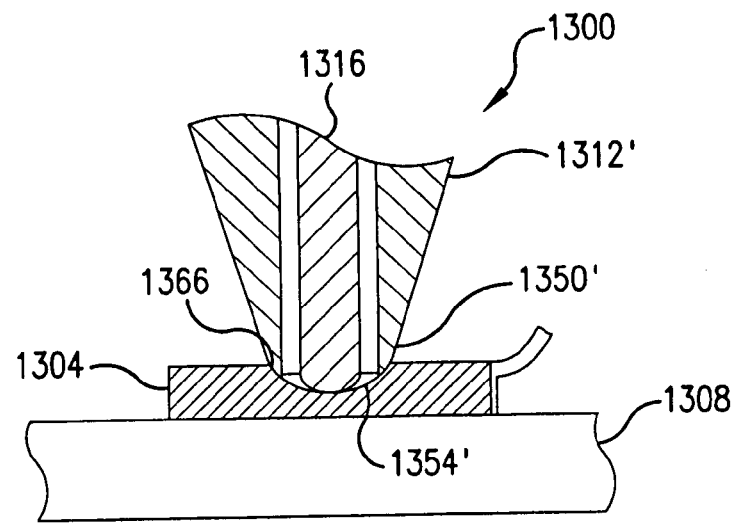
FIG. 79 is an enlarged, cross-sectional diagrammatic view, in elevation, of an alternative manipulation tip and electrode tip which can be used as part of the system of FIG. 77, shown here to illustrate that a number of alternative configurations are possible.

FIG. 79 illustrates a modified biasing member 1312' having a modified biasing tip 1350'. Biasing member 1312' is shown engaging a modified weld region 1354' which is arcuate throughout its cross-sectional configuration. Electrode 1316, in this instance, is shown having a curvature that is greater than the curvature of the weld region, while modified biasing tip 1350' is formed having a curvature that is less than that of the modified weld region, such that manipulation and downward biasing forces are applied by modified manipulation tip 1350' about a peripheral edge 1366 of the weld region. This contact region, however, is still reasonably close to the weld nugget, that will be formed, while still ensuring effective sliding manipulation of the foot against the support surface.

Referring to FIGS. 77 and 78, while it is a general practice, in the prior art, to carefully match the electrode tip to fit a weld region, flimsy electrode system 1300 essentially eliminates this concern. As will be described, the electrode tip can used effectively for a precision weld so long as it will, at least initially, fit at least partially inside the weld region. In using system 1300, it has been found that electrode tip 1314 can be prepared by using crude wire cutting, and then "seasoning" the electrode tip by performing some "dummy" wells in typical weld pockets. In doing this, it appears that the electrode wire geometrically conforms to a desired degree. Again, a close match between the curvature of the weld pocket and the electrode tip is not required prior to initiating this process. Conversely, it appears that the initial wire tip configuration can be essentially anything so long as it is subjected to seasoning. It is thought that the weld pockets used in seasoning should be consistent with or identical to the weld pockets used on the actual workpiece to be welded, in order to enhance geometric conformation. Regardless of the precise mechanisms at play, this process has consistently provided adequate geometric matching, yielding better than acceptable results. Microscopic studies appear to confirm these theories based on electrode tip condition before and after, initial seasoning. During seasoning, initial contact of the electrode wire pressing to the weld pocket to be welded appears to press out any particularly sharp protrusions present after the wire is first cut. Further, it is thought that initial welds tend to ablate the sharp features of the electrode tip or cause some of the tip to remain in the seasoning weld pocket. The welding and removal process then leads to repetitive re-creation of the same basic tip geometry, time and time again after initial seasoning. In effect, the electrode tip is repeatedly exposed to a selected welding environment, using essentially the same set of parameters for each weld, seasoning or otherwise, to produce a target set of weld parameters. The target set of weld parameters can include weld size as well as weld shift in any directions of concern. The selected welding environment can include a number of factors such as, for example, inducing a temperature rise in the electrode tip that at least approaches a melting point of the electrode. Of course, self-welding is likely to occur when the melting temperature is sufficiently matched or exceeded. Another factor may be the at least occasional need to pull a self-welded electrode from the workpiece. It is of interest that no mushrooming of the electrode tip has been observed, and it appears that the resilient biasing feed system for the electrode is advantageously incapable of delivering enough local force concentration to cause undesirable tip mushrooming. Likewise any potential mushrooming could be eliminated through the process of tip refreshment from self-welding. In this regard, it appears that the electrode length cooperates with the resilient biasing force in a way which limits deformation of the electrode tip, resulting from contact with the weld pocket, in order to maintain a pre-resilient contact configuration of the electrode tip. That is, at least at a macro level, the magnitude of a resilient welding force 1368, representing at least a portion of biasing force 1340, is insufficient to cause changes in the electrode tip, such as mushrooming. This unlikely and greatly unexpected convergence of factors motivates a unique geometry, thought to be completely distinct from anything in the prior art, and yielding remarkable benefits with respect to precision micro welding, which are heretofore unknown.

As described with respect to FIGS. 77–79, it should be appreciated that the radius in the biasing/manipulation tip can be configured to cooperate with foot 1304 to press down inside and/or around sidewall 1358 of the weld region. This configuration provides two benefits. First, it applies biasing force 1364 as close as possible to the electrode wire, which is desirable for minimizing "spring back" when tool is removed. Second, it allows for very well-controlled manipulation with minimal "backlash," since the rounded tip maintains relatively constant contact as it pushes the foot plate to and fro. As described previously, it is desirable for the manipulation/biasing tip to surround the weld as closely as possible, since slight warping in the plate material of the foot generally results in at least some finite spring back as the manipulation tip is removed. As is also described above, during manipulation movement of foot 1304 against support surface 1306, all tools exhibit some degree of backlash, with reversal of the movement direction, due to the manipulation tip slidingly re-engaging weld region 1354 in an opposite or new direction. The implementation under discussion, however, is well behaved, in this regard, due to "rolling" action of rounded tip against somewhat rounded etched region. That is, the nesting engagement of the manipulation tip in the weld region is considered to limit such backlash in a highly advantageous way.

Biasing tip 1350 may be formed using an electrical insulator such as, for example, sapphire or suitable ceramic. Alternatively, if the biasing tip is formed using metal, it can be coated with a suitable hard resistive coating (not shown) such as, for example, ceramic or diamond. As another alternative, a thin insulating tube (not shown) may be inserted into electrode passage 1318 to provide for electrical isolation. As still another alternative, an insulated wire can be used for the electrode. Another option resides in using a metal for the manipulation/biasing tip which is highly electrically resistive compared to the center electrode. It should be appreciated that the manipulation tip cooperates with the weld region to ensure that the biasing tip "grips" the foot and further ensures that the tool cannot slide indefinitely across the top of the foot, even if the foot temporarily binds against the mounting surface.

Electrode 1316 may be described as a "flimsy" electrode due to its very thin cross-section. In the absence of confinement, with any substantial overall length, the electrode wire would bend or flex in view of the application of any significant level of biasing force 1340 to an extent that would simply transform biasing force 1340, applied longitudinally to the elongation axis of the electrode, into lateral motion or deflection. Accordingly, such wire would normally be considered as unsuited to the present application, from a practical standpoint, unless special provisions are made in order to accommodate its use. The provision that is employed in FIGS. 77 and 78 relies on providing external confinement of a substantial portion of the overall elongated length of the electrode wire such that any lateral deflection is limited to a degree which allows for the delivery of force 1368 at electrode tip 1314 which is sufficient to ensure welding contact. Without such external confinement, electrode bending is likely to all but eliminate the delivery of biasing force 1368. At the same time, best seen in FIG. 78, electrode 1316 is relatively loosely received within the electrode passage, but only to a degree which nevertheless prevents any significant bending—permanent or otherwise. Stated slightly differently, the confinement must limit resilient force resultant flexing sufficient to transfer a portion of spring-produced resilient biasing force 1340 to the electrode tip, even though this spring biasing force is sufficient to produce unconfined lateral flexing of a portion of the electrode wire captured between two fixed points (i.e., the opposing ends of the electrode wire) and in the absence of such confinement. Without external confinement, resultant resilient force flexing of this thin electrode may cause the electrode tip to lose resilient contact with the weld pocket. An electrode passage that is approximately 2 mils greater in diameter than the electrode wire has been found to be useful. Larger clearances may likewise be found to be useful, however, once the clearance is too great, the electrode wire may be poorly guided in a way that compromises weld quality and/or could fail to properly "present" the electrode tip in the weld pocket. For example, if the electrode wire angularly addresses the weld region, the face of the electrode tip may not make proper contact. Irrespective of the manner in which the electrode length is supported, such support prevents relieving the spring force in an undesired way. In other words, the tube guides the wire to insure that the spring force is directed to the wire tip at the point where the weld is made. Another provision for using such a flimsy electrode resides in keeping any externally unsupported electrode length sufficiently short so as to limit lateral bending and flexing when exposed to a sufficient biasing force. In this regard, uppermost end 1332 of electrode 1316 is an example of such use of an unsupported, short length of the thin electrode for limiting bending.

Suitable flimsy electrode wire has been found to be 27 gauge (15 mil diameter) and 25 gauge (18 mil diameter) wire. In particular, these wires are high purity copper magnet wires with high temperature polyimide coatings. Such wire is available "off the shelf", however, many other wires may be suited for use as a flimsy electrode including copper alloys, or other highly conductive metals. Further, there is no requirement for insulation, depending upon the electrical conductivity of surfaces presented along the confined length of the electrode. Factors which contribute to a successful weld, with respect to the wire, at least include a thickness/diameter that is sufficient to withstand an amount of pressing force which provides good electrical contact with the weld pocket; too thin and it is difficult to get any force at all at the electrode tip. Further, if the electrode wire gets down to just a few mils in diameter, it can burn out like a fuse when welding current is applied. The desired wire diameter for a given plate thickness may depend on the material combinations including the support surface, the foot plate, and the electrode wire composition. Suitable electrode diameters are thought to be in the range from approximately 3 mils to approximately 50 mils. The use of thicker or thinner foot plates may necessitate adjustment of welding current. For example, thicker plates will likely require more current, and therefore a thicker electrode wire. Thinner plates may allow less current and a thinner wire, although the heat sinking effect of the mounting surface may limit the extent of possible current (and wire size) reductions.

Welds have been made using system 1300 with a UNITEK PECO™ brand Model UB25 linear resistance welding supply. Approximately the shortest possible pulse for this unit was used, having a rise time of approximately 500 usec, a flat top of 500 usec, and a fall time of 500 us. The peak current ranged from approximately 150 amps to 400 amps depending on plate material, plate thickness, weld pocket geometry, mounting surface material, surface quality and wire diameter. These pulse parameters are readily modified by those having ordinary skill in the art in view of this overall disclosure. Initial weld parameters can be set, for example, by following known guidelines appropriate for conventional electrodes. The next step is to reduce current until frequent weld failures occur, and then raise the current incrementally higher, for example, based upon pull tests used to verify consistent welding. The proper current setting for a given pulse shape is the lowest current which yields reliable welds (small number of failures). This lowest possible setting will result in the smallest possible welds with the lowest shifts. Pull-off testing may be used to verify successful welding, as is typically done in the art. That is, the workpiece is destructively pulled off of the support surface while measuring the pull-off force. Pull-off of a successful weld will exhibit either workpiece metal remaining attached to the support surface or will pit the mounting surface, thereby removing metal from the support surface. Typically, pull-off of a successful weld requires at least one-third to one-half a pound of force using optimized weld pulse parameters; and welds occur with high yield—that is, there is a very low rate of failure. For statistical samples of 10 or twenty welds, one may require weld parameters resulting in zero failures.

Figure 80:
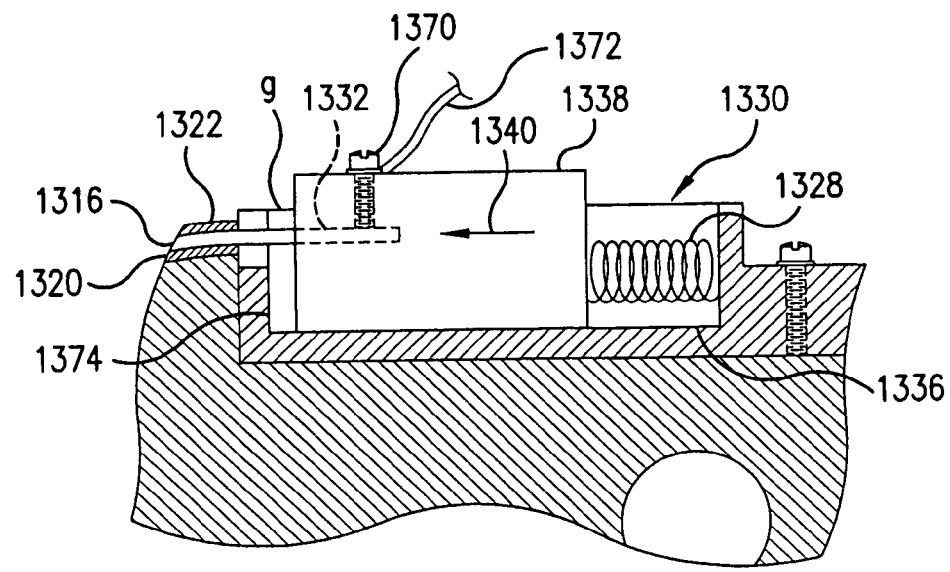
FIG. 80 is an enlarged, diagrammatic view, in elevation, of an electrode wire feed or biasing mechanism which forms part of the system of FIG. 77, shown here to illustrate further details of its structure.

Referring to FIG. 80, further details will now be provided with respect to the electrode wire feed mechanism of FIG. 77. The purpose of the feed mechanism is to provide axial force 1340 on electrode wire 1316 so that the electrode tip of the wire is held against the weld pocket to be welded with a repeatable force from one weld to another. Resilient welding force 1368 (FIG. 77) should be large enough to provide adequate electrical contact prior to and during welding, as well as providing enough force to compress microscopic sharp protrusions that may extend from the wire tip, but small enough to avoid undesired damage or kinking in the electrode wire, bearing in mind that significant external support is provided along most of the electrode path. Suitable values for resilient force 1368 may be in a range from approximately ¼ ounce to 5 pounds. Spring 1328 can be, for example, a typical off-the shelf steel spring measuring approximately 80 mils in diameter and approximately 0.75 inches length in a free (uncompressed) state. In view of these overall teachings, a weld nugget of less than 1 mm diameter can be formed.

Upper end 1322 of the electrode wire is clamped into biasing block 1338, for example, using a set screw 1370 or other suitable mechanism. Biasing block 1338 may be formed, for example, from copper having a hole defined therein for receiving end portion 1332 of the electrode wire, proximate to setscrew 1370. Weld power is provided by another electrical conductor 1372 that is electrically connected to the block, for example, using setscrew 1370. Conductor 1372 should be flexible so as to avoid altering the application of biasing force 1340 and may be formed, for example, from braided copper, or any multi-strand high electrical conductivity wire. This conductor may be insulated and should be of sufficient gauge to provide very low electrical resistance as well as adequate current capacity. It is noted that a gap "g" between biasing block 1338 and a leading wall 1374 of cavity 1336, sets a limit as to how far the electrode wire protrudes from manipulation tip 1350 (FIGS. 77 and 78) when the tool is not in contact with a workpiece. It has been found to be acceptable if the electrode wire extends by approximately 0.25 mm to 0.5 mm. It is noted, however, that if the electrode wire extends too far from manipulation tip 1350, when the tool is in a lifted position, the electrode/wire guiding mechanism fails to prevent the wire from undesirably bending or folding as the tool is lowered.

Referring to FIG. 77, it is convenient to support electrode wire 1316 along an arcuate electrode path. In the present example, the electrode wire executes a 90 degree bend between manipulation member 1312 and biasing block 1338. In forming such an arcuate path, it is convenient to use a tubular member such as, for example, elongated tube 1322. The tubular member should be held closely by tool body 1310, for example, using adhesives, solder, welding or other suitable expedients. Such support should extend along the entire length of the tubular member, if it is practical to do so, in order to prevent it from buckling outward or otherwise moving responsive to the application of spring force to the electrode wire. Of course, one having ordinary skill in the mechanical arts will appreciate that there are many other equivalent ways for guiding and providing axial force along flexible wire-like members. Moreover, a straighter configuration is contemplated, as well as a configuration having multiple bends. Such alternative configurations can be based upon a particular application. Tool body 1310 can be formed using any suitable material such as, for example, a metal. It may be helpful, in this instance, to avoid the use of highly magnetic materials, since this increases the inductance of any wire proximate to the main structural body and the electrode wire is already very close to the tool body. Aluminum and non-magnetic stainless steels have successfully been used.

Still referring to FIG. 77, it is clear that this welding configuration must provide a current path amounting essentially to a "closed circuit." That is, the welding electrode must be connected to one of two power output terminals of the welding supply, while the mounting surface must be electrically connected to the other supply terminal. In the embodiment of this figure, welding electrode wire 1316 is electrically isolated, at least to a sufficient degree, from all objects other than the intended lead (see conductor 1372 in FIG. 80) of the welding power supply. In this regard, insulated wire is useful when tubular member 1320 and/or manipulation tip 1312 are electrically conductive. One skilled in art will understand that if the welding electrode is in electrical contact with other conductive parts, those parts must themselves be electrically configured in acceptable ways so as to avoid undesired current leakage during welding. One skilled in the art will understand how to avoid deleterious "short circuit" and other parasitic impedances that could undermine the welding process. In principal, other parts of the assembly or tool "body" could be in electrical contact with the electrode wire, as long as they are electrically "floating" relative to the rest of the circuit; the key is to be sure that other parts of the assembly that come into electrical contact with the electrode wire are themselves electrically insulated so as not to affect the overall welding circuit.

Figure 81:
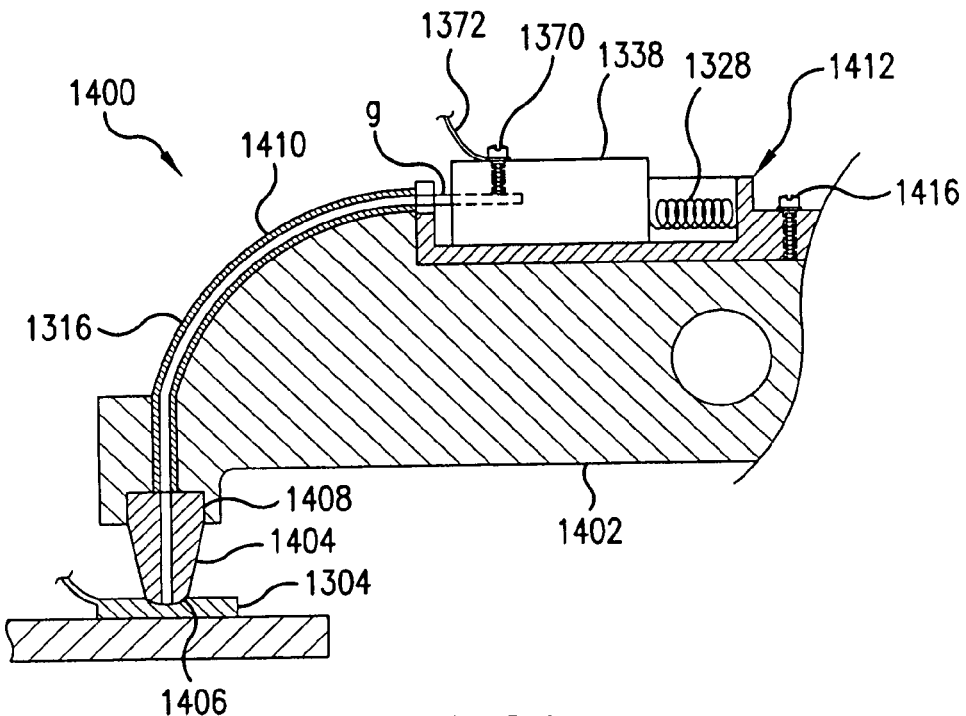
FIG. 81 a diagrammatic cross-sectional view, in elevation, of another embodiment of a flimsy electrode resistance spot welding system for use in precision welding, shown here to illustrate details of its structure.

With the foregoing in mind, another flimsy electrode system 1400 is illustrated in FIG. 81 using a diagrammatic cross-sectional view, in elevation. System 1400 includes various insulating features that maintain sufficient electrical isolation between the wire and the rest of the system. Descriptions of features and components shared with previously described system 1300 will not be described for purposes of brevity. System 1400 includes a support body 1402 and a manipulation arm 1404 defining a manipulation tip 1406. The latter comprises a hard, electrically insulating material such as, for example, sapphire or "CZ1" Zirconia toughened alumina, obtainable through Gaiser Inc of Ventura, Calif. This material is hard and tough, similar to metal, but is electrically insulating, similar to ceramic. Arm 1404 may be formed from suitable materials including, but not limited to ceramic, sapphire or coated metal. A suitable mounting configuration such as an aperture is defined in support body 1402 for receiving a proximate end 1408 of manipulation tip 1406, for example, using a press fit or adhesive. The manipulation tip may be affixed and supported in many alternative ways that are known to those having ordinary skill in the art. A tubular member 1410 is formed using a suitable electrically insulating material such as, for example, TEFLON™ which has the desirable property of being slippery or "self lubricating" so as to allow electrode wire 1316 to pass with minimum friction. A mechanical spring loading assembly 1412 is constructed of a suitable material such as, for example, electrically insulating nylon. Fastener 1416 may also be formed of such nylon.

Figure 82:
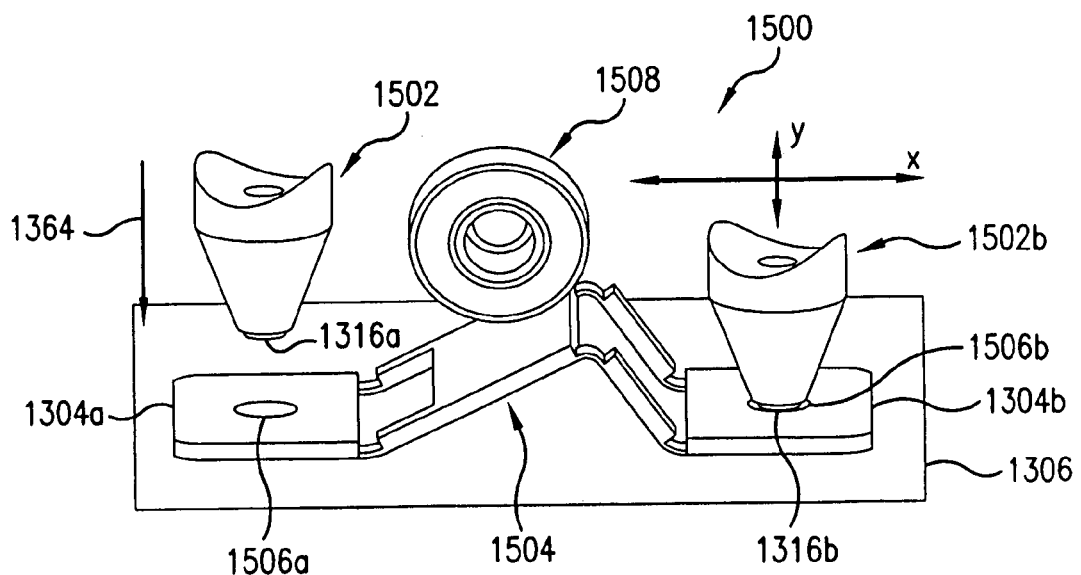
FIG. 82 is a diagrammatic perspective view of still another embodiment of a flimsy electrode welding system of the present invention, having a pair of manipulation members for precision positioning and resistance spot welding of a bracket which supports an optical component.

Referring now to FIG. 82, a flimsy electrode system, produced in accordance with the present invention, is generally indicated by the reference number 1500. This system may include any suitable electrode configuration, electrode path and manipulation arm so long as it is consistent with the foregoing descriptions, relating to the flimsy electrode. Accordingly, FIG. 82 illustrates a system using a pair of flimsy electrode welding/manipulation arrangements that are indicated as a first arrangement 1502 and a second arrangement 1502b. Components previously described, and used in each of these arrangements, are indicated using an "a" or "b" appended to the reference number that was used previously. A bracket 1504 is illustrated which is similar in structure to bracket 40 of FIG. 1, but having etched weld pockets 1506a and 1506b in each of a pair of feet 1304a and 1304b. Bracket 1504 is used to support an optical component 1508, or any other suitable component, that is to be precisely positioned in three dimensions. Feet 1304a and 1304b are arranged for motion against support surface 1306 in an x/y plane, although it is to be understood that each foot could be supported by a different support surface, and there is not a requirement that these surfaces be coplanar. System 1500 is configured for simultaneously, and/or individually, as necessary, manipulating and welding a pair of feet using arrangements 1502a and 1502b. Of course, a system can readily be implemented for simultaneously engaging three or more weld regions.

While the present application describes a variety of implementations with respect to laser welding, it should be appreciated that all of the tooling configurations described having openings or access for laser welding, can readily accommodate clearance for flimsy electrode tooling.

Systems 1300, 1400, 1500 and equivalents thereof, provide many of the benefits described above with respect to other systems described herein, including:

1) Minimizing weld shift through pressing flat surfaces together peripheral to the weld region so as to create friction which resists weld shift; and 2) Well-behaved configurations, such as described throughout the present disclosure, produce smaller weld shifts.

The challenge in micro welding for micron and submicron precision is to achieve the smallest possible weld while still consistently achieving welds at least approximately 100% of the time. Typically this is easier said than done. For welding hard metals (like steel), it is desirable to have highly conductive electrodes, which tend to be softer than the steel to be welded. It is recognized that slight electrode deformations from weld to weld can result in large deviations in weld parameters. For instance, if the electrode tip smashes out or spreads slightly, as a result of contacting the weld region, it will generally necessitate a higher electrical energy pulse to produce a suitable weld. In at least this way, accumulating deformation in the electrode tip leads to a spiraling loss of control over weld parameters, which, in turn, leads to the need for ever-increasing weld current to produce a suitable weld. Unacceptably, this ongoing degradation of the electrode tip ultimately results in larger welds than strictly necessary, accompanied by larger weld shifts, in order to reliably obtain welds 100% of the time. The present invention resolves this difficulty by managing the electrode tip configuration in a heretofore unseen and highly advantageous way.

With reference to FIGS. 77 and 78, it should be appreciated that electrode 1316 is a highly non-ideal electrode from the standpoint of normal practices in spot welding. It is submitted that accepted practice, with respect to spot welding, teaches the use of an electrode that should be thicker (i.e., of greater diameter) than the weld spot, with tapered or stepped ends, terminating in a flat end of the desired size. This, by design, allows for the tip to act as a heat sink, which minimizes tip heating and, if done properly, avoids heat degradation and "self-welding" of the tip. In contrast, electrode 1316 is anything but optimal, based on this convention. For example, electrode 1316, proximate to the electrode tip heats markedly and, in fact, some self-welding does tend to occur. Thus, the temperature of the electrode tip can reach and may exceed its melting temperature. For copper, this temperature is approximately 1080 degrees Centigrade and is somewhat higher for copper-based alloys.

A surprising benefit is considered to result from such self-welding. Specifically, when a slightly self-welded tip is pulled away, the electrode wire tip appears to automatically refresh itself in a near identical fashion from weld to weld. In instances where electrode tip 1314 self-welds to the weld region, resulting in repeatable degradation in the wire tip, a small tug may be needed (less than a pound of force) to remove the wire, and the electrode wire tip leaves behind a small amount of copper. In cases where this is observed, the electrode wire has been observed to consistently and repeatedly provide small low-shift welds, almost indefinitely from a practical standpoint. The durability of the electrode tip has been more than adequate and should serve to perform approximately 100 welds or more, depending on the specific weld parameters that are at play. Significant "liftoff shift" has not been observed, even in cases where the electrode wire is welded onto the plate and requires a pull to remove it. It is thought that the bonded copper-steel interface is directly above the welded steel-steel interface, and that the steel-steel weld is much stronger than the copper-steel weld; so much so that even sub-micron liftoff shifts are not observed when the copper wire is "snapped" off the steel plate. Irrespective of the specific mechanisms that are actually at play, it is apparent from empirical results that the effective surface area from weld to weld varies little when compared to processes using more conventional weld tips.

Further contributions, with respect to maintaining the electrode tip configuration, may be made through any minor deviation, which might occur in the electrode tip configuration from weld to weld, being so minor as to be pressed-out by the resilient biasing force when the tip is re-applied. Irrespective of the specific mechanisms which come into play and without prejudice, as a result of any attempts herein to characterize possible contributing mechanisms, system 1300 has been found to provide remarkable weld-to-weld repeatability, as compared to the use of more conventional electrode geometries. The net result is very tight control of weld parameters with essentially 100% reliable achievement of extremely small (<1 um) weld shift.

"Self-welding," using system 1300 has been empirically observed in many instances, however, benefits with respect to consistent weld results may likewise be attributable to maintaining the repeatability of the weld geometry based on the thinness of the electrode wire. In this regard, there may be a benefit associated with respect to using a manipulation tip that is separate from the welding electrode tip, when it is desired to perform sliding manipulation. That is, the potential for "mushrooming" of the electrode tip, while slidingly positioning the workpiece, is likely to be avoided using any embodiment having a separate manipulation tip or member. It is clear, however, that the use of flimsy electrode system 1300, and its associated method, results in similar contact area from one weld to another.

It should be appreciated that systems 1300, 1400, 1500, and equivalent forms thereof, can be used to position and weld-attach many combinations of metal parts, other than the specific brackets described herein, to sub-micron precision using a wide variety of methods. As one example, the flimsy electrode implementation taught herein and its associated method may replace precision "pick and place" soldering, and other such two-dimensional techniques, with spot welding. In this regard, it is noted that there are precision pick and place tools designed to place and bond wafer scale chips into place, in two dimensions, with micron scale accuracy. Such machines and processes typically employ either adhesives or solders. Disadvantageously, such prior art pick and place techniques, using solders, require heating at least the chip and substrate. Often, the entire part or assembly must be uniformly heated for at least several seconds. The flimsy electrode implementation of the present invention is considered to be advantageous through the need for only limited and comparably very localized heat, which may improve positioning precision by an additional amount for this reason alone, above and beyond the described precision of the welding process. In addition, the cost of these pick and place systems is many times higher than the contemplated cost of a flimsy electrode system, while providing as good as or better placement accuracy. As still another example, many structures useful in optics, other than brackets, could benefit so long as attachment shift less than 1 μm is needed. Other areas, such as, for example, nano-technology, will likely benefit from the disclosed sub-micron attachment technique.

Aside from pick and place systems, there are also likely to be other cases where the flimsy electrode technique is more desirable than methods using adhesives, since weld joints are free of organic materials and can withstand high temperatures, high moisture, and other environmental challenges. Perhaps more importantly, the flimsy electrode technique is the only short pulse method, known to Applicants, for achieving the demonstrated level of accuracy from a practical standpoint. Since the flimsy electrode technique is a short pulse method, as opposed to soldering or UV-cure bonding, there is very little heating in the parts surrounding the part being bonded. Such short pulses allow limited areas to be temporarily heated and melted before any significant level of heat has an opportunity to flow into surrounding areas. In performing some precision assemblies, it is often critically important to minimize heating, since heat causes most materials and assemblies to expand. Pulsed laser welding and pulsed resistance spot welding provide metal-to-metal bonding with the minimum amount of heating to the surrounding area. Resistance welders, however, are generally an order of magnitude less expensive that laser welders. Resistance welding avoids the need for complex optics to deliver pulsed laser beams that must clear the tools used for manipulation. The resulting system, therefore, is smaller, simpler to use, less expensive and requires much more limited routine maintenance. Further, the flimsy electrode technique of the present invention is effective for a range of different metals. It is noted that the use of spring attenuation, as described above, facilitates even greater precision in combination with the use of the flimsy electrode concept that is embodied by systems 1300, 1400 and 1500.

Using the flimsy electrode tool of the present invention, it is desired to provide the lowest shift lap welds possible, especially when welding a thin flat plate (1–30 mils thick) to a flat solid metal mounting or support surface. Low shift is achieved partly by controlling the process to achieve the smallest possible weld each and every time, with zero, or nearly zero, pulses failing to weld. This requires a highly repeatable process. The flimsy electrode tool provides downward force at or in the immediate periphery of the weld before, during, and after welding. Resulting frictional force between plates (i.e., foot and support surface) minimizes weld shift, since it resists forces generated by the weld nugget during cooling and solidification. In this regard, it may be beneficial to provide downward, holding force peripheral to the weld, rather than directly over the weld.

It is recognized that smaller welds result in smaller weld shifts. When lap welding thin plates onto a solid mounting surface, one challenge is to minimize process uncertainly and weld-to-weld deviations. The process to achieve the smallest possible weld is by design a borderline process— when one is truly making "the smallest possible weld," one cannot afford to lose any more heating than is absolutely necessary, or de-concentrate the heating, without also affecting the weld size. The idea is to systematically get as close to failure as possible in order to identify optimum or target welding parameters. This necessarily requires a high degree of control over welding parameters.

It should be appreciated that possession of a less than 1 um attachment technique, as taught herein, in two dimensions, opens up a range of possibilities for using multiple precision attachments to achieve three-dimensional precision. Further, The "foot motion brackets," described throughout this disclosure, represent only one of many possible structures that can benefit from low shift resistance spot welding. A few such structures will be described immediately hereinafter.

Figure 83:
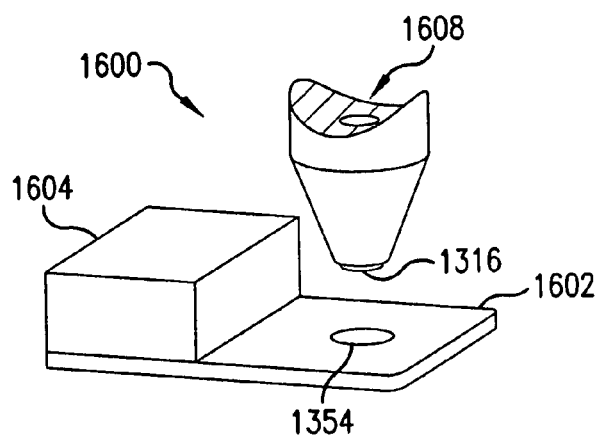
FIG. 83 is a diagrammatic perspective view of a component supporting plate arranged for precision positioning and welding attachment using a flimsy electrode system.

Referring to FIG. 83, an arrangement is generally indicated by the reference number 1600 having a plate 1602 with weld pocket 1354 formed therein. A component 1604 is suitably attached to a distal end of plate 1602. Accordingly, a flimsy electrode positioning system 1608 (represented by a partial view of its biasing and positioning arm and its flimsy electrode), produced consistent with the descriptions above, can be used to position and weld arrangement 1600 to a support surface (not shown).

Figure 84:
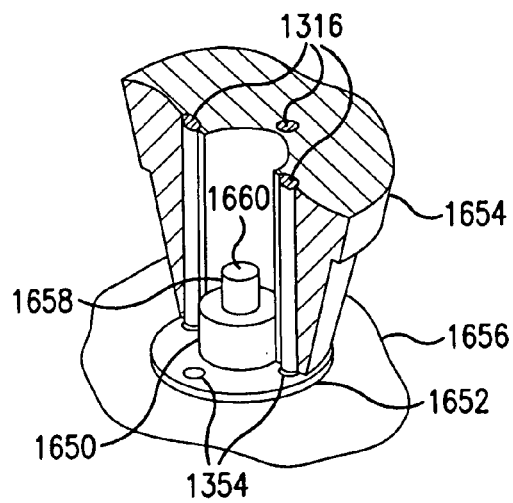
FIG. 84 is a diagrammatic perspective, partially cut-away view of a flange that is configured for precision positioning and welding attachment using a flimsy electrode system in which a biasing arm includes four flimsy electrodes that align with four weld pockets that are defined by the flange.

Various shapes can be positioned and welded with any number of welds. FIG. 84 shows a flange 1650 having a collar 1652 which defines four weld regions 1354 (one of which is not visible). A biasing arm 1654 is shown in a partially cut-away view for supporting four flimsy electrodes 1316 (one of which is not visible) for use in slidingly moving collar 1652 against a support surface 1656. Flange 1650 supports a sliding tube 1658, similar to a typical "coaxial" fiber assembly used in photonic packaging. The flange is first adjusted into position, and then tube 1658 is welded into place, using a separate tool and welding electrode that is not shown here, so that a point 1660, which could support, for example, a lens or the tip of an optical fiber, for instance, is precisely fixed into position in three dimensions.

Figure 85:
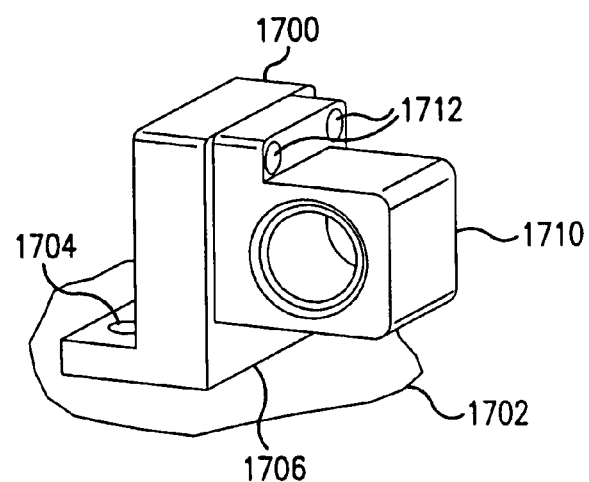
FIG. 85 is a diagrammatic perspective view of a support configuration for precise positioning of a component in three dimensions, which benefits from the use of the flimsy electrode system of the present invention.

FIG. 85 illustrates another example of a support configuration that is useful with the flimsy electrode system of the present invention and provides an improvement over the system described in U.S. Pat. No. 4,237,474 for use in three dimensional positioning. A first bracket 1700 is arranged for sliding manipulation against and attachment to a support surface 1702 using a first pair of weld pockets 1704, only one of which is shown. Bracket 1700 defines a bracket support surface 1706 which is slidingly engaged by a component support bracket 1710. The latter defines a second pair of weld pockets 1712 for use in positioning and welding component support bracket 1710 to bracket support surface 1706 in accordance with the aforedescribed flimsy electrode technique. It should be appreciated that the flimsy electrode approach can be used so long as the parts to be bonded accommodate location of weld pockets and access. While the flimsy electrode manipulation and welding tools are not shown with the brackets, their appearance will be evident to one having ordinary skill in the art in view of the foregoing descriptions.

Figure 64:
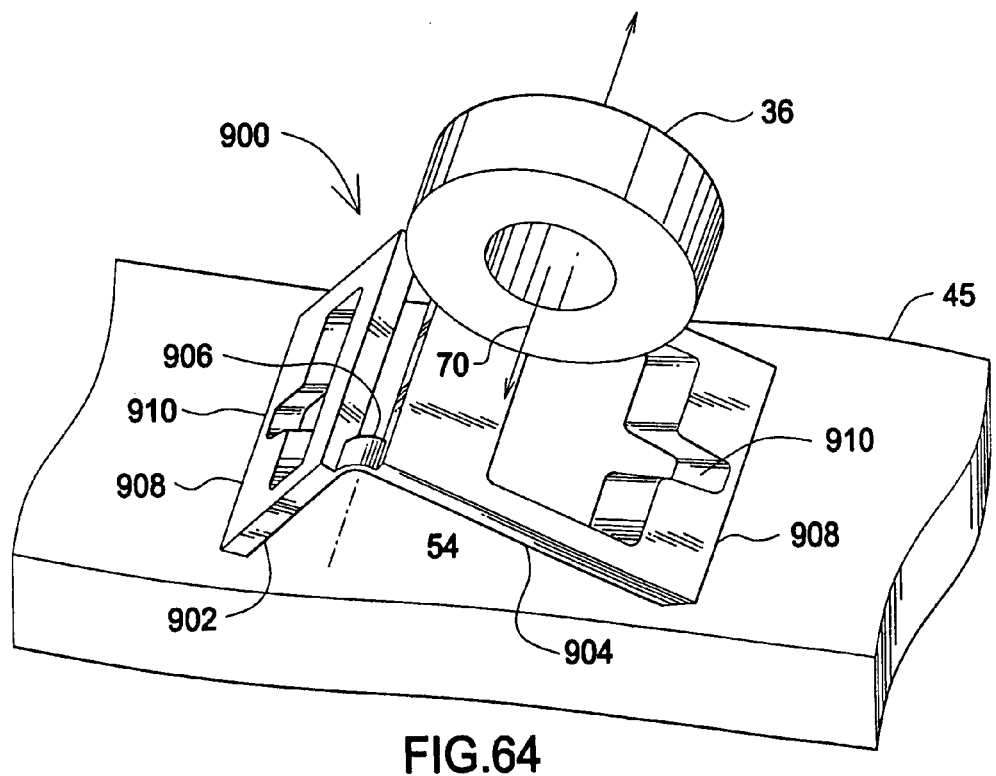
FIG. 64 is a diagrammatic view, in perspective, of an alternative support bracket produced in accordance with the present invention and illustrating the use of footless web members that are themselves attachable to a support surface.

Inasmuch as the arrangements and associated methods disclosed herein may be provided in a variety of different configurations and modified in an unlimited number of different ways, it should be understood that the present invention may be embodied in many other specific forms without departing from the spirit or scope of the invention. For example, FIG. 64 illustrates a support bracket 900 including first and second web members or legs 902 and 904 which are hingedly attached to one another by a pair of hinges 906 (only one of which is visible) that are arranged along hinge axis 54. In this support bracket, however, end portions 908 of the web members define feet in contact with support surface 45. Each end portion further defines a notch region 910 that is intended for use in attaching the legs to support surface 45. The present application further contemplates support brackets having legs with end portions that are configured, for example, to follow predefined slots, grooves or rails associated with one or more support surfaces. Therefore, the present examples and methods are to be considered as illustrative and not restrictive, and the invention is not to be limited to the details given herein, but may be modified within the scope of the appended claims.

What is claimed is:

1. A resistance spot welding method for fixedly attaching an attachment surface of an electrically conductive workpiece to an electrically conductive support surface that is defined by a support arrangement, said method comprising:

configuring a biasing force arrangement having a biasing tip for distributing a biasing force at least partially around a weld region of the workpiece to selectively bias the attachment surface of the workpiece against said support surface in a way which at least resists welding induced movement of the workpiece relative to the support arrangement and defining a through hole in the biasing force arrangement having an exit opening, formed within the biasing tip, that is at least generally aligned with the weld region when the biasing force arrangement delivers said biasing force around the weld region;

providing an elongated, flexible electrode, having an overall length between a first end and a second, opposing end; and resiliently urging the electrode into the through hole to cause at least a first portion of the overall length of the electrode to be received in the through hole in a way which supports the first end of the electrode, terminating in an electrode tip for emerging from the exit opening to contact the workpiece at said weld region, while applying a welding current through said electrode tip so as to weld the attachment surface of the workpiece to the support surface.

2. The method of claim 1 wherein said weld is a micro-weld.

3. The method of claim 2 wherein said micro-weld includes a diameter of less than 1 mm.

4. The method of claim 1 wherein said workpiece is configured for supporting an optical component.

5. The method of claim 1 wherein said biasing tip includes a biasing tip configuration which cooperates with the weld region for applying said biasing force at least immediately adjacent to said exit opening.

6. The method of claim 1 wherein said biasing force is in a range from approximately ¼ pound to approximately 5 pounds.

7. The method of claim 5 wherein said biasing force is applied by an annular region of the biasing tip configuration surrounding and immediately adjacent to said exit opening.

8. The method of claim 7 wherein said weld region forms part of a weld pocket having a profile that cooperates with the biasing tip configuration to apply the biasing force at least immediately adjacent to the weld region.

9. The method of claim 8 including forming said biasing tip configuration as dome-shaped.

10. The method of claim 8 including forming said weld pocket in said workpiece by etching.

11. The method of claim 8 wherein the weld pocket is formed having a complimentary configuration with respect to the biasing tip such that the biasing tip nests in the weld pocket for use in selectively moving the workpiece slidingly against the support surface during pre-weld positioning.

12. The method of claim 1 wherein configuring the biasing force arrangement forms said through hole as an electrode passage for slidingly receiving a substantial portion of the elongated length of the electrode in a way which positions the second end of the electrode proximately external to an opposing entrance of the electrode passage and resiliently urging includes applying a resilient force at least proximate to the second end of the electrode toward the opposing entrance of the electrode passage to cause the electrode passage to limit lateral movement of the electrode therein sufficient to transfer at least a portion of the resilient force from the second end of the electrode to the electrode tip so that the electrode tip resiliently contacts the weld region, while applying the welding current.

13. The method of claim 12 wherein said resilient force is in a range from approximately ¼ ounce to 5 pounds.

14. The method of claim 12 including applying said resilient force using a spring.

15. The method of claim 12 wherein said electrode includes a diameter in a range from approximately 3 mils to 50 mils.

16. The method of claim 12 including forming said electrode to include copper.

17. The method of claim 12 including forming said electrode using an insulated wire and cutting said wire to length.

18. The method of claim 12 including applying said biasing force in a movement mode using a movement mode force magnitude, before welding the workpiece to the support surface, such that the workpiece slidingly engages the support surface for using the biasing force arrangement to positionally adjust the workpiece against the support surface and, thereafter, increasing the biasing force to a locked mode force magnitude, at least during welding, so as to resist welding induced movement of the workpiece relative to the support surface.

19. The method of claim 1 wherein resiliently urging the electrode cooperates with the electrode to permit the electrode tip to move in a way which provides for substantially compliant movement of the electrode tip with the weld region, during welding, at least in directions that are generally parallel to the support surface.

20. The method of claim 1 wherein, before using the electrode tip to form the micro weld having a target set of weld parameters, establishing a welding configuration of the electrode tip by exposing the electrode tip to a selected welding environment that is selected based on the target set of weld parameters and welding includes using the electrode tip in contact with the workpiece to form said micro weld by re-exposing said electrode tip to the selected welding environment in a way which maintains the welding configuration of the electrode tip for use in forming an additional micro weld having the target set of weld parameters.

21. The method of claim 1 wherein resiliently urging includes applying a resilient force to the second end of the electrode to cause the electrode tip to contact the weld region.

22. The method of claim 21 wherein said first portion of the overall length of the electrode is arranged, at least approximately, normal to the weld region.

23. The method of claim 21 including supporting a second portion of the overall length of the electrode in an arcuate configuration extending from the first portion so that the second portion is at least generally nonparallel with respect to the first portion.

24. The method of claim 22 wherein supporting the second portion of the overall length of the electrode includes defining said arcuate configuration as a tubular passage formed by a tubular member and supporting said tubular member proximate to the biasing force arrangement such that the first end of the elongated electrode passes from the tubular passage into the through hole.

25. A resistance spot welding system for fixedly attaching an attachment surface of an electrically conductive workpiece to an electrically conductive support surface that is defined by a support arrangement, said system comprising:

a biasing force arrangement having a biasing tip for distributing a biasing force at least partially around a weld region of the workpiece to selectively bias the attachment surface of the workpiece against said support surface in a way which at least resists welding induced movement of the workpiece relative to the support arrangement and for defining a through hole having an exit opening, formed within the biasing tip, that is at least generally aligned with the weld region when the biasing force arrangement delivers said biasing force around the weld region;

an elongated, flexible electrode, having an overall length between a first end and a second, opposing end; and a resilient urging configuration for resiliently urging the electrode into the through hole to cause at least a first portion of the overall length of the electrode to be received in the through hole in a way which supports the first end of the electrode, terminating in an electrode tip for emerging from the exit opening to contact the workpiece at said weld region, while applying a welding current through said electrode tip so as to weld the attachment surface of the workpiece to the support surface.

26. The system of claim 25 wherein said weld is a micro-weld.

27. The system of claim 25 wherein said workpiece is configured for supporting an optical component.

28. The system of claim 25 wherein said biasing tip includes a biasing tip configuration which cooperates with the weld region for applying said biasing force at least immediately adjacent to said exit opening.

29. The system of claim 25 wherein said biasing force is in a range from approximately ¼ pound to approximately 5 pounds.

30. The system of claim 25 wherein said biasing force is applied by an annular region of the biasing tip configuration surrounding and immediately adjacent to said exit opening.

31. The system of claim 30 wherein said weld region forms part of a weld pocket having a profile that cooperates with the biasing tip configuration to apply the biasing force at least immediately adjacent to the weld region.

32. The system of claim 31 wherein said biasing tip configuration is dome-shaped.

33. The system of claim 31 wherein said weld pocket is formed in said workpiece by etching.

34. The system of claim 31 wherein the weld pocket includes a complimentary configuration with respect to the biasing tip such that the biasing tip nests in the weld pocket for use in selectively moving the workpiece slidingly against the support surface during pre-weld positioning.

35. The system of claim 25 wherein the biasing force arrangement is configured to form said through hole as an electrode passage for slidingly receiving a substantial portion of the elongated length of the electrode in a way which positions the second end of the electrode proximately external to an opposing entrance of the electrode passage and the resilient urging configuration applies a resilient force at least proximate to the second end of the electrode toward the opposing entrance of the electrode passage to cause the electrode passage to limit lateral movement of the electrode therein sufficient to transfer at least a portion of the resilient force from the second end of the electrode to the electrode tip so that the electrode tip resiliently contacts the weld region, while applying the welding current.

36. The system of claim 35 wherein said resilient force is in a range from approximately ¼ ounce to 5 pounds.

37. The system of claim 35 wherein said resilient urging configuration includes a spring for applying said resilient force.

38. The system of claim 35 wherein said electrode includes a diameter in a range from approximately 3 mils to 50 mils.

39. The system of claim 35 wherein said electrode includes copper.

40. The system of claim 35 wherein said electrode is formed using an insulated wire.

41. The system of claim 35 wherein said biasing force arrangement applies said biasing force in a movement mode using a movement mode force magnitude, before welding the workpiece to the support surface, such that the workpiece slidingly engages the support surface for using the biasing force arrangement to positionally adjust the workpiece against the support surface and, thereafter, the biasing force arrangement is configured for increasing the biasing force to a locked mode force magnitude, at least during welding, so as to resist welding induced movement of the workpiece relative to the support surface.

42. The system of claim 25 wherein said resilient urging configuration cooperates with the electrode and the biasing force arrangement to permit the electrode tip to move in a way which provides for substantially compliant movement of the electrode tip with the weld region, during welding, at least in directions that are generally parallel to the support surface.

43. The system of claim 25 wherein the resilient urging configuration applies a resilient force to the second end of the electrode to cause the electrode tip to contact the weld region.

44. The system of claim 43 wherein said first portion of the overall length of the electrode is arranged, at least approximately, normal to the weld region.

45. The system of claim 43 wherein said biasing force arrangement includes a support configuration for slidingly supporting a second portion of the overall length of the electrode in an arcuate configuration extending from the first portion so that the second portion is at least generally nonparallel with respect to the first portion.

46. The system of claim 44 wherein said support configuration supports the second portion of the overall length of the electrode in an arcuate configuration using a tubular passage formed by a tubular member such that the first end of the elongated electrode passes from the tubular passage into the through hole.

47. A resistance spot welding method for fixedly attaching an attachment surface of an electrically conductive workpiece to an electrically conductive support surface that is defined by a support arrangement, said method comprising:

providing an electrode, having an elongated flexible length between a first end portion and a second, opposing end portion;

configuring a biasing force arrangement having a biasing tip for distributing a biasing force at least partially around a weld region of the workpiece to selectively bias the attachment surface of the workpiece against said support surface in a way which at least resists welding induced movement of the workpiece relative to the support arrangement;

defining an electrode passage in the biasing force arrangement for slidingly receiving a substantial portion of the elongated length of the electrode in a way which positions the first end portion of the electrode at the biasing tip to serve as an electrode tip that is at least generally aligned with the weld region when the biasing force arrangement delivers said biasing force and which positions the second end portion of the electrode proximately external to an opposing entrance of the electrode passage; and resiliently urging the second end portion of the electrode into the opposing entrance opening of the electrode passage using a resilient force to cause the electrode passage to limit lateral movement of the electrode therein sufficient to transfer at least a portion of the resilient force from the second end portion of the electrode to the electrode tip so that the electrode tip resiliently contacts the weld region, while applying a welding current through said electrode tip, so as to weld the attachment surface of the workpiece to the support surface.

48. The method of claim 47 wherein the electrode passage serves as an electrode path and said resilient force is characterized by a magnitude that is sufficient to produce lateral flexing of the electrode along said elongated flexible length, cooperating with a flexibility characteristic of the electrode, that is sufficient to deflect the electrode at least partially out of the electrode path without external confinement by the electrode passage.

49. The method of claim 47 wherein said electrode passage is, at least in part, arcuate in configuration.

50. The method of claim 47 wherein said resilient force is characterized by a magnitude that is sufficient to produce lateral flexing of the electrode along said elongated flexible length based on a flexibility characteristic of the electrode which lateral flexing is sufficient to cause the electrode tip to lose resilient contact with the weld region, without confinement by the electrode passage, to an extent that would otherwise prevent formation of a weld.

51. The method of claim 47 wherein said electrode includes a flexibility characteristic along the electrode length which cooperates with the resilient biasing force in a way which limits deformation of the electrode tip resulting from contacting the workpiece so as to maintain a pre-resilient contact configuration of the electrode tip.

52. The method of claim 47 including configuring said biasing tip to include an exit opening for said electrode tip and which leads into said electrode passage and to apply said biasing force using an annular region of the biasing tip that surrounds and is immediately adjacent to the exit opening.

53. The method of claim 52 wherein said weld region forms a part of a weld pocket having a profile that cooperates with the biasing tip configuration to apply the biasing force at least immediately adjacent to the weld region.

54. The method of claim 53 including forming said biasing tip configuration as dome-shaped.

55. The method of claim 53 including forming said weld pocket in said workpiece by etching.

56. The method of claim 53 wherein said workpiece includes an outer surface with said weld pocket being inset with respect to said surface and wherein said biasing tip configuration and the profile of the weld pocket cooperate to apply said biasing force in an annular region within the weld pocket, which annular region is at least inset with respect to said surface.

57. The method of claim 56 wherein said weld pocket is formed including a weld pocket floor, for contact by the electrode tip and through which said welding current is to pass and which is downset from said outer surface, and said annular region forms part of the weld pocket floor.

58. The method of claim 57 wherein the biasing tip is formed having a complimentary configuration with respect to the weld pocket such that the biasing tip nests in the weld pocket for use in selectively moving the workpiece slidingly against the support surface during pre-weld positioning.

59. The method of claim 47 wherein said workpiece is configured for supporting an optical component.

60. The method of claim 47 including forming said electrode to include copper.

61. The method of claim 47 wherein said electrode includes a diameter in a range from approximately 3 mils to 50 mils.

62. The method of claim 47 wherein welding forms a micro weld with a weld shift of less than 1 μm.

63. The method of claim 47 wherein said biasing force is in a range from approximately ¼ pound to approximately 5 pounds.

64. The method of claim 47 wherein said biasing force is applied by an annular region of the biasing tip surrounding and immediately adjacent to said electrode tip.

65. The method of claim 47 including applying said resilient force using a spring.

66. The method of claim 47 including forming said electrode using an insulated wire and cutting said wire to length.

67. The method of claim 47 including applying said biasing force using the biasing tip in a movement mode having a movement mode force magnitude, before welding the workpiece to the support surface, such that the workpiece slidingly engages the support surface during positional adjustment using the manipulation tip to positionally adjust the workpiece against the support surface and, thereafter, increasing the biasing force to a locked mode force magnitude, at least during welding, so as to resist welding induced movement of the workpiece relative to the support surface.

68. The method of claim 47 wherein resiliently urging the electrode causes the electrode tip to move in a way which provides for substantially compliant movement of the electrode tip with the weld region, during welding, at least in directions that are generally parallel to the support surface.

69. A resistance spot welding system for fixedly attaching an attachment surface of an electrically conductive workpiece to an electrically conductive support surface that is defined by a support arrangement, said system comprising:
an electrode, having an elongated flexible length between opposing first and second end portions;
a biasing force arrangement having a biasing tip for distributing a biasing force around a weld region of the workpiece to selectively bias the attachment surface of the workpiece against said support surface in a way which at least resists welding induced movement of the workpiece relative to the support arrangement, said biasing force arrangement defining an electrode passage which slidingly receives a substantial portion of the elongated length of the electrode such that the first end portion of the electrode is positioned at the biasing tip to serve as an electrode tip that is at least generally aligned with the weld region when the biasing force arrangement delivers said biasing force around the weld region and which positions the second end portion of the electrode proximately external to an opposing entrance of the electrode passage; and
a configuration for resiliently urging the second end portion of the electrode into the electrode passage using a resilient force to cause the electrode passage to limit lateral movement of the electrode therein sufficient to transfer at least a portion of the resilient force from the second end portion of the electrode to the electrode tip so that the electrode tip resiliently contacts the weld region, while applying a welding current through said electrode tip, so as to weld the attachment surface of the workpiece to the support surface.

70. The system of claim 69 wherein the electrode passage serves as an electrode path and said resilient force is characterized by a magnitude that is sufficient to produce lateral flexing of the electrode along said elongated flexible length, cooperating with a flexibility characteristic of the electrode, that is sufficient to deflect the electrode at least partially out of the electrode path without external confinement by the electrode passage.

71. The system of claim 69 wherein said electrode passage is, at least in part, arcuate in configuration.

72. The system of claim 69 wherein said resilient force is characterized by a magnitude that is sufficient to produce lateral flexing of the electrode along said elongated flexible length based on a flexibility characteristic of the electrode which lateral flexing is sufficient to cause the electrode tip to lose resilient contact with the weld region, without confinement by the electrode passage, to an extent that would otherwise prevent formation of a weld.

73. The system of claim 69 wherein said electrode includes a flexibility characteristic along said electrode length that cooperates with the resilient biasing force in a way which limits deformation of the electrode tip resulting from contacting the workpiece so as to maintain a pre-resilient contact configuration of the electrode tip.

74. The system of claim 69 wherein said biasing tip is configured to include an exit opening for said electrode tip and which exit opening leads into said electrode passage and is further configured to apply said biasing force using an annular region of the biasing tip that surrounds and is immediately adjacent to the exit opening.

75. The system of claim 74 wherein said weld region forms part of a weld pocket having a profile that cooperates with the biasing tip configuration to apply the biasing force at least immediately adjacent to the weld region.

76. The system of claim 75 wherein said biasing tip configuration is dome-shaped.

77. The system of claim 75 wherein said weld pocket is formed in said workpiece by etching.

78. The system of claim 75 wherein said workpiece includes an outer surface in which said weld pocket is inset and wherein said biasing tip configuration and the profile of the weld pocket cooperate to apply said biasing force in an annular region within the weld pocket, which annular region is at least inset with respect to said surface.

79. The system of claim 78 wherein said weld pocket includes a weld pocket floor, for contact by the electrode tip and through which said welding current is to pass, and which is downset from said outer surface, and said annular region forms part of the weld pocket floor.

80. The system of claim 78 wherein said biasing tip includes a curved configuration and the weld pocket includes a complimentary configuration such that the biasing tip nests in the weld pocket for use in selectively moving the workpiece slidingly against the support surface during pre-weld positioning.

81. The system of claim 69 wherein said workpiece is configured for supporting an optical component.

82. The system of claim 69 wherein said electrode includes copper.

83. The system of claim 69 wherein said electrode includes a diameter in a range from approximately 3 mils to 50 mils.

84. The system of claim 69 arranged for forming a micro weld with a weld shift of less than 1 μm.

85. The system of claim 69 wherein said biasing force is in a range from approximately ¼ pound to approximately 5 pounds.

86. The system of claim 69 wherein said biasing force is applied by an annular region of the biasing tip surrounding and immediately adjacent to said electrode tip.

87. The system of claim 69 wherein said configuration for resilient urging the electrode is configured to apply said resilient force using a spring.

88. The system of claim 69 wherein said electrode is formed using an insulated wire.

89. The system of claim 69 configured for applying said biasing force using the biasing tip in a movement mode having a movement mode force magnitude, before welding the workpiece to the support surface, such that the workpiece slidingly engages the support surface during positional adjustment using the manipulation tip to positionally adjust the workpiece against the support surface and, thereafter, increasing the biasing force to a locked mode force magnitude, at least during welding, so as to resist welding induced movement of the workpiece relative to the support surface.

90. The system of claim 69 wherein the electrode tip moves in a way which provides for substantially compliant movement of the electrode tip with the weld region, during welding, at least in directions that are generally parallel to the support surface.

\* \* \* \* \*